US012042050B2

(12) United States Patent
Nava et al.

(10) Patent No.: US 12,042,050 B2
(45) Date of Patent: Jul. 23, 2024

(54) ADJUSTABLE BASE ASSEMBLIES, SYSTEMS, AND RELATED METHODS

(71) Applicant: Tempur World, LLC, Lexington, KY (US)

(72) Inventors: Mario A. G. Nava, Owensboro, KY (US); Paul E. Griese, Versailles, KY (US); Daniel S. Powell, Versailles, KY (US)

(*) Notice: Subject to any disclaimer, the term of this patent is extended or adjusted under 35 U.S.C. 154(b) by 336 days.

(21) Appl. No.: 17/333,670

(22) Filed: May 28, 2021

(65) Prior Publication Data

US 2021/0282566 A1 Sep. 16, 2021

Related U.S. Application Data

(63) Continuation of application No. 15/737,611, filed as application No. PCT/US2016/023208 on Mar. 18, 2016, now Pat. No. 11,224,294.

(Continued)

(51) Int. Cl.

*A47C 20/04* (2006.01)
*A47C 17/04* (2006.01)

(Continued)

(52) U.S. Cl.

CPC ............ *A47C 20/041* (2013.01); *A47C 17/04* (2013.01); *A47C 19/02* (2013.01); *A47C 20/08* (2013.01);

(Continued)

(58) Field of Classification Search

CPC ....... A47C 20/041; A47C 17/04; A47C 19/02; A47C 20/08; A47C 21/026; A47C 21/06; A47C 31/008; A61G 7/015; A61G 7/018

(Continued)

(56) References Cited

U.S. PATENT DOCUMENTS

| | | | |
|---|---|---|---|
| 2,588,854 | A | 3/1952 | Lang |
| 2,779,951 | A | 2/1957 | Carlos |

(Continued)

FOREIGN PATENT DOCUMENTS

| | | | |
|---|---|---|---|
| CA | 2879978 | A1 | 1/2014 |
| CA | 2879980 | A1 | 1/2014 |

(Continued)

OTHER PUBLICATIONS

Korean Intellectual Property Office, International Search Report and Written Opinion for PCT/US2016/023208 dated Sep. 20, 2016, 42 pages.

(Continued)

*Primary Examiner* — Justin C Mikowski
*Assistant Examiner* — Luke Hall
(74) *Attorney, Agent, or Firm* — Stites & Harbison, PLLC; Terry L. Wright; Jeffrey A. Haeberlin

(57) ABSTRACT

An adjustable base is provided that includes a fixed frame and an articulating frame connected to the fixed frame. The articulating frame includes an upper body frame pivotally connected to the upper section of the fixed frame, a seat frame pivotally connected to the upper body frame and movable along a central section of the fixed frame, and a leg frame pivotally connected to the fixed frame. An actuator is further included and has a first end connected to the seat frame adjacent to the leg frame and a second end that is connected to a linkage attached to the articulating frame. Upon activation of the actuator, the upper body frame is articulated upward and the seat frame moves linearly along the central section of the fixed frame toward the upper section of the fixed frame. Systems and methods for controlling an adjustable base assembly are further provided.

17 Claims, 42 Drawing Sheets

Related U.S. Application Data

(60) Provisional application No. 62/182,049, filed on Jun. 19, 2015.

(51) Int. Cl.

| | |
|---|---|
| ***A47C 19/02*** | (2006.01) |
| ***A47C 20/08*** | (2006.01) |
| ***A47C 21/02*** | (2006.01) |
| ***A47C 21/06*** | (2006.01) |
| ***A47C 31/00*** | (2006.01) |
| ***A61G 7/015*** | (2006.01) |
| ***A61G 7/018*** | (2006.01) |

(52) U.S. Cl.
CPC ............. *A61G 7/015* (2013.01); *A61G 7/018* (2013.01); *A47C 21/026* (2013.01); *A47C 21/06* (2013.01); *A47C 31/008* (2013.01)

(58) Field of Classification Search
USPC .............................................................. 5/617
See application file for complete search history.

(56) References Cited

U.S. PATENT DOCUMENTS 3,593,350 A 7/1971 Knight
3,686,696 A 8/1972 Lanigan
3,821,953 A * 7/1974 Mikan .................... A61G 7/015 606/245
3,932,903 A * 1/1976 Adams ................... A61G 7/015 5/100
4,349,924 A * 9/1982 Zur ........................ A47C 21/00 5/618
4,785,487 A * 11/1988 Toran ................... A47C 19/045 5/616
4,899,404 A 2/1990 Galumbeck
5,261,725 A 11/1993 Rudolph
5,423,097 A * 6/1995 Brule ..................... A61G 7/015 403/324
5,444,880 A * 8/1995 Weismiller ............. A61G 7/015 5/616
5,577,280 A * 11/1996 Elliott ...................... A61G 7/00 5/617
5,579,550 A 12/1996 Bathrick
5,682,631 A 11/1997 Weismiller
5,862,551 A 1/1999 Oguma
6,000,076 A 12/1999 Webster
6,101,647 A * 8/2000 Stroud ................. A47C 20/041 5/915
6,209,157 B1 * 4/2001 Hensley ............... A47C 20/041 5/613
6,212,713 B1 4/2001 Kuck
6,276,011 B1 8/2001 Antinori
6,357,065 B1 * 3/2002 Adams ................... A61G 7/005 5/617
6,393,641 B1 5/2002 Hensley
6,499,161 B1 12/2002 Godette
6,499,162 B1 12/2002 Lu
6,516,479 B1 * 2/2003 Barbour ................. A61G 7/015 5/152
6,668,408 B2 12/2003 Ferrand
6,690,392 B1 2/2004 Wugoski
6,826,793 B2 12/2004 Tekulve
6,889,396 B2 5/2005 Weinman
6,986,180 B1 1/2006 Wilke
7,047,554 B1 5/2006 Lortz
7,386,901 B2 6/2008 Dewert
7,421,654 B2 9/2008 Wugoski
7,441,291 B2 10/2008 Hayes
7,448,100 B1 11/2008 Shih
7,559,102 B1 7/2009 Benzo
7,676,862 B2 3/2010 Poulos
8,069,513 B2 12/2011 Turner
8,375,488 B2 2/2013 Rawls-Meehan
8,509,400 B2 8/2013 Liu
8,646,130 B2 2/2014 Alzoubi
8,671,478 B2 3/2014 Rippe
8,955,178 B2 2/2015 Robertson
9,038,218 B1 5/2015 Heil
9,149,403 B2 10/2015 Turner
9,706,848 B2 * 7/2017 Shih ....................... A61G 7/015
9,808,093 B2 11/2017 Rawls-Meehan
10,028,873 B2 7/2018 Eskridge, III et al.
10,058,188 B2 8/2018 Tarplee et al.
10,299,976 B2 5/2019 Lo
10,639,221 B2 5/2020 Kramer
2002/0174487 A1 11/2002 Kramer
2002/0178502 A1 * 12/2002 Beasley ................. A61G 7/015 5/618
2004/0133982 A1 * 7/2004 Horitani ................. A61G 7/018 5/616
2005/0210587 A1 9/2005 Piana et al.
2006/0031990 A1 2/2006 Palmatier
2006/0117479 A1 * 6/2006 Kawakami ............. A61G 7/015 5/411
2007/0080570 A1 4/2007 Kohl
2008/0028535 A1 2/2008 Rodrigues
2008/0134431 A1 6/2008 Piana
2008/0222807 A1 9/2008 Hanes
2008/0289108 A1 11/2008 Menkedick
2009/0025150 A1 1/2009 Smalling
2009/0044339 A1 2/2009 Morin
2009/0079245 A1 3/2009 Marcantoni
2009/0094748 A1 4/2009 Long
2009/0178201 A1 * 7/2009 Lujan ....................... A61G 7/07 5/630
2010/0122415 A1 5/2010 Turner
2011/0094032 A1 4/2011 Shih
2011/0138533 A1 6/2011 Rippe
2012/0017373 A1 1/2012 Alzoubi et al.
2012/0047653 A1 3/2012 Metz
2012/0159712 A1 6/2012 Lee
2012/0174319 A1 7/2012 Menkedick et al.
2012/0297543 A1 * 11/2012 Robertson ............ A47C 20/041 5/616
2013/0191993 A1 * 8/2013 Rawls-Meehan ...... A61G 7/018 5/617
2014/0000033 A1 * 1/2014 Clenet .................... A61G 7/072 5/613
2014/0041121 A1 * 2/2014 Shan .................... A47C 21/006 5/618
2014/0075674 A1 3/2014 Chun
2014/0182058 A1 7/2014 Chandler
2014/0188018 A1 7/2014 Vaughn et al.
2014/0201915 A1 * 7/2014 Ermalovich ......... A61G 7/0508 29/434
2014/0325761 A1 11/2014 Rawls-Meehan
2014/0345060 A1 11/2014 Ribble
2014/0352068 A1 * 12/2014 Xu ......................... A61G 7/015 5/616
2015/0007391 A1 * 1/2015 Xu ......................... A61G 7/015 5/616
2015/0107023 A1 * 4/2015 Huang ................... A61G 7/018 5/617
2015/0121623 A1 * 5/2015 Huang ................... A61G 7/018 5/616
2015/0305510 A1 * 10/2015 Tarplee ................ A47C 20/041 601/57
2015/0313369 A1 * 11/2015 Tarplee .............. A61H 23/0254 601/57
2015/0328070 A1 11/2015 Tarplee et al.
2016/0128883 A1 * 5/2016 Robertson .............. A47C 1/035 5/613
2016/0174724 A1 6/2016 Eskridge, III et al.
2016/0262549 A1 9/2016 Rawls-Meehan
2016/0286970 A1 * 10/2016 Robertson .............. A47C 20/04
2016/0331612 A1 * 11/2016 Clenet .................... A47C 20/08
2016/0361216 A1 * 12/2016 Liu ........................ A61G 7/018
2017/0208956 A1 7/2017 Rawls-Meehan
2017/0333271 A1 11/2017 Kramer
2018/0103768 A1 4/2018 Nava et al.
2018/0103769 A1 4/2018 Nava et al.

(56) References Cited

U.S. PATENT DOCUMENTS

| | | | |
|---|---|---|---|
| 2018/0103770 | A1 | 4/2018 | Nava et al. |
| 2018/0184811 | A1 | 7/2018 | Nava et al. |
| 2018/0338625 | A1 | 11/2018 | Nava et al. |
| 2020/0054140 | A1 | 2/2020 | Fei |

FOREIGN PATENT DOCUMENTS

| | | | |
|---|---|---|---|
| CA | 2879981 | A1 | 1/2014 |
| CA | 2896137 | A1 | 7/2014 |
| CA | 2920459 | A1 | 2/2015 |
| CN | 104768425 | | 7/2015 |
| CN | 104822297 | | 8/2015 |
| CN | 104884024 | | 9/2015 |
| CN | 104918519 | | 9/2015 |
| DK | 2877059 | T3 | 12/2017 |
| EP | 1762156 | B1 | 12/2008 |
| EP | 2877060 | | 6/2015 |
| EP | 2877061 | | 6/2015 |
| EP | 2938312 | | 11/2015 |
| EP | 3030110 | | 6/2016 |
| ES | 2645242 | T3 | 12/2017 |
| JP | 6095784 | B2 | 3/2017 |
| WO | 2014018057 | | 1/2014 |
| WO | 2014018059 | | 1/2014 |
| WO | 2014018061 | | 1/2014 |
| WO | 2014105042 | | 7/2014 |
| WO | 2014105046 | | 7/2014 |
| WO | 2014116790 | | 7/2014 |
| WO | 2015020635 | | 2/2015 |
| WO | 2016195777 | | 12/2016 |
| WO | 2016204837 | | 12/2016 |

OTHER PUBLICATIONS

Korean Intellectual Property Office, International Search Report and Written Opinion for PCT/US2016/023175 dated Jun. 30, 2016, 16 pages.

U.S. Appl. No. 62/182,049, filed Jun. 19, 2015.

* cited by examiner

ADJUSTABLE BASE ASSEMBLIES, SYSTEMS, AND RELATED METHODS

RELATED APPLICATIONS

This continuation patent application claims priority to and benefit of, under 35 U.S.C. § 120, U.S. non-provisional patent application having Ser. No. 15/737,611, titled "Adjustable Base Assemblies, Systems and Related Methods," filed on Dec. 18, 2017, which claims priority to international patent application having international application number PCT/US2016/023208, titled "Adjustable Base Assemblies, Systems and Related Methods," filed Mar. 18, 2016, which claims priority to U.S. provisional patent application having Ser. No. 62/182,049, titled "Adjustable Mattress Foundation," filed Jun. 19, 2015, all of which are incorporated by reference herein.

TECHNICAL FIELD

The present invention relates to adjustable base assemblies, systems, and related methods. In particular, the present invention relates to adjustable base assemblies, systems, and related methods that make use of an upper body frame and a seat frame that move relative to a leg frame to improve the contour of a mattress positioned on the adjustable base assemblies.

BACKGROUND

Bed assemblies that make use of adjustable bases are becoming increasingly popular as an alternative to traditional bed assemblies. Unlike traditional bed assemblies that make use of rigid box springs or other similar bases, a bed assembly that makes use of an adjustable base can readily be adjusted by articulating the base into a desired ergonomic position. In other words, by articulating the adjustable base, a user can readily change the position of the mattress lying on the adjustable base and, consequently, can quickly match the position of the mattress to their specific preferences and, at least partially, individualize his or her level of sleep comfort.

Despite the readily adjustable nature of such bed assemblies, the use of adjustable bases frequently leads to a number of issues with the performance of the mattress lying atop the adjustable base. For example, in some prior bed assemblies that make use of an adjustable base, the adjustable base is primarily comprised of an articulating platform that includes a number of hinges connecting rigid segments of the adjustable platform. That combination of the hinges and the rigid segments of the articulating platform, however, often results in very sharp angles at the location of the hinges when the adjustable base is articulated. As such, when a mattress is placed on such an adjustable base and the adjustable base is articulated, the mattress generally fails to conform to the sharp angles of the adjustable base and significant spaces are created between the mattress and portions of the adjustable base. Moreover, as the adjustable base is articulated, the mattress assumes a pinched or folded configuration and leaves the user feeling crunched. In other words, the user begins to feel as if they were being folded in half. Furthermore, when such an adjustable base is articulated, the upper section (i.e., the torso section) of the articulating portion of the base is often rotated upward toward the foot of the bed, while the lower section (i.e., the leg section) of the articulating base is moved toward the head of the bed assembly. However, that movement of the upper and lower sections of the articulating base then not only moves a user resting on the adjustable base away from his or her nightstand, but further creates an unsightly and undesirable gap between the mattress and the adjustable base at the foot of the bed.

SUMMARY

The present invention includes adjustable base assemblies, systems, and related methods. In particular, the present invention includes adjustable base assemblies, systems, and related methods that make use of an upper body frame and a seat frame that move relative to a leg frame to improve the contour of a mattress positioned on the adjustable base assemblies.

In one exemplary embodiment of the present invention, an adjustable base assembly is provided that comprises a fixed frame and an articulating frame connected to the fixed frame. The fixed frame includes an upper section, a central section, and a lower section, and is comprised of two internal side frame members positioned substantially parallel to one another and spaced apart from one another on opposite sides of the fixed frame. The internal side frame members each further include an inner channel that is configured to allow portions of the articulating frame to move linearly along the fixed frame. To connect the two internal side frame members, the fixed frame further includes a first connector frame member that extends perpendicular to and connects the two internal side frame members at the upper section of the fixed frame, a second connector frame member that extends perpendicular to and connects the two internal side frame members at the central section of the fixed frame, and a third connector frame member that extends perpendicular to and connects the two internal side frame members at the lower section of the fixed frame.

In addition to connecting the internal side frame members of the fixed frame, the first connector frame member, the second connector frame member, and the third connector frame member extend beyond the internal side frame members and connect two external side frame members included in the fixed frame. The two external side frame members extend from the upper section to the lower section of the fixed frame outside of the internal side frame members. The fixed frame further includes an external foot frame member that connects the two external side frame members at the lower section of the fixed frame, as well as an external head frame member that connects the two external side frame members at the upper section of the fixed frame. To provide a decorative appearance to the adjustable base assembly and to cover the external frame members, the adjustable base assembly further includes a side rail attached to each of the two external side frame members, a side rail attached to the external foot frame member, and a side rail attached to the external head frame member.

The articulating frame of the exemplary adjustable base assembly extends between and is connected to each of the two internal side frame members of the fixed frame. The articulating frame includes an upper body frame, a seat frame, and a leg frame. The upper body frame of the articulating frame is divided into a lumbar subframe that is pivotally connected to the seat frame, a torso subframe that extends from the lumbar subframe, and a head subframe that is pivotally connected to the torso subframe. The upper body frame of the articulating frame is further pivotally connected to the upper section of the fixed frame by a pair of linking arms. Each of the linking arms connected to the upper body frame has a fixed length and includes a first end pivotally connected to one side of the lumbar subframe and a second end pivotally connected to a respective one of the internal side frame members at the upper section of the fixed frame.

The seat frame of the articulating frame includes an upper end pivotally connected to the lumbar subframe of the upper body frame, a first side positioned adjacent to one of the internal side frame members, a second side positioned adjacent to the other internal side frame member, and a lower end opposite the upper end of the seat frame. The seat frame further includes a first pair of rollers operably connected to the first side of the seat frame and a second pair of rollers operably connected to the second side of the seat frame. The first pair of rollers is positioned within the inner channel of one internal side frame member and the second pair of rollers is positioned within the inner channel of the other internal side frame member, such that the seat frame is configured to move linearly along the inner channels of the internal side frame members.

The leg frame of the articulating frame includes a thigh subframe and a foot subframe. The thigh subframe of the leg frame is pivotally connected to the second connector frame member on one side of the thigh subframe and is pivotally connected to the foot subframe on the side of the thigh subframe opposite the seat frame. The foot subframe of the leg frame is then further pivotally connected to the lower section of the fixed frame by an additional pair of linking arms. Each of the additional linking arms connected to the foot subframe also similarly has a fixed length and includes a first end pivotally connected to one side of the foot subframe and a second end pivotally connected to a respective one of the internal side frame members at the lower section of the fixed frame.

To articulate the upper body frame of the articulating frame of the adjustable base assembly, the adjustable base assembly further includes an actuator and a linkage for attaching the actuator to the upper body frame and to the seat frame. The actuator is positioned below the seat frame with a first end of the actuator connected to the seat frame adjacent to the leg frame and a second end of the actuator connected to the linkage. The linkage includes a hooked portion having a proximal end pivotally connected to the second end of the actuator and a distal end pivotally connected to the seat frame adjacent to the upper body frame. The linkage further includes a linear portion having a proximal end connected to the hooked portion and a distal end connected to the torso subframe of the upper body frame. By connecting the actuator and the linkage to the upper body frame and to the seat frame in such a manner, upon activation of the actuator, the actuator pushes the proximal end of the hooked portion downward and away from the seat frame, which, in turn, also pushes the proximal end of the linear portion of the linkage downward and away from the seat frame. Such a downward push of the proximal end of the hooked portion and the proximal end of the linear portion away from the seat frame then causes the distal end of the hooked portion to pivot about the seat frame and further causes the distal end of the linear portion of the linkage to be pushed upward against the torso subframe to thereby articulate the upper body frame of the articulating frame.

In addition to articulating the upper body frame upward, by virtue of the fixed length of the linking arms attached to the lumbar subframe and the positioning of the rollers of the seat frame within the inner channels of the two internal side frame members, the activation of the actuator further causes the upper body frame and the seat frame to be pulled toward the upper section of the fixed frame. Specifically, as the distal end of the linear portion of the linkage is pushed against the torso subframe and articulates the upper body frame, the fixed length of the linking arms attached to the lumbar subframe acts against the upward articulation or rotation of the upper body frame and pulls the upper body frame toward the upper section of the fixed frame. At the same time, and as the proximal end of the hooked portion is pushed downward and away from the seat frame and the distal end of the hooked portion pivots about the seat frame, the fixed length of the linking arms causes the seat frame and its associated rollers to be pulled linearly along the channels of the internal side frame members of the central section of the fixed frame and toward the upper section of the fixed frame. Such a movement of the upper body frame and the seat frame, upon activation of the actuator, allows the upper body frame to remain adjacent to the upper section of the fixed frame after being articulated, and further allows a wider space or gap to be created between the upper body frame and the leg frame. That movement of the upper body frame and the seat frame, in turn, not only allows a user resting on the adjustable base assembly to remain close to his or her nightstand upon articulating the upper body frame, but further improves the contour of a mattress resting on the articulated adjustable base assembly and prevents the crunched feeling commonly experienced by users who make use of adjustable bases for mattresses.

To further improve the ergonomics of the adjustable base assembly, an exemplary adjustable base assembly of the present invention also includes a number of additional actuators or mechanisms that are operably connected to various other portions of an exemplary adjustable base assembly to articulate those portions into one or more desired positions. For example, in some embodiments, an exemplary adjustable base assembly further includes a head actuator for articulating the head subframe of the upper body frame of an exemplary assembly and a head linkage for connecting the head actuator to the head subframe. In other embodiments, a further exemplary adjustable base assembly is provided that includes a fixed frame having an upper section and an articulating frame having an upper body frame, which further includes a torso subframe and a head subframe. Rather than including a head actuator to tilt the head subframe into a desired ergonomic position, however, that further adjustable base assembly includes a more passive mechanism in the form of an elongated bracket for tilting the head subframe forward upon articulation of the upper body frame. In particular, in that further embodiment, to tilt the head subframe forward, the elongated bracket includes a first end connected to the head subframe and a second end positioned adjacent to the torso subframe. A flexible cable having a predetermined length then connects the second end of the elongated bracket to the upper section of the fixed frame, such that the flexible cable is relaxed when the upper body frame is in a non-articulated position, but then becomes fully extended when the upper body frame, including the torso subframe, is articulated to a predetermined angle relative to the fixed frame (e.g., about 10 degrees to about 60 degrees). Upon articulation of the upper body frame past the predetermined angle, the second end of the elongated bracket is then pulled away from the torso subframe by the fully extended flexible cable, and the first end of the elongated bracket is thus pushed towards the torso subframe to rotate the head subframe toward the torso subframe.

In addition to including a means to tilt or rotate the head subframe of the adjustable base assembly into a desired ergonomic position, in some embodiments, an exemplary adjustable base assembly further includes a lumber support structure that is pivotally connected to both the lumbar subframe and to a lumbar actuator to articulate the lumbar support structure and to provide lumbar support to a user resting on the adjustable base assembly. In some embodiments, the lumbar actuator, like the head actuator, includes a first end connected to the torso subframe and a second end connected to a lumbar linkage in such a manner that, upon the activation of the lumbar actuator, the lumbar support structure is rotated upward as a single section toward the torso subframe. Of course, lumbar subframes and lumbar support structures having various other configurations and that are capable of providing support to a user when an exemplary upper body frame is in an articulated and/or in a horizontal position can also be included in an adjustable base assembly made in accordance with the present invention.

For example, in another embodiments, an exemplary adjustable base assembly for a mattress is provided that includes a lumbar support structure that is not comprised of a single section that rotates upward upon activation of the lumbar actuator, but instead includes an upper section that is pivotally connected to the lumbar subframe and that is covered by an upper lumbar panel, and a lower section that is connected to the upper section by one or more hinges and that is covered by a lower lumbar panel. Upon activation of the lumbar actuator in this additional embodiment, the upper section of the lumbar support structure is then rotated upward along with the upper lumbar panel until the upper section and the upper panel are positioned at a desired angle relative to the remainder of the adjustable base assembly and the lower section and the lower lumbar panel provide support to the lumbar region of a user.

As another refinement to the lumbar subframes and lumbar support structures utilized in the adjustable base assemblies of the present invention, in another embodiment, an adjustable base assembly is provided where the lumbar support structure also includes an upper section and a lower section as well as an upper lumbar panel connected to a lower lumbar panel by a hinge. In that additional adjustable base assembly, the upper section of the lumbar support structure is not covered by the upper lumbar panel and the lower section of the lumbar support structure is not covered by the lower lumbar panel. Instead, the lumbar support structure pivots about a cross member connected to the lumbar subframe, with the upper section of the lumbar support structure extending at an angle below the lumbar subframe and connected to an actuator, and with the lower section of the lumbar support structure being covered by the upper lumbar panel. In this regard, upon activation of the actuator, the upper section of the lumbar support structure is rotated downward to cause the lower section of the lumbar support structure to be rotated upward and away from the lumbar subframe. That rotation of the lumbar support structure then causes the upper lumbar panel to be rotated upward along with the lower lumbar panel to provide lumbar support to a user resting on the adjustable base assembly.

As yet another refinement to the lumbar subframe and lumbar support structures used in accordance with the adjustable base assemblies of the present invention, in other embodiments, an exemplary adjustable base assembly is provided that not only allows a lumbar support structure to be moved upward to provide support to a user resting on an adjustable base assembly, but further allows the lumbar support structure to move linearly along the longitudinal axis of the adjustable base assembly and to be more closely positioned to the lumbar area of a user regardless of the user's height. For instance, in one additional embodiment, an adjustable base assembly is provided that includes a lumbar subframe and a lumbar support structure having a bottom edge that is connected to a pair of wheels. The adjustable base assembly further includes a pair of channels slidably mounted to opposing sides of the lumbar subframe. A lumbar panel is also included in the adjustable base assembly and is positioned above the lumbar support structure with the wheels contacting the lumbar panel. The lumbar panel then includes two leg portions that each extend downwardly from the lumbar panel, such that each one of the two leg portions is positioned in a respective one of the channels. To provide support to the body of a user resting on the adjustable base assembly, the adjustable base assembly further includes a lumbar actuator that is operably connected to the lumbar support structure, such that, upon activation of the lumbar actuator, the lumbar support structure is rotated upward against the lumbar panel and the lumbar panel consequently moves upward in a direction substantially perpendicular to the lumbar subframe while each of the two leg portions moves upward within the respective channels. To adjust the position of the lumbar panel along the longitudinal axis of the adjustable base assembly, the adjustable base assembly then further includes a linear actuator that is operably connected to the lumbar panel and allows the lumbar panel to be moved along the longitudinal axis of the adjustable base assembly and in a direction substantially parallel to the lumbar subframe. In this regard, the lumbar panel can thus be moved downward along the longitudinal axis of the adjustable base assembly in order to position the lumbar panel to provide lumbar support to a user having a small height, but can also be moved upward along the longitudinal axis of the adjustable base assembly in order to position the lumbar panel to better provide lumbar support to a taller user.

Regardless of the particular configuration of the lumbar support structures and lumbar subframes, to even further improve the ergonomics of an exemplary adjustable base assembly of the present invention, each adjustable base assembly typically further includes a leg actuator that is operably connected to the leg frame of an exemplary adjustable base assembly and that can be used to articulate the leg frame into various positions to increase the comfort of a user. For example, in some embodiments, a leg actuator has a first end connected to the third connector frame member at the lower section of the fixed frame of an exemplary adjustable base assembly and a second end that is pivotally connected to the thigh subframe adjacent to the foot subframe. In this regard, upon activation of the leg actuator, the leg actuator pushes upward against and raises one side of the thigh subframe adjacent to the foot subframe, while the other side of the thigh subframe remains connected and adjacent to the second connector frame member of the fixed frame. As the side of the thigh subframe adjacent to the foot subframe continues to be raised due to continued activation of the leg actuator, that side of the thigh subframe then also begins to be pushed toward the seat frame, which, in turn, not only causes the foot subframe to be raised, but further causes the foot subframe to begin to move toward the seat frame. That movement of the foot subframe, however, is offset by the linking arms that, as described above, are connected to the foot subframe and to the internal side frame members at the lower section of the fixed frame and that act against the upward movement of the foot subframe to thereby avoid the creation of an unsightly and undesirable gap at the foot of the adjustable base assembly.

To support a mattress on an exemplary adjustable base assembly of the present invention, the adjustable base assembly further includes a plurality of support panels attached to the articulating frame and to the fixed frame. In particular, the adjustable base assembly includes a head panel attached to the head subframe, a torso panel attached to the torso subframe, a lumbar panel attached to the lumbar support structure, a seat panel attached to the second connector frame member at the central section of the fixed frame, a thigh panel attached to the thigh subframe, and a foot panel attached to the foot subframe. In some embodiments, the support panels are generally comprised of planar pieces of wood that are placed atop and are secured directly to the underlying articulating frame or to the fixed frame of the adjustable base assembly. In other embodiments, an exemplary support panel can also be placed directly inside a subframe, such that the support panel is surrounded by the subframe and then can be directly incorporated into an exemplary adjustable base assembly along with the subframe to improve not only the visual presentation of the adjustable base assembly, but to also provide a weight-reducing alternative to constructions employing separate support panels positioned atop and secured to an underlying subframe. In some embodiments, a fabric cover can further be used to cover such a support panel and the subframe in order to further improve the appearance of an exemplary adjustable base assembly.

Irrespective of the type or configuration of the support panels included in an exemplary adjustable base assembly of the present invention, to keep a mattress positioned atop the support panels upon articulation, an adjustable base assembly made in accordance with the present invention typically further includes a retainer bar that is attached to the foot panel of the adjustable base assembly. In some embodiments, the retainer bar includes a cross segment and two vertical legs that extend downwardly from each end of the cross segment towards the foot panel. Such a retainer bar further includes a riser segment extending from each of the two vertical legs with each riser segment including a proximal portion, a middle portion, and a distal portion. The proximal portion of each riser segment of the retainer bar extends from a respective one of the two vertical legs in a direction substantially perpendicular to each of the at least two vertical legs. The middle portion of each riser segment then extends from the proximal portions downwardly at an angle from each proximal portion, while the distal portion of each riser segment extends from the middle portions in a direction substantially perpendicular to the two vertical legs and is then attached to the foot panel. By configuring each riser segment to include a middle portion that extends downwardly from a proximal portion and a distal portion that extends from the proximal portion in a direction perpendicular to the two vertical legs, upon attachment of the distal portion of each riser segment to the foot panel, each riser segment thus defines a space between the proximal portion of each riser segment and the foot panel that, in turn, allows a user to easily cover the mattress with a sheet by simply placing the sheet around both the mattress and the retainer bar and then tucking the sheet into the spaces. In other words, by making use of such a retainer bar, a user can easily change the sheets on a mattress without picking up or otherwise raising the mattress.

To further restrain the movement of the mattress on an exemplary adjustable base assembly, in some embodiments, an adjustable base assembly is provided that also includes a pair of mounting brackets with one mounting bracket being attached to one side edge of the foot panel and the other mounting bracket being attached to the other side edge of the foot panel. In some embodiments, each of the mounting brackets includes a U-shaped portion that is configured for mounting each of the mounting brackets around the foot panel, and a mounting portion that is configured to secure each of the mounting brackets to a mattress. In this regard, each U-shaped portion typically includes a top segment, a bottom segment opposite the top segment, and a side segment that extends between and connects the top segment and the bottom segment of each of the mounting brackets, such that the U-shaped portions can be positioned around the foot panel. To secure a mattress to such an adjustable base assembly, the mounting portion of each mounting bracket then includes a first segment that is connected to the top segment of each of the U-shaped portions and that extends away from the U-shaped portions at an upward angle, and a second segment that is connected to the first segment, but that extends away from the U-shaped portion of each mounting bracket at a downward angle such that the mounting portion of each mounting bracket has an inverted V-shape that allows each of the mounting portions to be positioned in a loop included on a cover surrounding the mattress.

As described above, to provide a decorative appearance and cover the external frame members of an exemplary adjustable base assembly, in some embodiments, an adjustable base assembly is provided that also includes a number of side rails attached to the external frame members. As a refinement to the typical means of securing side rails to external frame members on an adjustable base assembly, however, in a further embodiment, a side rail can be provided that includes a plurality of brackets with each of the brackets having a hooked portion to allow each of the brackets to be attached to an external frame member. By attaching a side rail to the frame member in such a manner, the side rail can thus readily be removed to allow access to portions of the adjustable base assembly or to allow the side rails to be replaced with an alternative side rail having a different appearance. In some embodiments, to ensure that such a side rail is properly aligned upon attachment or reattachment of the side rail, the side rail can further include one or more magnets that would then align with additional magnets or metal contact points in a portion of the adjustable base assembly itself or in an adjacent side rail.

As another refinement to the side rails used in the adjustable base assemblies of the present invention, in other embodiments, a side rail can be provided that includes a rigid panel secured to and extending along the length of an interior surface of the side rail to provide additional or requisite structural support to an exemplary adjustable base assembly. In other embodiments, various side rails can be provided that make use of grooves and corresponding brackets to removably attach the side rails to an exemplary adjustable base assembly. Moreover, as an even further refinement to the side rails included in the adjustable base assemblies of the present invention, additional features can also be incorporated into an exemplary side rail to increase the functionality of both the side rail and an exemplary adjustable base itself. For instance, in another embodiment, a further adjustable base assembly can be provided that includes a side rail having a groove extending along the side rail that allows a table to be mounted to the side rail via a corresponding bracket attached to the table and/or that includes a panel section pivotally connected to the side rail to allow access to underneath the adjustable base assembly.

As yet another refinement to the adjustable base assemblies of the present invention, in some embodiments, an adjustable base assembly of the present invention can also be incorporated into a larger frame structure to allow an exemplary adjustable base assembly to be provided in a single size and then used to support a mattress having a length or a width larger than that of the exemplary adjustable base assembly (e.g., a queen or a king size mattress). In addition to including various embodiments in which the width of the exemplary adjustable base assemblies of the present invention can be changed, each adjustable base assembly typically also comprises one or more legs for supporting the adjustable base assemblies and for adjusting the height of the adjustable base assemblies.

Regardless of the configuration of the legs included in an exemplary adjustable base assembly, to control each of the actuators in the adjustable base assembly, the adjustable base assemblies of the present invention further include an adjustable base controller that is operably connected to the actuators included in the assemblies and that is configured to independently control the activation of each of the actuators. In addition to controlling the activation of the actuators of the adjustable base assembly, an exemplary adjustable base controller can be further operably connected to and used to control a number of other features included on the adjustable base assembly. For example, in some embodiments, the adjustable base controller is further operably connected to a pair of massage units attached to the torso panel and to a massage unit attached to the lumbar panel included on the articulating frame. In this regard, in such an embodiment, the adjustable base controller can thus be configured to control the electrical current supplied to the massage units and thereby activate the massage units in one or more defined patterns to provide various massaging patterns to a user resting on the adjustable base assembly. In some embodiments, such massaging patterns, as well as other operating parameters, can be directly inputted into the adjustable base controller via a USB port that is attached to the adjustable base assembly and that is operably connected to the adjustable base controller.

With further respect to the adjustable base controllers included in an exemplary adjustable base assembly of the present invention, in further embodiments, one or more actions can be input into the adjustable base using a single command and/or a series of commands. For example, in some embodiments, one exemplary system for controlling an adjustable base assembly is provided that includes: an articulating frame having a first part (i.e., a first articulating part); a first actuator for articulating the first part of the articulating frame; an adjustable base controller for actuating the first actuator; and an interactive device in communication with the adjustable base controller, where the interactive device is for programming the adjustable base controller to cause the first actuator to move the first part of the articulating frame to a predetermined first position in response to a single command. In this regard, the exemplary system allows a user to program in an action to control the adjustable base which is triggered by a single command (e.g., the press of a single button on a remote control, or smartphone or tablet application). One example would be determining how best to go to sleep, where the user would first program the remote to tell the bed to lower to their preset sleeping position. Once this is programmed in, when the user pressed the button labeled “Sleep” on the remote control, or smartphone or tablet application, the action occurs automatically.

In some embodiments, the interactive device may be a remote control device, or a smartphone or tablet executing an application, in communication with the adjustable base controller. In some embodiments, such an exemplary system may further include a second actuator for articulating a second part (i.e., a second articulating part) of the articulating frame of the adjustable base, the adjustable base controller may further actuate the second actuator, and the interactive device may further program the adjustable base controller to cause the second actuator to move the second part of the articulating frame to a predetermined second position in response to the single command. Thus, an exemplary system may further allow a user to program in simultaneous operation of the first actuator and the second actuator, or sequential operation of the first actuator and the second actuator and a duration between the start of one action and the start of another, to control the adjustable base which are triggered by a single command (e.g., the press of a single button on a remote control, or smartphone or tablet application).

In some embodiments, an exemplary system made in accordance with the present invention may further include a signal generating device which is also in communication with the adjustable base controller for generating the single command and communicating the single command to the adjustable base controller. The signal generating device may be the remote control, or smartphone or tablet executing an application, but may also be an outside timer or other control signal generating device such as a television, personal computer, home automation device, or active sleep system that recognizes sleep.

In this regard, in some embodiments of the present invention, an exemplary method of operating an above-described exemplary system for controlling an adjustable base is provided that includes: providing an adjustable base being in any type of “non-flat” position; interfacing via Wi-Fi, Bluetooth, radio frequency, or other controlled timing device that is linked to the adjustable base controller; setting, by a user, a “sleep timer” for x duration; and lowering the adjustable base slowly every x number of seconds until in a flat position. The next step can include determining if the user has selected to wake up in the last set position. If not, then an additional step is, upon a button press, maintaining the adjustable base in a flat position and clearing the last set cycle, unless stored in memory. If so, then the next step is, upon a button press, the bed going back to the last set position, and the subsequent step is moving a memory setting in a remote control device or in the adjustable base controller to the last known set position.

In one embodiment of such a method, the signal generating device is a remote control device including a built-in microphone, the first part of the articulating frame is a head subframe, and the first actuator is a head actuator for articulating the head subframe of the articulating frame. In such an embodiment, the remote control device monitors the built-in microphone for ambient noise similar to snoring. When a predetermined threshold of ambient noise similar to snoring is reached, the remote control device sends a signal to the adjustable base controller. The adjustable base controller then causes the head actuator to move the head subframe of the articulating frame to open up the airway of an occupant on the adjustable base assembly.

In another embodiment, an exemplary system is provided that further includes a signal receiving device in communication with the adjustable base controller. The signal receiving device performs a function, the adjustable base controller activates the function, and the interactive device programs the adjustable base controller to cause the signal receiving device to perform the function in response to the single command. For example, the function may be rolling down automated sheets, raising a level of lighting proximate to the adjustable base, playing music, or starting a brewing of coffee by a coffee brewer.

To monitor actuator parameters on an adjustable base assembly made in accordance with the present invention and maximize the features of an adjustable base assembly that can be operated simultaneously, in some embodiments, an adjustable base controller can further be configured to communicate directly or indirectly with various power regulators and sensors. For instance, in another embodiment, an exemplary system for controlling an adjustable base is provided that includes: a power supply; a first power regulator in communication with the power supply; a first electrical device in communication with the first power regulator, the first electrical device for providing a first feature to the adjustable base; a first current sensor for sensing the current supplied to the first electrical device by the first power regulator; a second power regulator in communication with the power supply; a second electrical device in communication with the second power regulator, the second electrical device for providing a second feature to the adjustable base; a second current sensor for sensing the current supplied to the second electrical device by the second power regulator; and an adjustable base controller in feedback communication with the first current sensor and the second current sensor, and in control communication with the first power regulator and the second power regulator, the adjustable base controller for controlling the first power regulator and the second power regulator to regulate power to the respective first electrical device and the second electrical device in response to monitoring the current supplied to each of the respective first electrical device and the second electrical device, such that the first electrical device and the second electrical device receive power simultaneously without exceeding an overall power budget. Thus, the adjustable base controller actively monitors the current to each of the first electrical device and the second electrical device (e.g., actuators, massage motors, USB port, lighting, etc.). This allows the adjustable base controller to budget the overall power available and to operate multiple electrical devices at the same time as long as the power capacity is closely monitored.

Rather than locking out and predetermining which feature functions can be run simultaneously in order to prevent exceeding the overall power budget, in some embodiments, the adjustable base controller measures the power consumption by each feature and maximizes the usage of available power by prioritizing the functions. Additionally, the system provides enhanced safety capability by allowing actuators to be shut down more quickly in the case that they are blocked. The adjustable base controller detects the stroke location and drive direction of the actuators via feedback from sensors in the actuators and software. The adjustable base controller also provides boundary limits on the current supplied to an actuator from testing and data collection of unloaded and fully loaded bases. Knowing that information and actively measuring the current to the actuator in real time, the adjustable base controller can more quickly shut down the actuators when the current exceeds these boundaries limits.

With further respect to the power monitoring of an exemplary adjustable base assembly, in some further embodiments, an exemplary method implemented by the adjustable base controller in operating an adjustable base includes: measuring the total input power to the system; detecting, via software, what key subcomponents are active, for those without software feedback using total input power measurements for determination; measuring power consumption of key components within the system; measuring total input power to the system and comparing to the maximum power available from the power supply; and knowing the peak output capability of the power supply, intelligently driving the key subcomponents of the system to allow the best customer experience.

As an additional feature of an adjustable base assemblies of the present invention, the adjustable base controllers included in the adjustable base assemblies can further be utilized for remotely monitoring the diagnostics of an exemplary adjustable base assembly via a remote control or Wi-Fi interface. For example, in some embodiments, an exemplary system for remote monitoring of bed control diagnostics of an adjustable base assembly is provided that includes an adjustable base controller for controlling electromechanical systems in an adjustable base assembly and for: performing diagnostic testing or relating an error code to an error condition of operation of the electromechanical systems; and embedding the error code or results of the diagnostic testing in an internal webpage. In some embodiments, such an exemplary system also includes: a router in two-way wireless communication with the adjustable base controller; and an external communication device (e.g., a smart device or a personal computer) in communication with the router through a communication network, the external communication device querying the adjustable base controller for the internal webpage to remotely obtain the error code or the results of the diagnostic testing. Due to the bidirectional nature of Wi-Fi communication, diagnostic information is accessed by the external communication device via an internal web interface of the adjustable base controller. The current state of the adjustable base controller, including any current or logged error conditions and basic diagnostic information, can then be accessed via the Internet by connecting directly to the web address of the adjustable base controller.

In some embodiments, such an exemplary system may further include a cloud server in communication with the router through the communication network, the cloud server receiving, via the communication network and the router, the error code or the results of the diagnostic testing and sending an alert to the external communication device regarding the error code or the results of the diagnostic testing. Thus, the logged error conditions and basic diagnostic information can also be accessed via the Internet by connecting cloud server. In some embodiments, instead of or in addition to the router and related elements, a remote control device can be utilized that is in two-way wireless communication with the adjustable base controller and that queries the adjustable base controller for the error code or the results of the diagnostic testing, and displays, on a display device, the error code or the results of the diagnostic testing.

As an additional function of an adjustable base controller utilized in the adjustable base assemblies of the present invention, in some embodiments, an adjustable base controller can further be used to monitor various capacitive sensors and prevent the pinching of a human body part by an exemplary adjustable base assembly. For example, in some exemplary embodiments, a system for preventing pinching of a human body part by an adjustable base assembly, including a plurality of capacitive sensors affixed to respective frame members of the adjustable base; a plurality of actuators (e.g., a upper body actuator, a head actuator, and a lumbar actuator) for moving the respective frame members of the adjustable base assembly; an input device for providing a command to move at least one of the respective frame members of the adjustable base; and an adjustable base controller in communication with the plurality of capacitive sensors and the plurality of actuators. The adjustable base controller is for: checking the plurality of capacitive sensors for a presence of the human body part in response to receiving the command to move the at least one of the respective frame members; checking the plurality of capacitive sensors in real time during movement of the at least one of the respective frame members; and, if presence of the human body part is detected after a predetermined trip time, then stopping the movement of the at least one of the respective frame members to avoid contact with the body part and subsequent injury.

Further features and advantages of the present invention will become evident to those of ordinary skill in the art after a study of the description, figures, and non-limiting examples in this document.

DESCRIPTION OF EXEMPLARY EMBODIMENTS

The present invention includes adjustable base assemblies, systems, and related methods. In particular, the present invention includes adjustable base assemblies, systems, and related methods that make use of an upper body frame and a seat frame that move relative to a leg frame to improve the contour of a mattress positioned on the adjustable base assemblies.

While the terms used herein are believed to be well understood by one of ordinary skill in the art, definitions are set forth herein to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims.

The term "processor" is used herein to describe one or more microprocessors, microcontrollers, central processing units, Digital Signal Processors (DSPs), Field-Programmable Gate Arrays (FPGAs), Application-Specific Integrated Circuits (ASICs), or the like for executing instructions stored in memory.

The term "memory" is used herein to describe physical devices (computer readable media) used to store programs (sequences of instructions) or data (e.g. program state information) on a non-transient basis for use in a computer or other digital electronic device, including primary memory used for the information in physical systems which are fast (i.e. RAM), and secondary memory, which are physical devices for program and data storage which are slow to access but offer higher memory capacity. Traditional secondary memory includes tape, magnetic disks and optical discs (CD-ROM and DVD-ROM). The term "memory" is often, but not always, associated with addressable semiconductor memory, i.e. integrated circuits consisting of silicon-based transistors, and used for example as primary memory but also other purposes in computers and other digital electronic devices. Semiconductor memory includes both volatile and non-volatile memory. Examples of nonvolatile memory include flash memory (sometimes used as secondary, sometimes primary computer memory) and ROM/PROM/EPROM/EEPROM memory. Examples of volatile memory include dynamic RAM memory, DRAM, and static RAM memory, SRAM.

The term "URL" stands for uniform resource locator, which is a specific character string that constitutes a reference to a resource. Most web browsers display the URL of a web page above the page in an address bar.

Figure 1:
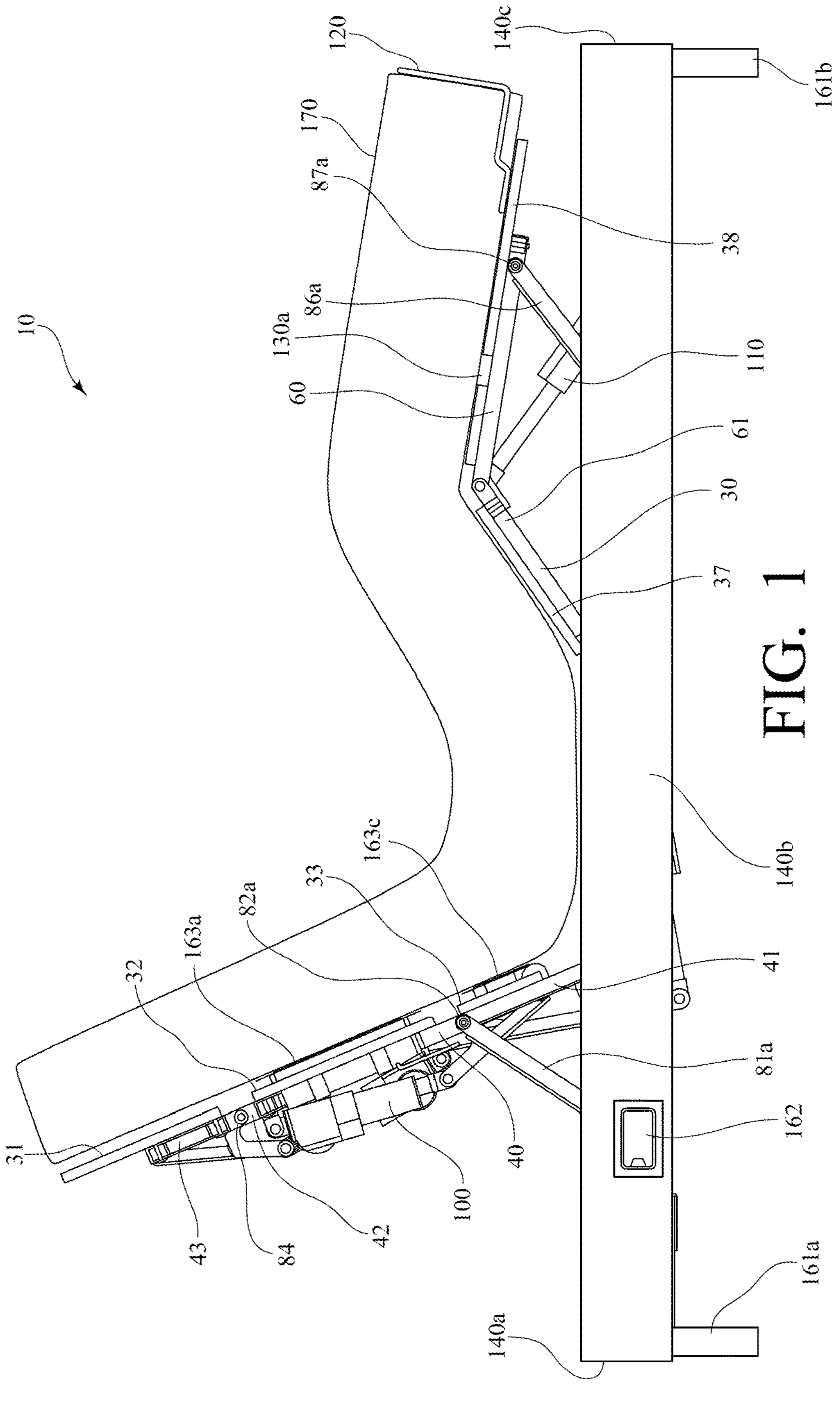
FIG. 1 is a side view of an exemplary adjustable base assembly for a mattress made in accordance with the present invention and showing a mattress positioned atop the adjustable base assembly.
Figure 2:
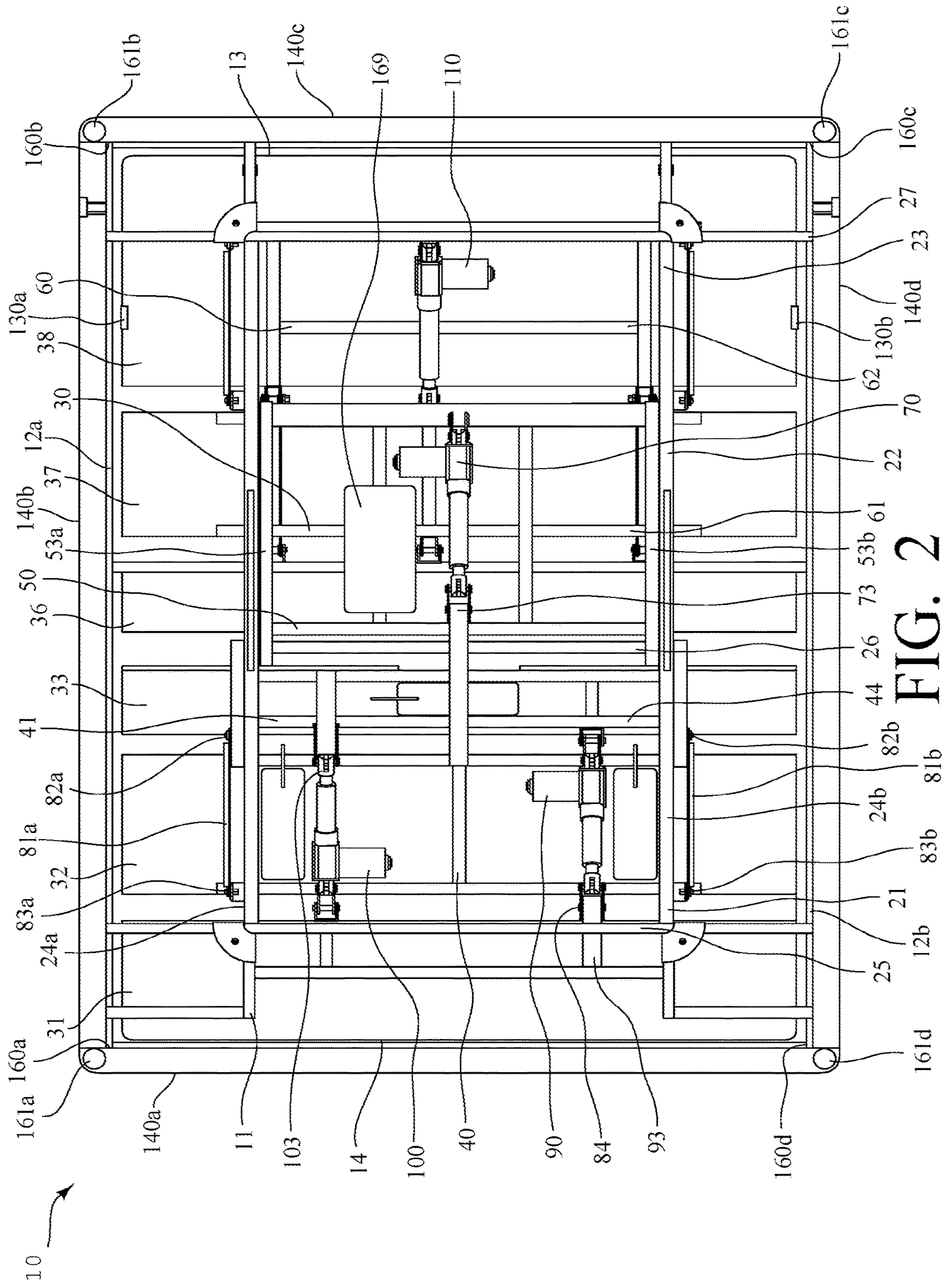
FIG. 2 is a bottom view of the adjustable base assembly of FIG. 1.
Figure 3:
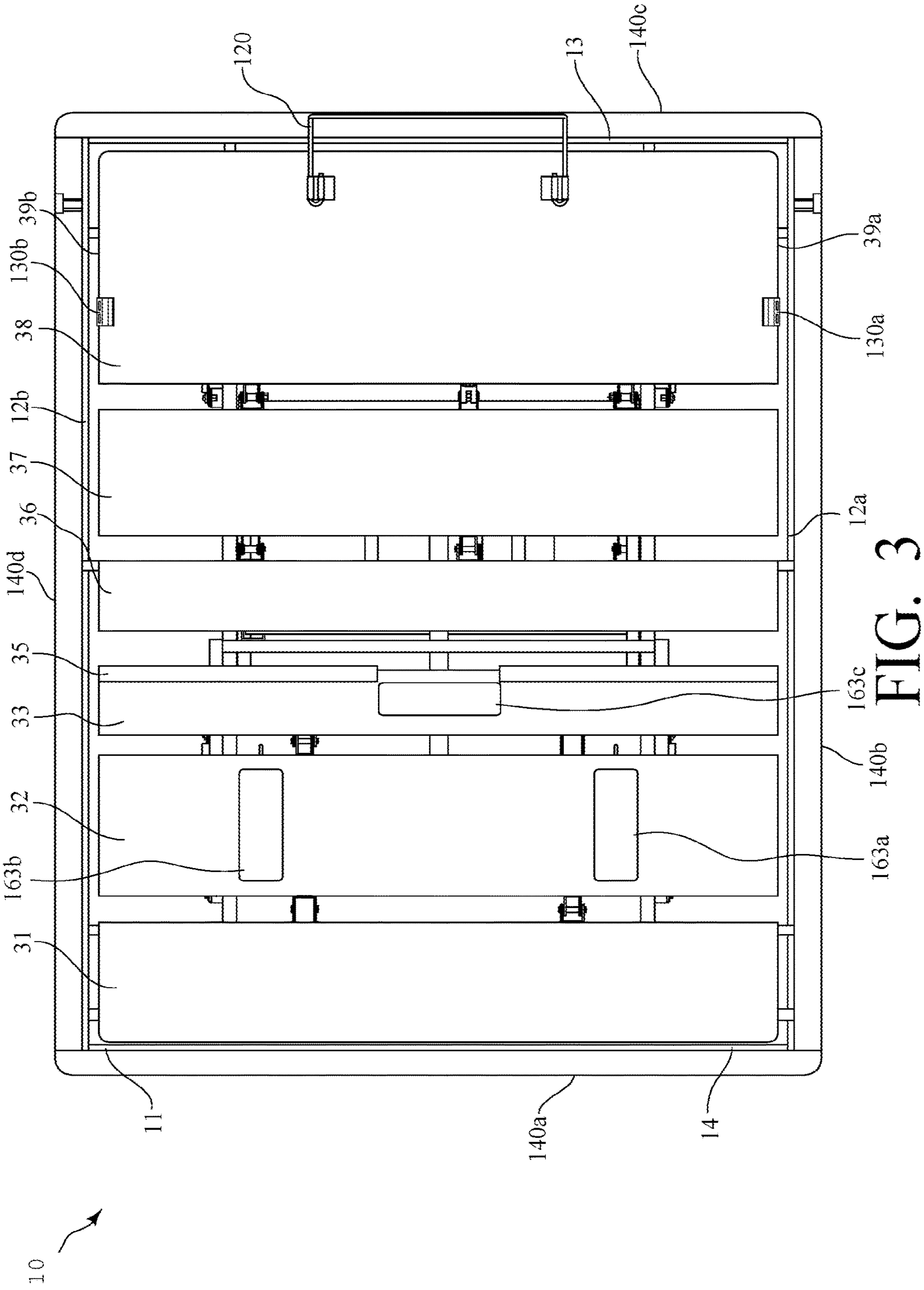
FIG. 3 is a top view of the adjustable base assembly of FIG. 1.
Figure 4:
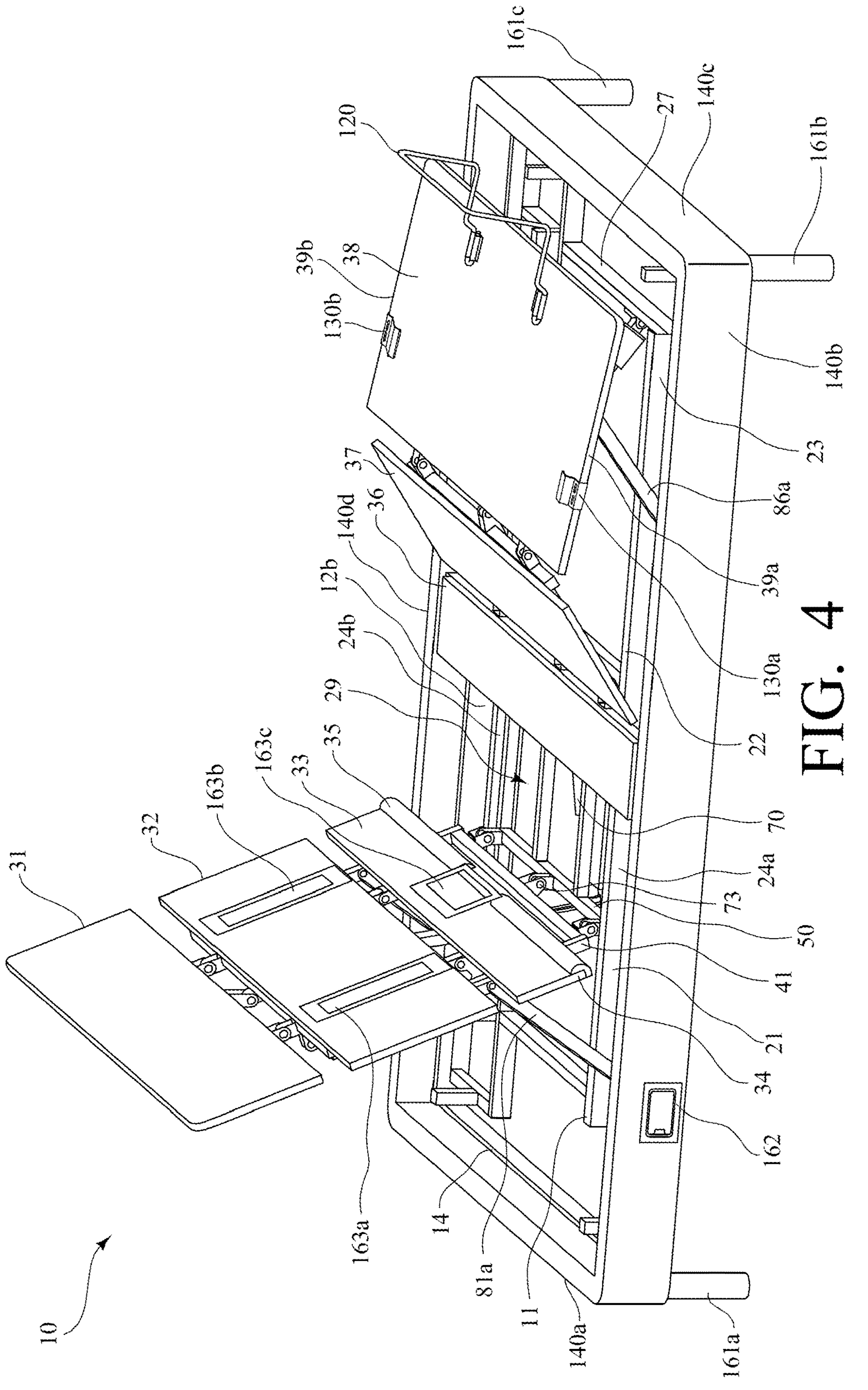
FIG. 4 is a perspective view of the adjustable base assembly of FIG. 1, but showing the adjustable base assembly in an articulated position.

Referring first to FIGS. 1-3, in one exemplary embodiment of the present invention, an adjustable base assembly 10 is provided that comprises a fixed frame 11 and an articulating frame 30 connected to the fixed frame 11. The fixed frame 11 can generally be characterized as including an upper section 21, a central section 22, and a lower section 23. The fixed frame 11 is comprised of two internal side frame members 24*a*, 24*b* that are positioned substantially parallel to one another and that are spaced apart from one another on opposite sides of the fixed frame 11. The internal side frame members 24*a*, 24*b* each extend from the upper section 21 of the fixed frame 11 to the lower section 23 of the fixed frame 11 and each include an inner channel 28*a*, 28*b*, which are arranged such that the inner channels 28*a*, 28*b* face one another and are configured to allow portions of the articulating frame 30 to move linearly along the fixed frame 11, as described in further detail below.

To connect the two internal side frame members 24*a*, 24*b*, the fixed frame 11 further includes a first connector frame member 25 that extends perpendicular to and connects the two internal side frame members 24*a*, 24*b* at the upper section 21 of the fixed frame 11, a second connector frame member 26 that extends perpendicular to and connects the two internal side frame members 24*a*, 24*b* at the central section 22 of the fixed frame 11, and a third connector frame member 27 that extends perpendicular to and connects the two internal side frame members 24*a*, 24*b* at the lower section 23 of the fixed frame 11. In the adjustable base assembly 10, both the first connector frame member 25 and the third connector frame member 27 are generally positioned below the internal side frame members 24*b* to accommodate portions of the articulating frame 30, while the second connector frame member 26 is positioned atop the internal side frame members 24*a*, 24*b* of the fixed frame 11 and provides a point of attachment for a portion of the articulating frame 30, as also described in further detail below.

In addition to connecting the internal side frame members 24*a*, 24*b* of the fixed frame 11, the first connector frame member 25, the second connector frame member 26, and the third connector frame member 27 extend beyond the internal side frame members 24_a_, 24_b_ and each also extend perpendicular to and connect two external side frame members 12_a_, 12_b_ that are included in the fixed frame 11 and that are also arranged substantially parallel to one another. The two external side frame members 12_a_, 12_b_ are spaced apart from one another and extend from the upper section 21 to the lower section 23 of the fixed frame 11 outside of the internal side frame members 24_a_, 24_b_. The fixed frame 11 further includes an external foot frame member 13 that connects the two external side frame members 12_a_, 12_b_ at the lower section 23 of the fixed frame 11, and an external head frame member 14 that connects the two external side frame members 12_a_, 12_b_ at the upper section 21 of the fixed frame 11. In this regard, the two external side frame members 12_a_, 12_b_, the external foot frame member 13, and the external head frame member 14 collectively define an outer perimeter of the fixed frame 11 that surrounds not only the internal side frame members 24_a_, 24_b_ but also the articulating frame 30. To provide a decorative appearance to the adjustable base assembly 10 and to cover the external frame members 12_a_, 12_b_, 13, 14, the adjustable base assembly 10 further includes a side rail 140_b_, 140_d_ attached to each of the two external side frame members 12_a_, 12_b_, a side rail 140_c_ attached to the external foot frame member 13, and a side rail 140_a_ attached to the external head frame member 14.

Turning now to the articulating frame 30 of the adjustable base assembly 10, and referring still to FIGS. 1-3, the articulating frame 30 extends between and is connected to each of the two internal side frame members 24_a_, 24_b_ of the fixed frame 11. The articulating frame 30 includes an upper body frame 40, a seat frame 50, and a leg frame 60. The upper body frame 40 of the articulating frame 30 is divided into a lumbar subframe 41 that is pivotally connected to the seat frame 50, a torso subframe 42 that extends from the lumbar subframe 41, and a head subframe 43 that is pivotally connected to the torso subframe 42. The upper body frame 40 of the articulating frame 30 is further pivotally connected to the upper section 21 of the fixed frame 11 by a pair of linking arms 81_a_, 81_b_. Each of the linking arms 81_a_, 81_b_ connected to the upper body frame 40 has a fixed length and includes a first end 82_a_, 82_b_ pivotally connected to one side of the lumbar subframe 41 and a second end 83_a_, 83_b_ pivotally connected to a respective one of the internal side frame members 24_a_, 24_b_ at the upper section 21 of the fixed frame 11.

Figure 8A:
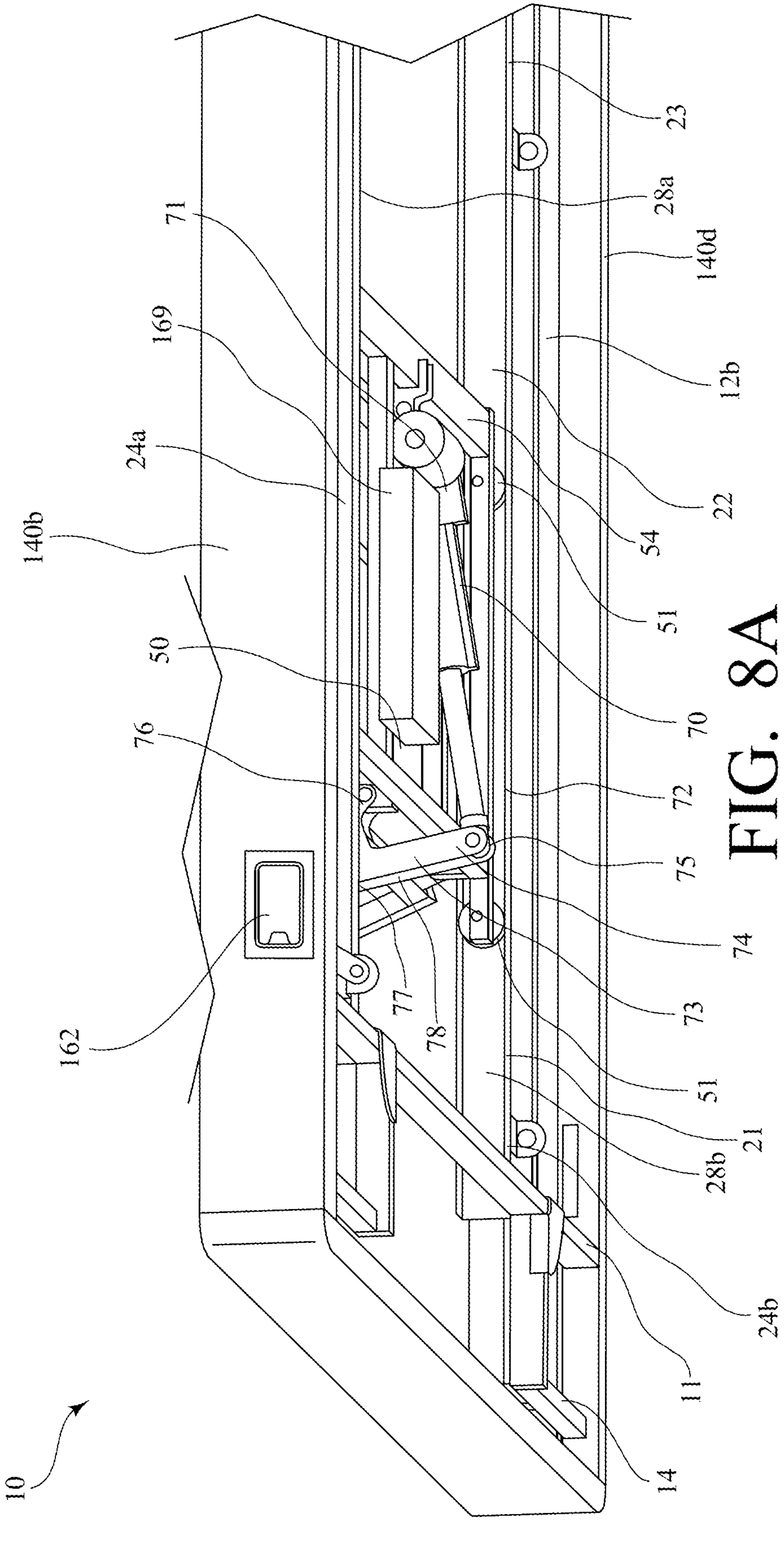
FIG. 8A is a partial perspective view of the bottom of the adjustable base assembly of FIG. 1, and showing the seat frame of the adjustable base assembly positioned within and movable along a channel of the fixed frame of the adjustable base assembly.
Figure 8B:
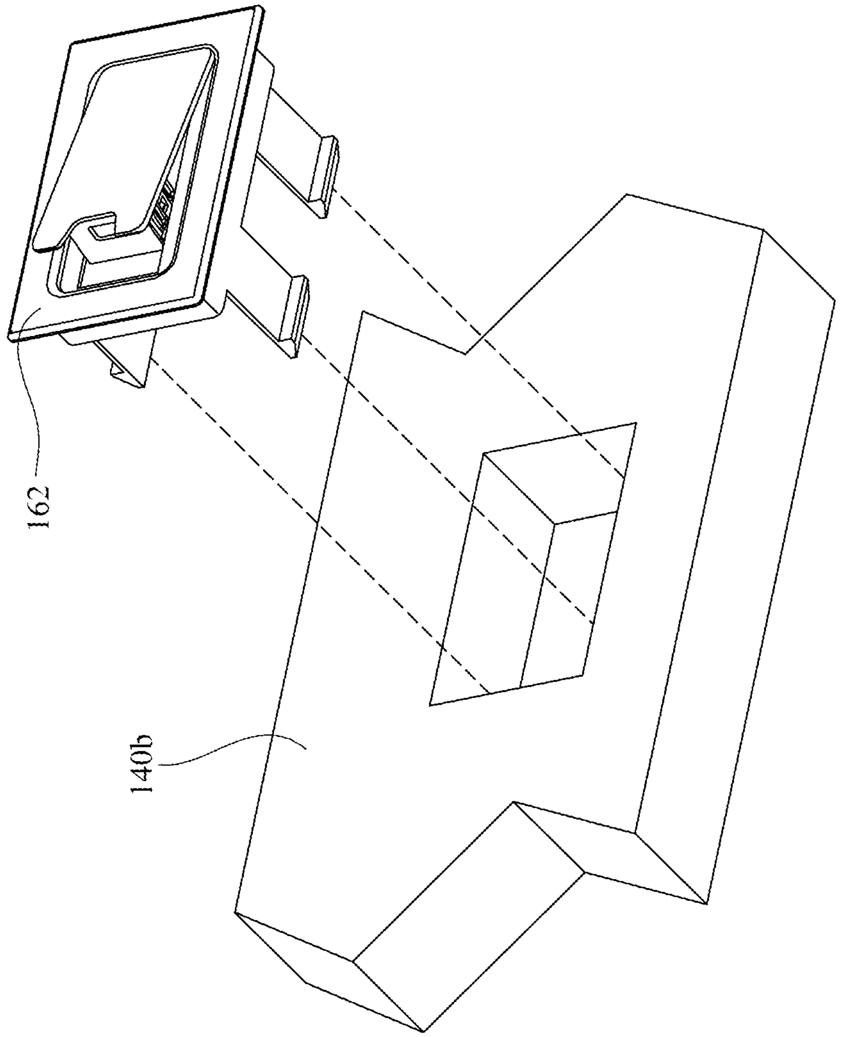
FIG. 8B is an exploded, partial perspective view of the adjustable base assembly of FIG. 1, and showing an exemplary USB port of the adjustable base assembly.

With respect to the seat frame 50 of the articulating frame 30, the seat frame 50 includes an upper end 52 pivotally connected to the lumbar subframe 41 of the upper body frame 40, a first side 53_a_ positioned adjacent to one of the internal side frame members 24_a_, a second side 53_b_ positioned adjacent to the other internal side frame member 24_b_, and a lower end 54 opposite the upper end 52 of the seat frame 50. The seat frame 50 further includes two pairs of rollers 51 with one of the pairs of roller operably connected to the first side 53_a_ of the seat frame 50 and the other pair of rollers 51 operably connected to the second side 53_b_ of the seat frame 50. More specifically, in the adjustable base assembly 10, one pair of rollers 51 is positioned within the inner channel 28_a_ of one internal side frame member 24_a_ and the other pair of rollers 51 is positioned within the inner channel 28_b_ of the other internal side frame member 24_b_, as shown in FIG. 8, such that the seat frame 50 is configured to move linearly along the inner channels 28_a_, 28_b_ of the internal side frame members 24_a_, 24_b_.

With respect to the leg frame 60 of the articulating frame 30, the leg frame 60 includes a thigh subframe 61 and a foot subframe 62. The thigh subframe 61 of the leg frame 60 is pivotally connected to the second connector frame member 26 on one side of the thigh subframe 61 and is pivotally connected to the foot subframe 62 on the side of the thigh subframe 61 opposite the seat frame 50. Similar to the lumbar subframe 41 of the upper body frame 40, the foot subframe 62 of the leg frame 60 is then further pivotally connected to the lower section 23 of the fixed frame 11 by an additional pair of linking arms 86_a_, 86_b_. Each of the additional linking arms 86_a_, 86_b_ connected to the foot subframe 62 also similarly has a fixed length and includes a first end 87_a_, 87_b_ pivotally connected to one side of the foot subframe 62 and a second end 88_a_, 88_b_ pivotally connected to a respective one of the internal side frame members 24_a_, 24_b_ at the lower section 23 of the fixed frame 11.

Referring now to FIGS. 4-8, to articulate the upper body frame 40 of the articulating frame 30 of the adjustable base assembly 10, the adjustable base assembly 10 further includes an actuator 70 and a linkage 73 for attaching the actuator 70 to the upper body frame 40 and to the seat frame 50. In particular, in the exemplary adjustable base assembly 10, the actuator 70 utilized to articulate the upper body frame 40 is a linear actuator, such as an FD60 Linear Actuator manufactured by Moteck Electric Corp. (New Taipei City, Taiwan), and is positioned below the seat frame 50 with a first end 71 of the actuator 70 connected to the seat frame 50 adjacent to the leg frame 60 and a second end 72 of the actuator 70 connected to the linkage 73. In this regard, the linkage 73 includes a hooked portion 74 having a proximal end 75 pivotally connected to the second end 72 of the actuator 70 and a distal end 76 pivotally connected to the seat frame 50 adjacent to the upper body frame 40. The linkage 73 further includes a linear portion 77 having a proximal end 78 connected to the hooked portion 74 and a distal end 79 connected to the torso subframe 42 of the upper body frame 40. By connecting the actuator 70 and the linkage 73 to the upper body frame 40 and to the seat frame 50 in such a manner, upon activation of the actuator 70, the actuator 70 thus pushes the proximal end 75 of the hooked portion 74 downward and away from the seat frame 50, which, in turn, also pushes the proximal end 78 of the linear portion 77 of the linkage 73 downward and away from the seat frame 50. Such a downward push of the proximal end 75 of the hooked portion 74 and the proximal end 78 of the linear portion 77 away from the seat frame 50 then causes the distal end 76 of the hooked portion 74 to pivot about the seat frame 50 and further causes the distal end 79 of the linear portion 77 of the linkage 73 to be pushed upward against the torso subframe 42 to thereby articulate the upper body frame 40 of the articulating frame 30.

In addition to articulating the upper body frame 40 upward, by virtue of the fixed length of the linking arms 81_a_, 81_b_ attached to the lumbar subframe 41 and the positioning of the rollers 51 of the seat frame 50 within the inner channels 28_a_, 28_b_ of the two internal side frame members 24_a_, 24_b_, the activation of the actuator 70 further causes the upper body frame 40 and the seat frame 50 to be pulled toward the upper section 21 of the fixed frame 11. Specifically, as the distal end 79 of the linear portion 77 of the linkage 73 is pushed against the torso subframe 42 and articulates the upper body frame 40, the fixed length of the linking arms 81_a_, 81_b_ attached to the lumbar subframe 41 acts against the upward articulation or rotation of the upper body frame 40 and pulls the upper body frame 40 toward the upper section 21 of the fixed frame 11. At the same time, and as the proximal end 75 of the hooked portion 74 is pushed downward and away from the seat frame 50 and the distal end 76 of the hooked portion 74 pivots about the seat frame

50, the fixed length of the linking arms 81*a*, 81*b* causes the seat frame 50 and its associated rollers 51 to be pulled linearly along the channels 28*a*, 28*b* of the internal side frame members 24*a*, 24*b* of the central section 22 of the fixed frame 11 and toward the upper section 21 of the fixed frame 11. Such a movement of the upper body frame 40 and the seat frame 50 upon activation of the actuator 70 allows the upper body frame 40 to remain adjacent to the upper section 21 of the fixed frame 11 after being articulated, and further allows a wider space or gap 29 to be created between the upper body frame 40 and the leg frame 60. That movement of the upper body frame 40 and the seat frame 50, in turn, not only allows a user resting on the adjustable base assembly 10 to remain close to his or her nightstand upon articulating the upper body frame 40, but further improves the contour of a mattress, such as the mattress 170 shown in FIG. 1, resting on the articulated adjustable base assembly 10 and thereby prevents the crunched feeling commonly experienced by users who make use of adjustable bases for mattresses.

Figure 5:
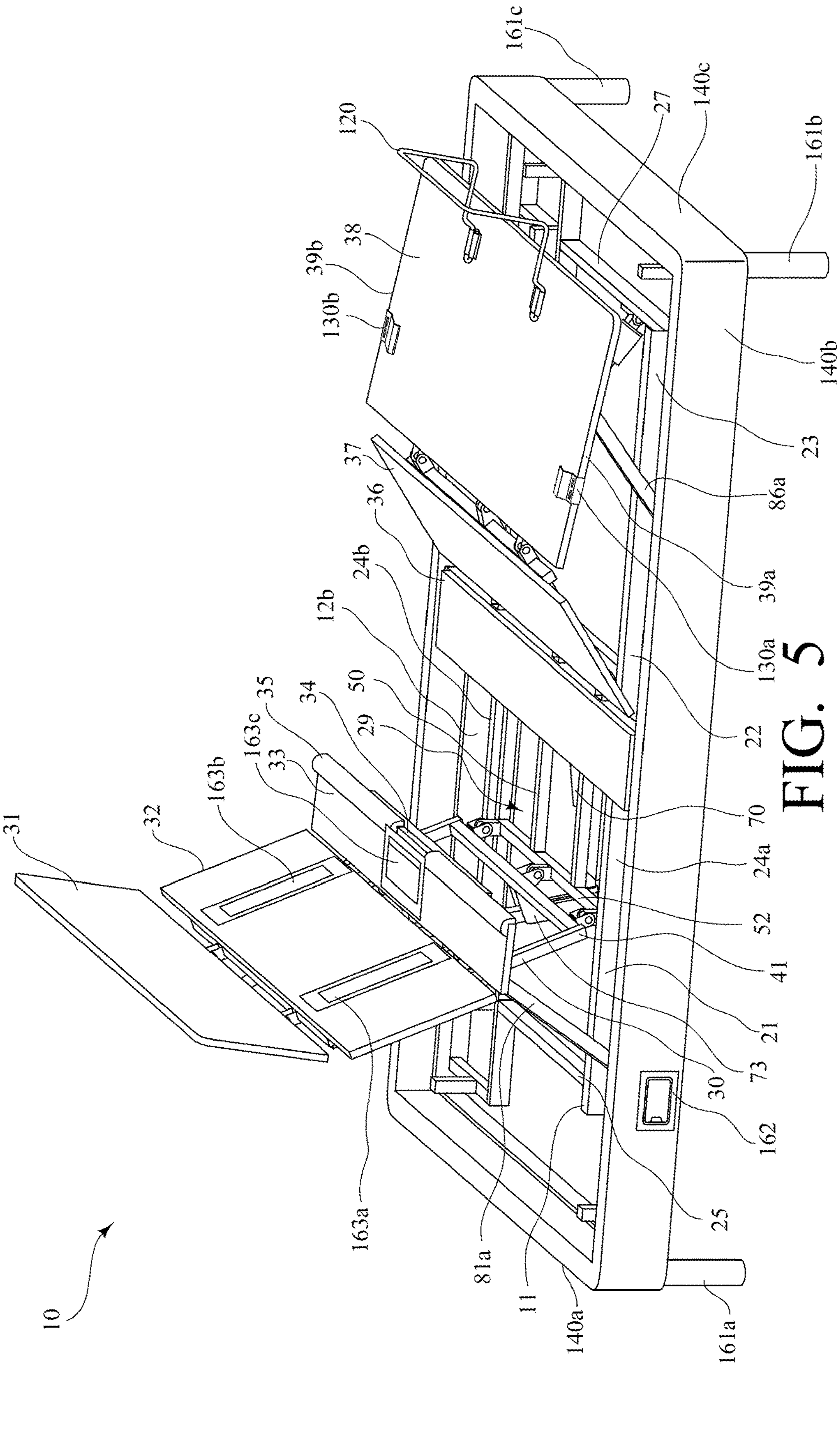
FIG. 5 is another perspective view of the adjustable base assembly of FIG. 1 similar to FIG. 4, but showing the head panel and the lumbar panel of the adjustable base assembly in an articulated position.
Figure 6:
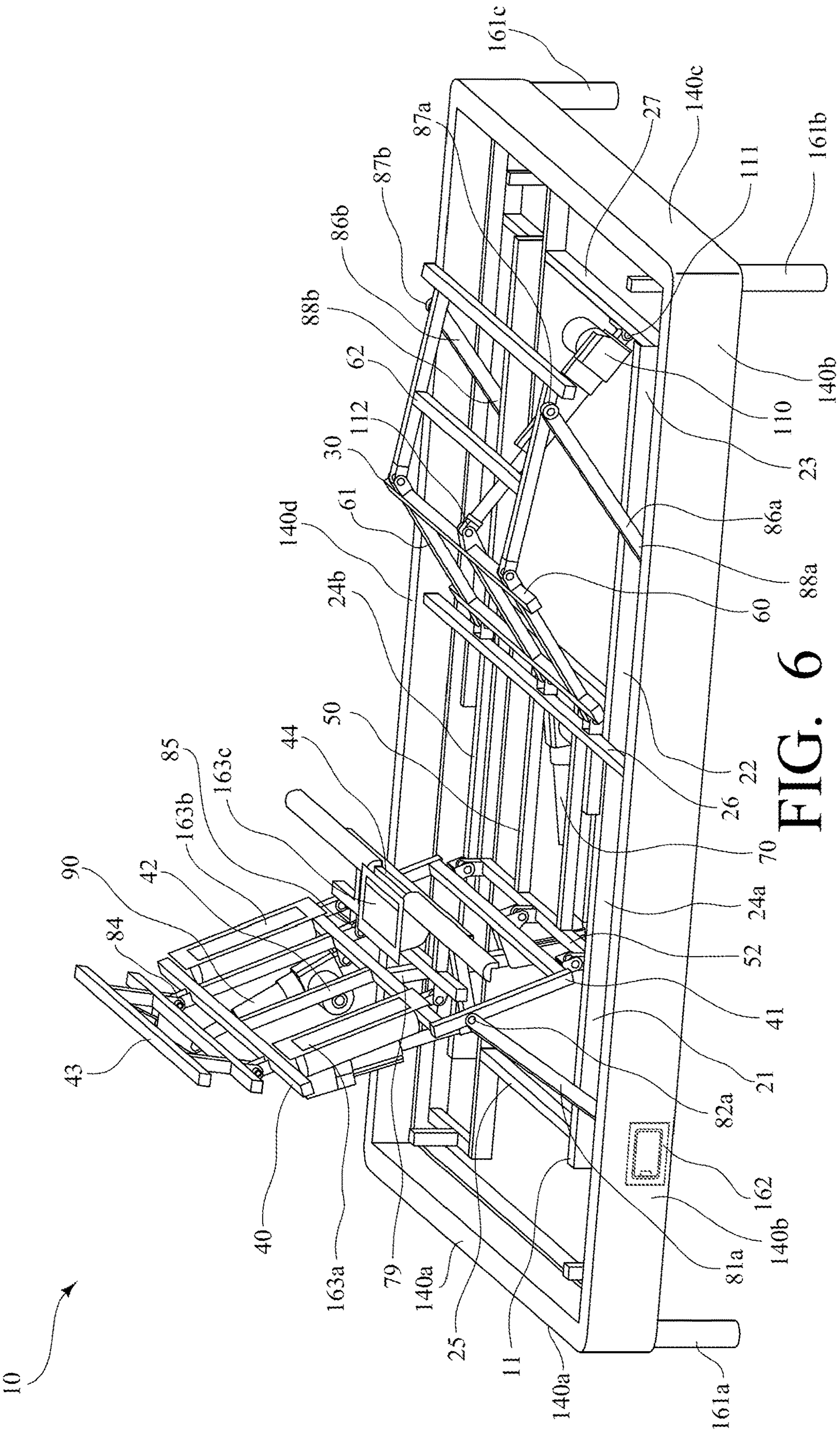
FIG. 6 is another perspective view of the adjustable base assembly of FIG. 1 similar to FIG. 5, but with the support panels removed from the adjustable base assembly.
Figure 7:
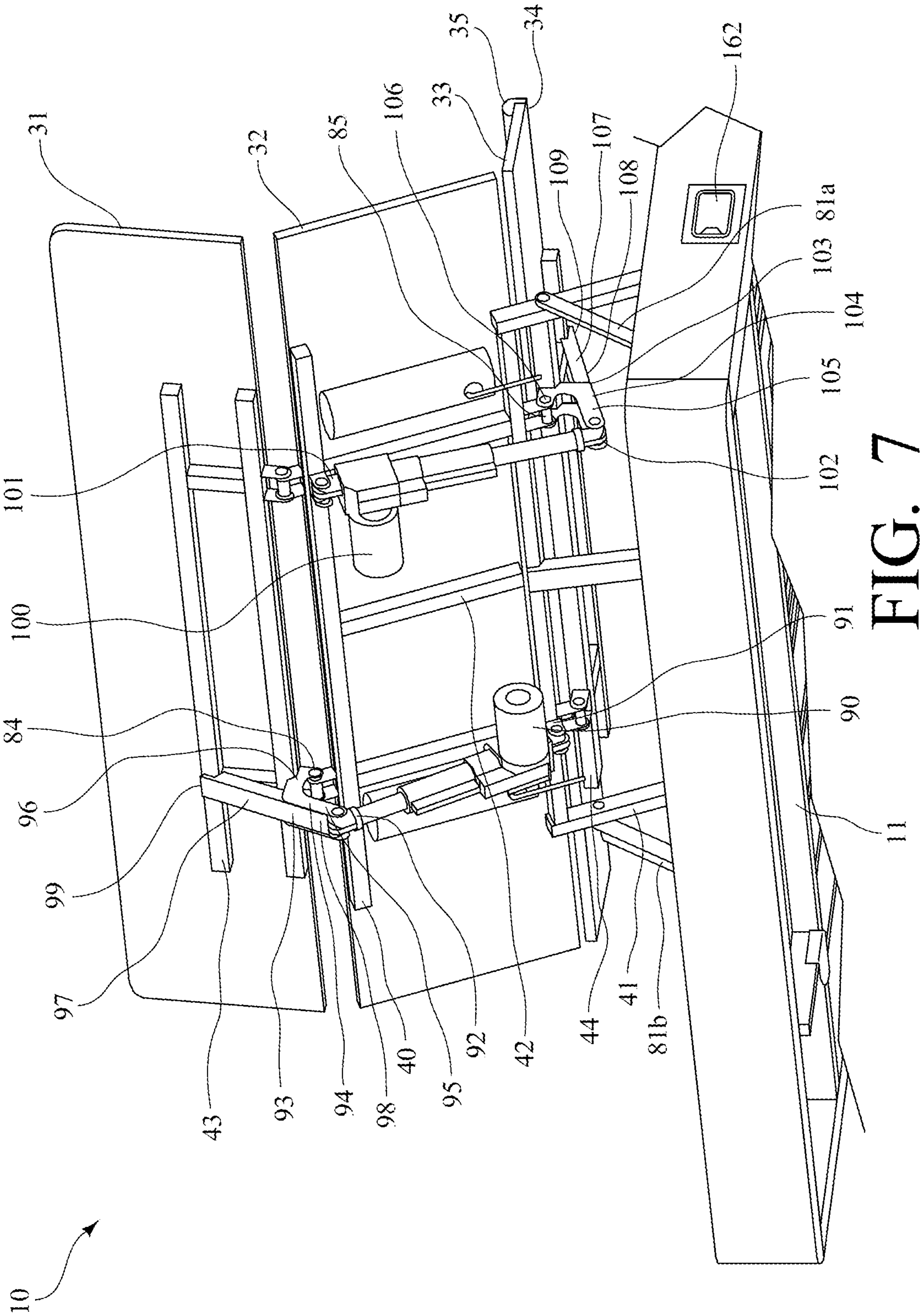
FIG. 7 is a partial perspective view of the rear of the adjustable base assembly of FIG. 1, and showing the head subframe articulated by a head actuator and the lumbar subframe articulated by a lumbar actuator.

To further improve the ergonomics of the adjustable base assembly 10, and referring now more specifically to FIGS. 5-7, the adjustable base assembly 10 also includes a number of additional actuators that are operably connected to various other portions of the adjustable base assembly 10 to articulate those portions into one or more desired positions. More specifically, the adjustable base assembly 10 further includes a head actuator 90 for articulating the head subframe 43 of the upper body frame 40 and a head linkage 93 for connecting the head actuator 90 to the head subframe 43. In this regard, the head actuator 90 includes a first end 91 connected to the torso subframe 42 and a second end 92 connected to the head linkage 93. Similar to the linkage 73 used to connect the actuator 70 to the upper body frame 40 and to the seat frame 50, the head linkage 93 includes a hooked portion 94 having a proximal end 95 pivotally connected to the second end of 92 the head actuator 90 and a distal end 96 connected to a joint 84 that is positioned between the head subframe 43 and the torso subframe 42 and that allows the head subframe 43 to rotate relative to the torso subframe 42. The head linkage 93 also includes a linear portion 97 that has a proximal end 98 connected to the hooked portion 94 of the head linkage 93 and a distal end 99 connected to the head subframe 43.

By attaching the head linkage 93 to the head actuator 90 and the head subframe 43 in such a manner, upon activation of the head actuator 90, the head actuator 90 pushes the proximal end 95 of the hooked portion 94 of the head linkage 93 upward and away from the torso subframe 42, which, in turn, also pushes the proximal end 98 of the linear portion 97 of the head linkage 93 upward and away from the torso subframe 42. Such an upward push of the proximal end 95 of the hooked portion 94 and the proximal end 98 of the linear portion 97 of the head linkage 93 away from the torso subframe 42 then causes the distal end 96 of the hooked portion 94 of the head linkage 93 to pivot about the joint 84 connecting the head subframe 43 to the torso subframe 42. The upward push of the proximal end 95 of the hooked portion 94 and the proximal end 98 of the linear portion 97 further causes the distal end 99 of the linear portion 97 to be pushed forward toward the seat frame 50 and, consequently, the head subframe 43 to be rotated forward toward the seat frame 50.

As a result of rotating the head subframe 43 of the adjustable base assembly 10 forward in such a manner, the adjustable base assembly 10 can thus be configured to provide support to the head of a user when the adjustable base assembly 10 is placed in an articulated configuration and the head of a user lying on the adjustable base assembly 10 is tilted forward (e.g., for purposes of reading). In this regard, the head actuator 90 is also generally a linear actuator that is configured to push the head subframe 43 forward and tilt the head of a user, but is also generally configured to pull and cause the head subframe 43 to be rotated backward. As such, the actuator 70 allows the head subframe 43 to be returned into alignment with the remainder of the upper body frame 40 when the user no longer wishes his or her head to be tilted forward, but also allows the head subframe 43 to be rotated backward past the point of alignment with the upper body frame 40 and toward the upper section 21 of the fixed frame 11, such that a user can continue to use a pillow without the head of the user being pushed excessively forward into an uncomfortable position when the adjustable base assembly 10 is articulated.

Figure 13:
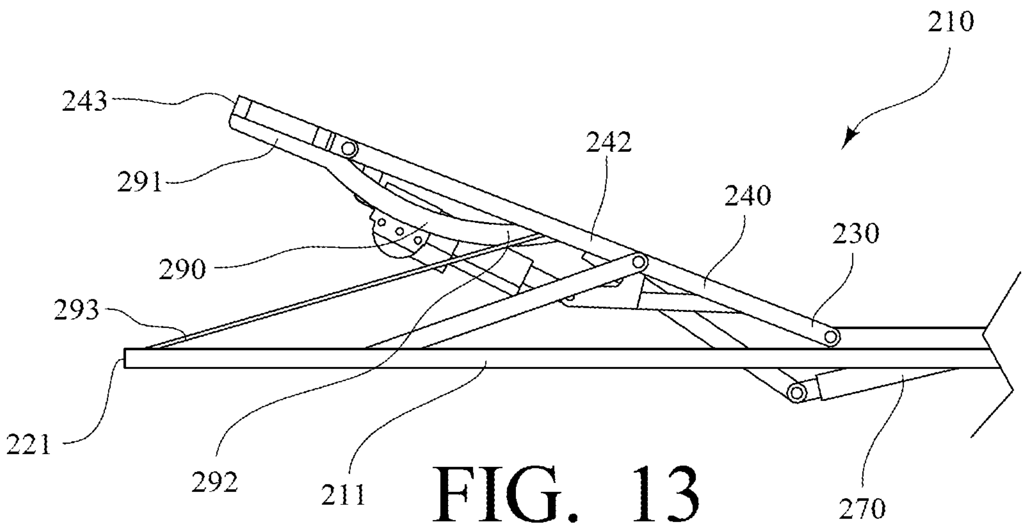
FIG. 13 is a perspective view of another exemplary adjustable base assembly for a mattress made in accordance with the present invention, and showing an elongated bracket connected to the head subframe of the adjustable base assembly to articulate the head subframe.
Figure 14:
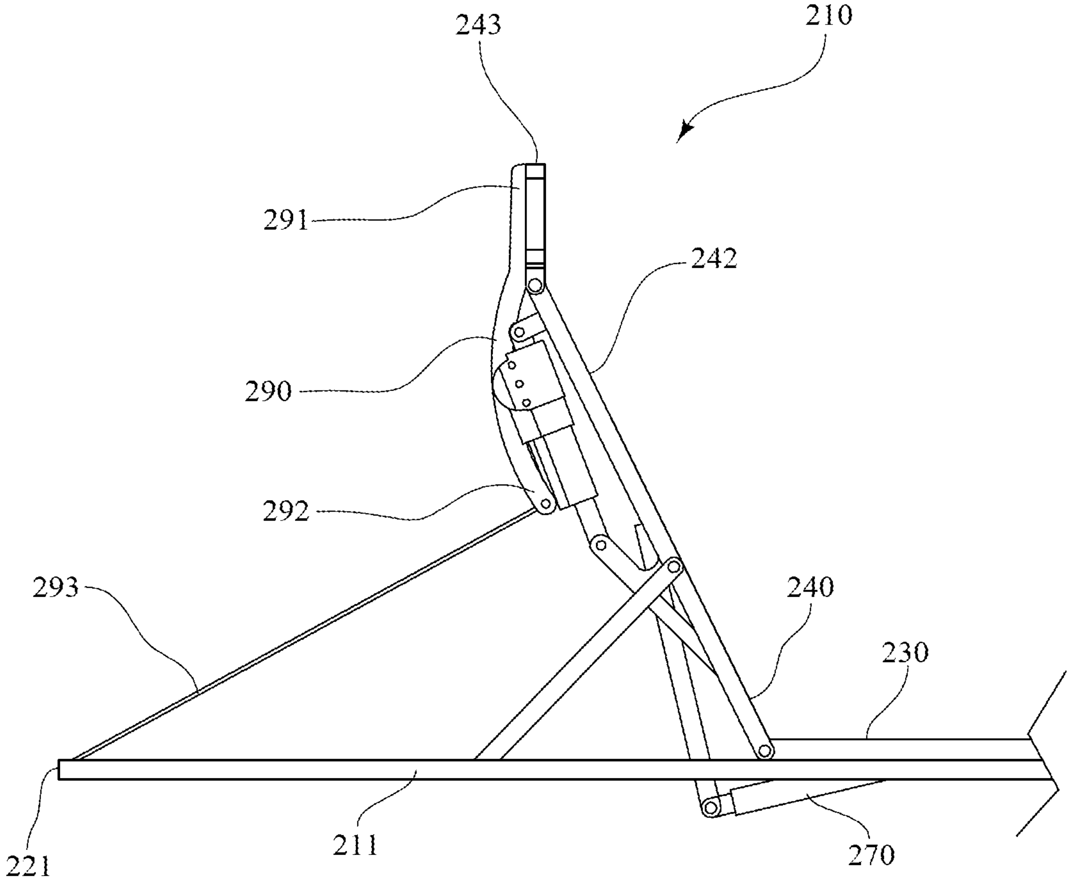
FIG. 14 is another perspective view of the adjustable base assembly of FIG. 9, but showing the head subframe and the elongated bracket in an articulated position.

Head subframes that make use of various other actuators or other means for tilting or rotating a head subframe to provide a user with a desired ergonomic position or level of support can also be included in an exemplary adjustable base assembly made in accordance with the present invention. For example, and as a refinement to the adjustable base assemblies of the present invention, and referring now to FIGS. 13 and 14, an exemplary adjustable base assembly 210 is provided that includes a fixed frame 211 having an upper section 221 and an articulating frame 230 having an upper body frame 240. The upper body frame 240 of the adjustable base assembly 210 includes a torso subframe 242 and a head subframe 243, as well as an actuator 270 for articulating the upper body frame 240. Unlike the adjustable base assembly 10 shown in FIGS. 1-8, however, a head actuator is not included in the adjustable base assembly 210 to tilt the head subframe 243 into a desired ergonomic position. Rather, the adjustable base assembly 210 includes a more passive mechanism in the form of an elongated bracket 290 for tilting the head subframe 243 forward upon articulation of the upper body frame 240. In particular, to tilt the head subframe 243 forward, the elongated bracket 290 includes a first end 291 connected to the head subframe 243 and a second end 292 positioned along the torso subframe 242. A flexible cable 293 (e.g., a wire rope) having a predetermined length then connects the second end 292 of the elongated bracket 290 to the upper section 221 of the fixed frame 211.

The predetermined length of the flexible cable 293 is such that the flexible cable 293 is relaxed when the upper body frame 240 is in a non-articulated position, but then becomes fully extended when the upper body frame 240, including the torso subframe 242, is articulated to a predetermined angle relative to the fixed frame 211. That predetermined angle is of course dependent on the length of the flexible cable 293, but is generally in the range about 10 degrees to about 60 degrees, including, in some embodiments, about 30 degrees. Upon activation of the actuator 270 and the articulation of the upper body frame 240 past the predetermined angle, however, the second end 292 of the elongated bracket 290 is then pulled away from the torso subframe 242 by the fully extended flexible cable, and the first end 291 of the elongated bracket 290 is thus pushed towards the torso subframe 242 to rotate the head subframe 243 toward the torso subframe 242.

Referring now once again to FIGS. 5-7, in addition to including a means to tilt or rotate the head subframe 43 of the adjustable base assembly 10 into a desired ergonomic position, the adjustable base assembly 10 further includes a lumber support structure 44 that is pivotally connected to both the lumbar subframe 41 and to a lumbar actuator 100 to articulate the lumbar support structure 44 and provide lumbar support to a user resting on the adjustable base assembly 10. The lumbar actuator 100, like the head actuator 90, is a linear actuator that includes a first end 101 connected to the torso subframe 42 and a second end 102 connected to a lumbar linkage 103. The lumbar linkage 103, like the head linkage 93, also includes a hooked portion 104 having a proximal end 105 that is pivotally connected to the second end 102 of the lumbar actuator 100 and a distal end 106 connected to a joint 85 that is positioned between the lumbar subframe 41 and the lumbar support structure 44. The lumbar linkage 103 further includes a linear portion 107 having a proximal end 108 connected to the hooked portion 104 and a distal end 109 connected to the lumbar support structure 44. In this regard, and again similar to the head actuator 90 and its attachment to the head subframe 43, by attaching the lumbar linkage 103 to the lumbar support structure 44 in such a manner, the activation of the lumbar actuator 100 pushes the proximal end 105 of the hooked portion 104 toward the seat frame 50 and, consequently, causes the proximal end 108 of the linear portion 107 of the lumbar linkage 103 to also be pushed toward the seat frame 50. The movement of the proximal end 105 of the hooked portion 104 and the proximal end 108 of the linear portion 107 of the lumbar linkage 103 then causes the distal end 106 of the hooked portion 104 of the lumber linkage 103 to pivot about the joint 85 connecting the lumbar subframe 41 to the lumbar support structure 44 and, in turn, causes the distal end 109 of the linear portion 107 of the lumbar linkage 103 to be pushed upward toward the torso subframe 42 and thereby rotate the lumbar support structure 44 upward toward the torso subframe 42. As a result of rotating the lumbar support structure 44 upward in such a manner, the adjustable base assembly 10 is thus configured to not only provide support to the lumbar region of a user resting on the adjustable base assembly 10 both when the upper body frame 40 is in an articulated position as shown in FIGS. 5-7 and when the upper body frame is in a horizontal (i.e., non-articulated) position, but to do so in manner that can be varied by adjusting the extent to which the second end 102 of the lumbar actuator 100 pushes the lumbar linkage 103.

Figure 15:
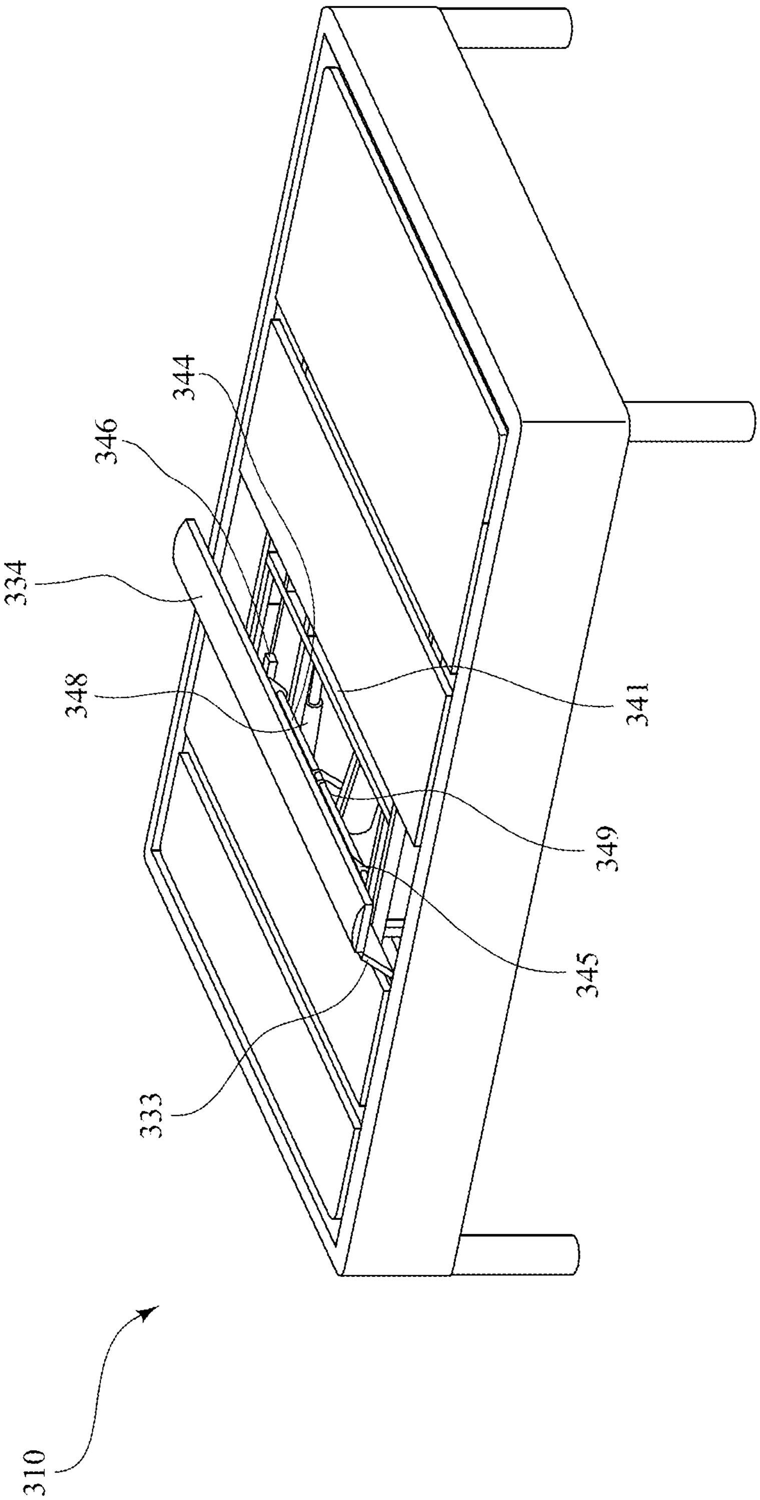
FIG. 15 is a perspective view of another exemplary adjustable base assembly made in accordance with the present invention and including a lumbar support structure.

Lumbar subframes and lumbar support structures having various other configurations that are capable of providing support to a user when an exemplary upper body frame is in an articulated or in a horizontal position can also be included in an adjustable base assembly made in accordance with the present invention. For example, as a refinement to the lumbar subframes and lumbar support structures of the base assemblies of the present invention, and referring now to FIG. 15, an exemplary adjustable base assembly 310 for a mattress is provided that includes a lumbar support structure 344 pivotally connected to a lumbar subframe 341 and connected to a lumbar actuator 348. Unlike the lumbar support structure 44 shown in FIGS. 5-8, however, the lumbar support structure 344 is not comprised of a single section that rotates upward upon activation of the lumbar actuator 348. Rather, in the adjustable base assembly 310 shown in FIG. 15, the lumbar support structure 344 includes an upper section 345 that is pivotally connected to the lumbar subframe 341 and that is covered by an upper lumbar panel 333, and a lower section 346 that is connected to the upper section 345 by one or more hinges and that is covered by a lower lumbar panel 334. In this regard, the lumbar actuator 348 further includes an actuating arm 349 connected to the upper section 345 of the lumbar support structure 344, such that, upon activation of the lumbar actuator 348, the upper section 345 of the lumbar support structure 344 is rotated upward along with the upper lumbar panel 333 until the upper section 345 and the upper lumbar panel 333 are positioned at a desired angle relative to the remainder of the adjustable base assembly 310. By connecting the lower section 346 of the lumbar support structure 344 to the upper section 345 using one or more hinges, however, the lower section 346 is configured to remain in a substantially horizontal orientation or to remain parallel with at least a portion of the adjustable base assembly 310 such that the lumbar support being provided to a user resting on the adjustable base assembly 310 is being provided by a substantially planar surface.

Figure 16:
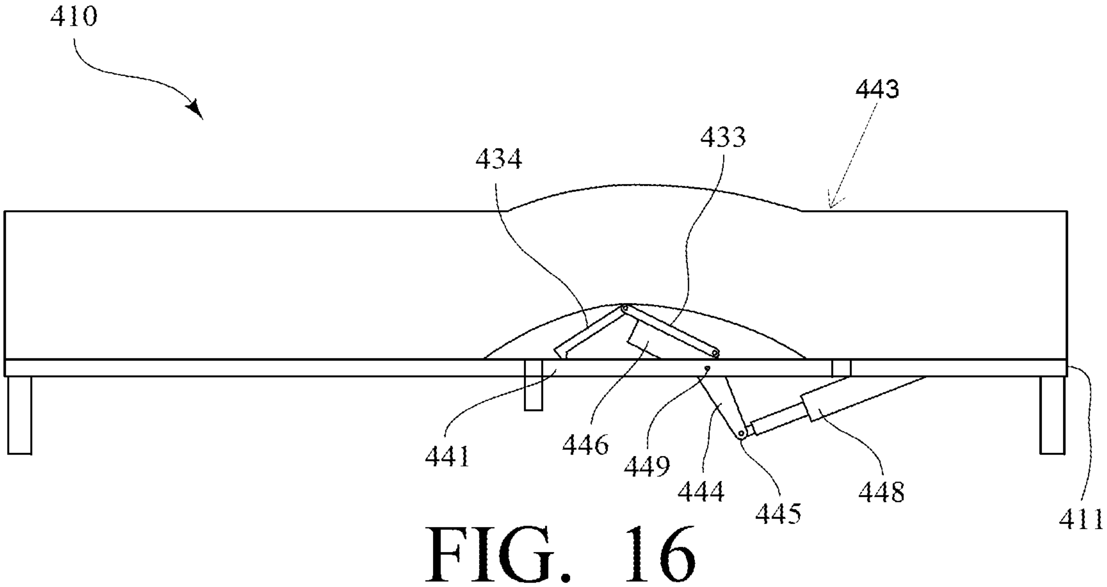
FIG. 16 is a side view of another exemplary adjustable base assembly made in accordance with the present invention and including a lumbar support structure.
Figure 17:
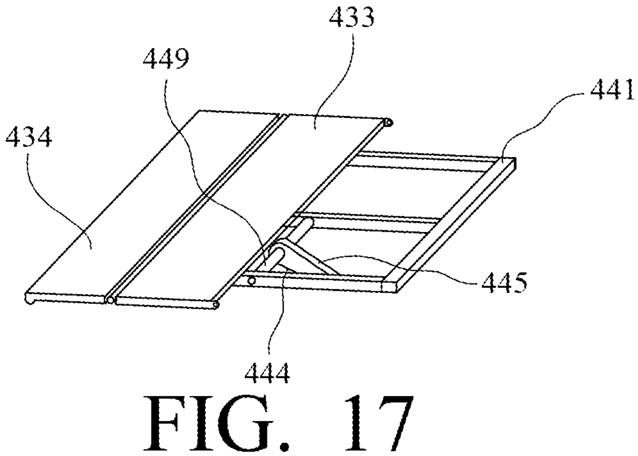
FIG. 17 is a perspective view of the lumbar support structure of the adjustable base assembly shown in FIG. 16.

As another refinement to the lumbar subframes and lumbar support structures utilized in the adjustable base assemblies of the present invention, in another embodiment and referring now to FIGS. 16-17, an adjustable base assembly 410 is provided that includes a fixed frame 411 and a lumbar subframe 441 connected to both a lumbar support structure 444 and to a lumbar actuator 448. Like the adjustable base assembly 310 shown in FIG. 15, the lumbar support structure 444 includes an upper section 445 and a lower section 446 as well as an upper lumbar panel 433 connected to a lower lumbar panel 434 by a hinge. However, in the adjustable base assembly 410, the upper section 445 of the lumbar support structure 444 is not covered by the upper lumbar panel 433 and the lower section 446 of the lumbar support structure 44 is not covered by the lower lumbar panel 434. Instead, in the adjustable base assembly 410, the lumbar support structure pivots about a cross member 449 connected to the lumbar subframe 441, with the upper section 445 of the lumbar support structure 444 extending at an angle below the lumbar subframe 441 and connected to the actuator 448 and with the lower section 446 of the lumbar support structure 444 being covered by the upper lumbar panel 433. In this regard, upon activation of the actuator 448, the upper section 445 of the lumbar support structure 444 is rotated downward to cause the lower section 446 of the lumbar support structure 444 to be rotated upward and away from the lumbar subframe 441. That rotation of the lumbar support structure 44 then causes the upper lumbar panel 433 to be rotated upward along with the lower lumbar panel 434 to provide lumbar support to a user resting on the adjustable base assembly 410.

Figure 18:
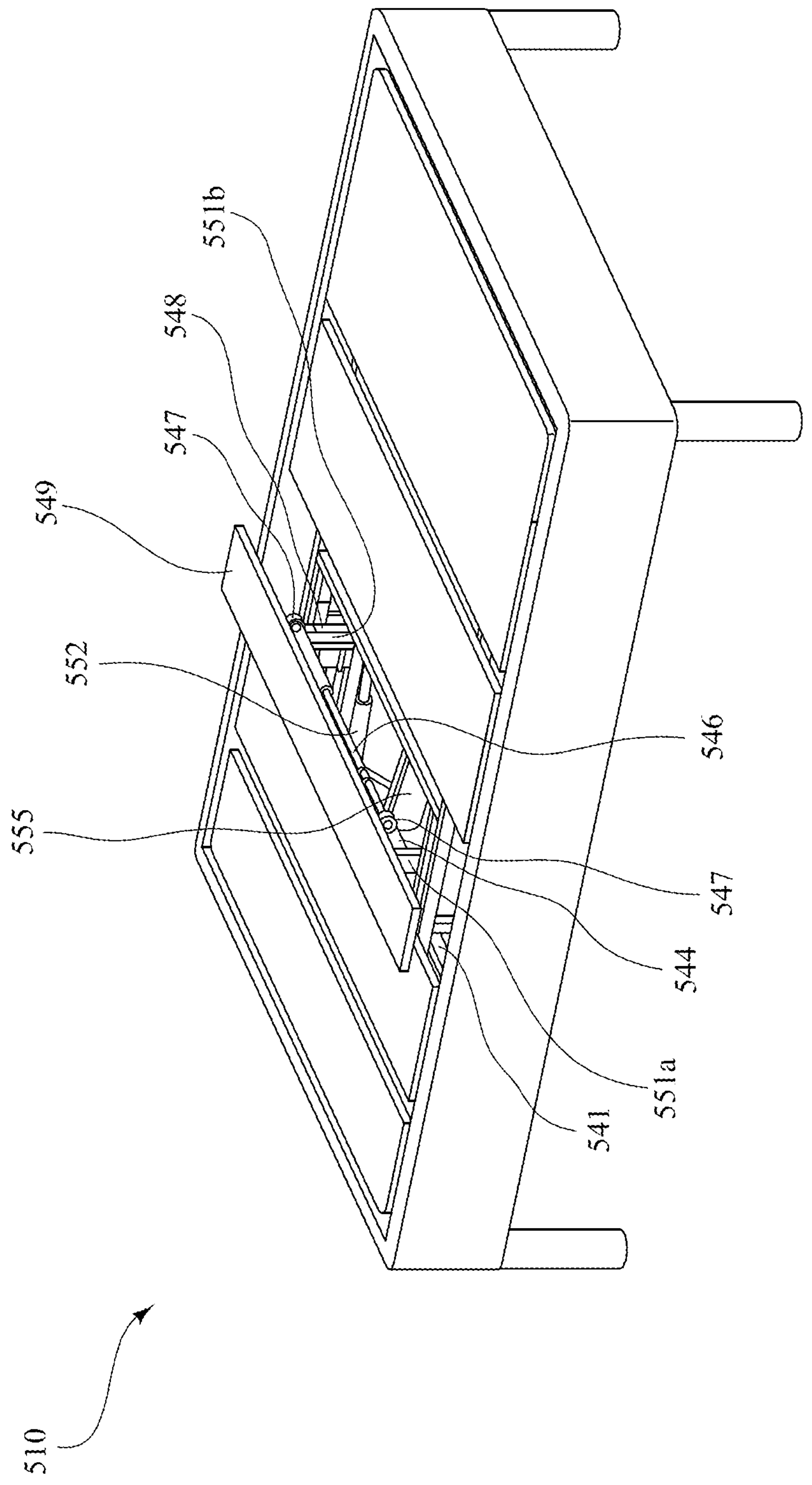
FIG. 18 is a perspective view of another adjustable base assembly made in accordance with the present invention and including an alternative lumbar support structure.

As yet another refinement to the lumbar subframe and lumbar support structures used in accordance with the adjustable base assemblies of the present invention, in other embodiments, an exemplary adjustable base assembly can be provided that not only allows a lumbar support structure to be moved upward to provide support to a user resting on an adjustable base assembly, but further allows the lumbar support structure to move linearly along the longitudinal axis of the adjustable base assembly and to be more closely positioned to the lumbar area of a user regardless of the user's height. For instance, in one embodiment and referring now to FIGS. 18 and 19A-19B, an adjustable base assembly 510 is provided that includes a lumbar subframe 541 and a lumbar support structure 544. The lumbar support structure 544 is pivotally connected to the lumbar subframe 541 and has a bottom edge 546 that is connected to a pair of wheels 547. The adjustable base assembly 510 further includes a pair of channels 548 slidably mounted to opposing sides of the lumbar subframe 541. A lumbar panel 549 is also included in the adjustable base assembly 510 and is positioned above the lumbar support structure 544 with the wheels 547 contacting the lumbar panel 549. The lumbar panel 549 then includes two leg portions 551*a*, 551*b* that each extend downwardly from the lumbar panel 549, such that each one of the two leg portions 551*a*, 551*b* is positioned in a respective one of the channels 548.

Figure 19A:
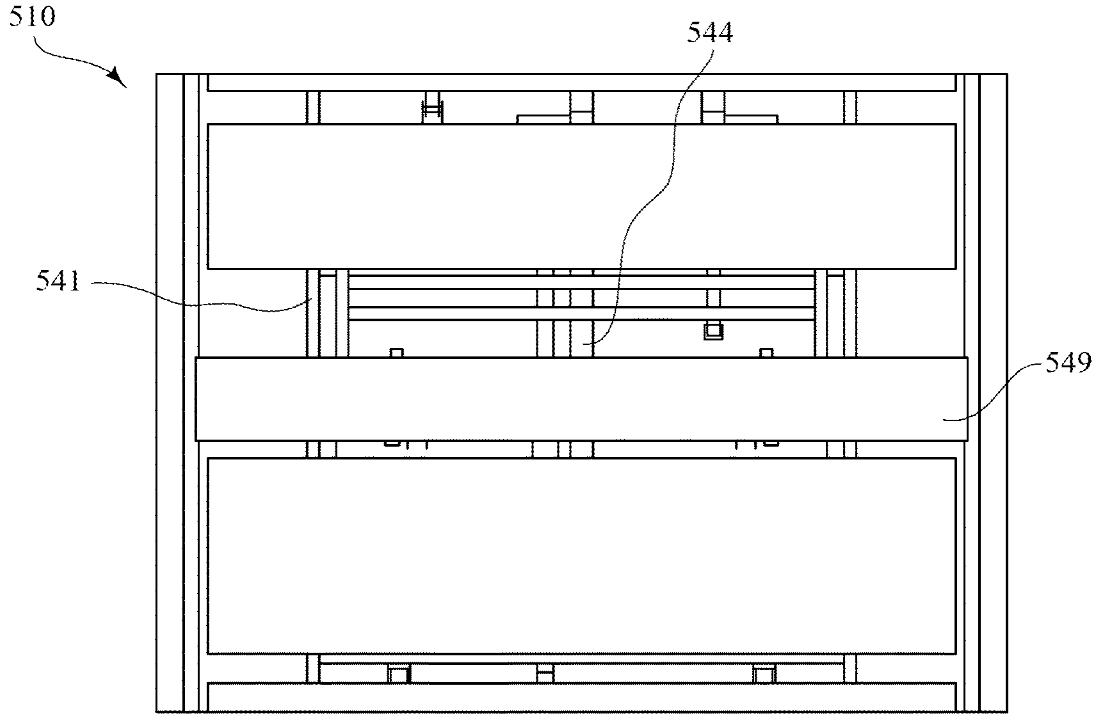
FIGS. 19A-19B are top views of the adjustable base assembly shown in FIG. 18, and showing the linear movement of a lumbar panel on the adjustable base assembly.
Figure 19B:
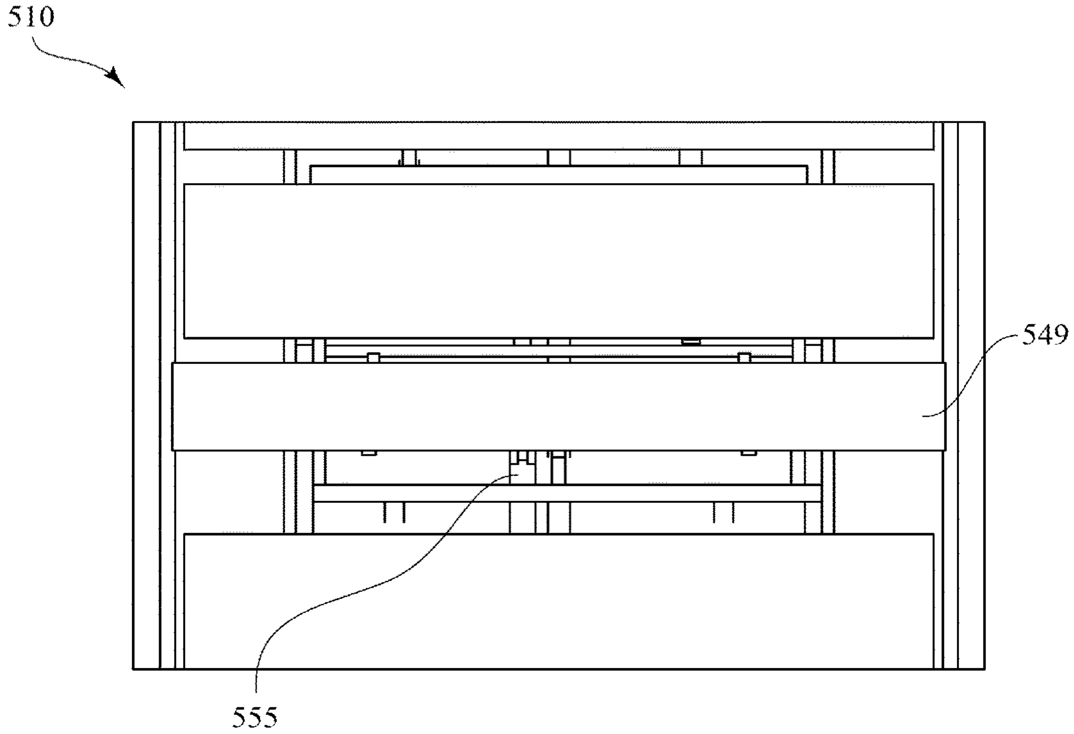

To provide support to the body of a user resting on the adjustable base assembly 510, the adjustable base assembly 510 further includes a lumbar actuator 552 that is operably connected to the lumbar support structure 544, such that, upon activation of the lumbar actuator 552, the lumbar support structure 544 is rotated upward against the lumbar panel 549 and the lumbar panel 549 consequently moves upward in a direction substantially perpendicular to the lumbar subframe 541 while each of the two leg portions 551*a*, 551*b* moves upward within the respective channels 548. To adjust the position of the lumbar panel 549 along the longitudinal axis of the adjustable base assembly 510, the adjustable base assembly 510 then further includes a linear actuator 555 that is operably connected to the lumbar panel 549 and allows the lumbar panel 549 to be moved along the longitudinal axis of the adjustable base assembly 510 and in a direction substantially parallel to the lumbar subframe 541. In this regard, the lumbar panel 549 can thus be moved downward along the longitudinal axis of the adjustable base assembly 510 in order to position the lumbar panel 549 to provide lumbar support to a user having a small height as shown in FIGS. 19A, but can also be moved upward along the longitudinal axis of the adjustable base assembly 510 in order to position the lumbar panel 549 to better provide lumbar support to a taller user having an increased height as shown in FIG. 19B. Of course, to move the lumbar panel 549 along the longitudinal axis of the adjustable base assembly 510, the linear actuator can be connected to the lumbar panel 549 itself or can be alternatively connected to the pair of channels 548, such that the channels 548 themselves are moved along the lumbar subframe 541. Furthermore, it is contemplated that numerous other types of actuators, including, in some embodiments, scissor lifts, can be utilized instead of or in addition to the lumbar actuators and/or the linear actuators described herein in order to move a lumbar support structure and/or a lumbar panel in an exemplary adjustable base assembly in a direction substantially parallel to or substantially perpendicular to a lumbar subframe.

Regardless of the particular configuration of the lumbar support structures and lumbar subframes, to even further improve the ergonomics of an exemplary adjustable base assembly of the present invention, each adjustable base assembly can further include a leg actuator that is operably connected to the leg frame of the exemplary adjustable base assembly and that can be used to articulate the leg frame into various positions to increase the comfort of a user. For example, and referring again to FIGS. 5-8, in the exemplary adjustable base assembly 10, the adjustable base assembly 10 further includes a leg actuator 110 that has a first end 111 connected to the third connector frame member 27 at the lower section 23 of the fixed frame 11 and a second end 112 that is pivotally connected to the thigh subframe 61 adjacent to the foot subframe 62. In this regard, upon activation of the leg actuator 110, the leg actuator 110 pushes upward against and raises one side of the thigh subframe 61 adjacent to the foot subframe 62, while the other side of the thigh subframe 61 remains connected and adjacent to the second connector frame member 26 of the fixed frame 11.

As the side of the thigh subframe 61 adjacent to the foot subframe 62 continues to be raised due to continued activation of the leg actuator 110, that side of the thigh subframe 61 then also begins to be pushed toward the seat frame 50, which, in turn, not only causes the foot subframe 62 to be raised, but further causes the foot subframe 62 to begin to move away the lower section 23 of the fixed frame 11 and toward the central section 22 of the fixed frame 11. That movement of the foot subframe 62 toward the central section 22 of the fixed frame 11, however, is offset by the linking arms 86*a*, 86*b* that, as described above, are connected to the foot subframe 62 and to the internal side frame members 24*a*, 24*b* at the lower section 23 of the fixed frame 11 and that act against the upward movement of the foot subframe 62 by virtue of their fixed length. By making use of the linking arms 86*a*, 86*b* connected to foot subframe 62 in conjunction with the thigh subframe 61 that is connected to the non-articulating fixed frame 11 of the adjustable base assembly 10, the foot subframe 62 thus remains positioned adjacent to the lower section 23 of the fixed frame 11 as the upper body frame 40 is articulated and as the seat frame 50 moves toward the upper section 21 of the fixed frame 11. In other words, by making use of a leg frame 60 that does not significantly move toward the upper section 21 of the fixed frame 11 when the adjustable base assembly 10 is articulated, the adjustable base assembly 10 avoids the creation of an unsightly and undesirable gap between a mattress positioned on the articulating frame 30 and the fixed frame 11 at the foot of the adjustable base assembly 10.

Referring again to FIGS. 1-4, to support a mattress, such as the mattress 170 shown in FIG. 1, on the adjustable base assembly 10, the adjustable base assembly 10 further includes a plurality of support panels 31, 32, 33, 36, 37, 38 attached to the articulating frame 30 and to the fixed frame 11. In particular, the adjustable base assembly 10 includes a head panel 31 attached to the head subframe 43, a torso panel 32 attached to the torso subframe 42, a lumbar panel 33 attached to the lumbar support structure 44, a seat panel 36 attached to the second connector frame member 26 at the central section 22 of the fixed frame 11, a thigh panel 37 attached to the thigh subframe 61, and a foot panel 38 attached to the foot subframe 62. By attaching the support panels 31, 32, 33, 36, 37, 38 to either the articulating frame 30 or to the fixed frame 11, the head panel 31, the torso panel 32, the lumbar panel 33, the thigh panel 37, and the foot panel 38 are thus configured to move with either the upper body frame 40 or the leg frame 60 upon articulation of the adjustable base assembly 10, while the seat panel 36 is configured to remain in position along the central section 22 of the fixed frame 11. As such, when the adjustable base assembly 10 is articulated and the seat frame 50 and the upper body frame 40 move toward the upper section 21 of the fixed frame 11, the lumbar panel 33 and the seat panel 36 thus further define the gap 29 that is created between the upper body frame 40 and the leg frame 60.

With further respect to the support panels 31, 32, 33, 36, 37, 38 included in the adjustable base assembly 10, the head panel 31, the torso panel 32, the lumbar panel 33, the seat panel 36, the thigh panel 37, and the foot panel 38 are each generally planar structures that lie flat on the respective areas of the articulating frame 30 and the fixed frame 11 so as to provide a flat surface on which the mattress 170 can rest. The head panel 31, the torso panel 32, the lumbar panel 33, the seat panel 36, the thigh panel 37, and the foot panel 38 are each generally comprised of wood or other sufficient hard and rigid material, with the lumbar panel 33 further including a padding 35 on the lower edge 34 of the lumbar panel 33 to provide a softer and more comfortable contact point with the lumbar region of a user when the lumbar support structure 44 is articulated and to further improve the contour of a mattress 170. The articulating frame 30 and the fixed frame 11, on the other hand, are typically comprised of a metal, such as aluminum, that is light enough to allow the adjustable base assembly 10 to be transported, but that is also strong enough to support the various support panels and allow the adjustable base assembly 10 to be articulated. In this regard, various means can, of course, be used to secure the support panels 31, 32, 33, 36, 37, 38 to the articulating frame 30 and the fixed frame 11, including screws, nuts and bolts, and the like. In the exemplary adjustable base assembly 10, however, each of the support panels 31, 32, 33, 36, 37, 38 are attached to the articulating frame 30 or to the fixed frame 11 using bolts that extend through the articulating frame 30 or the fixed frame 11 and connect to a nut configured to be flush with the surface of each of the support panels 31, 32, 33, 36, 37, 38.

Figure 20A:
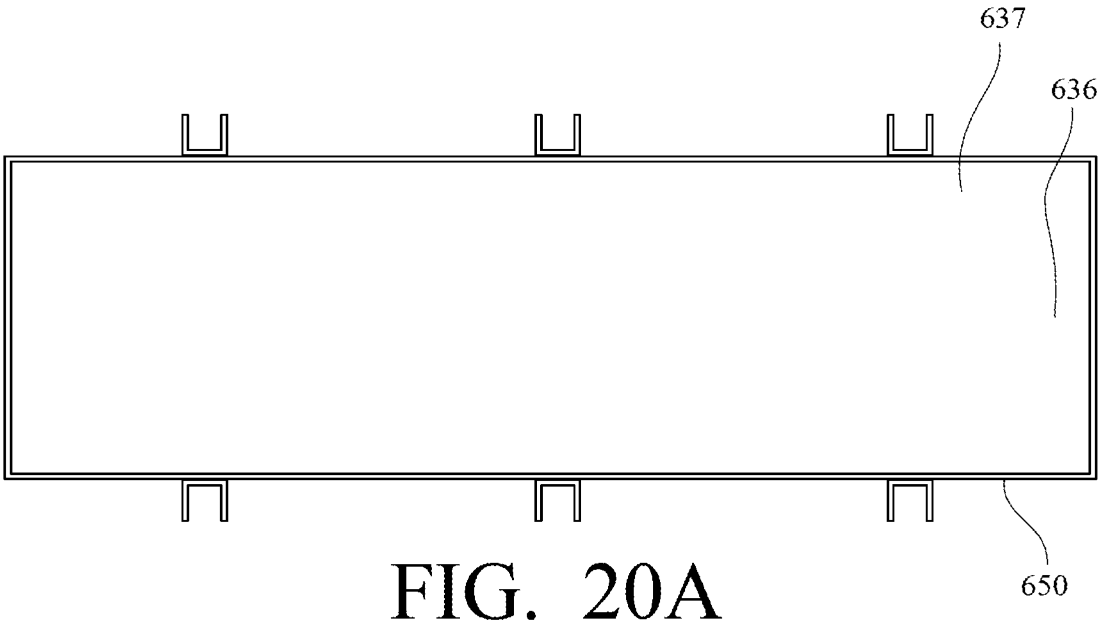
FIG. 20A includes a top view of an exemplary support panel used in accordance with the adjustable bases of the present invention.
Figure 20B:
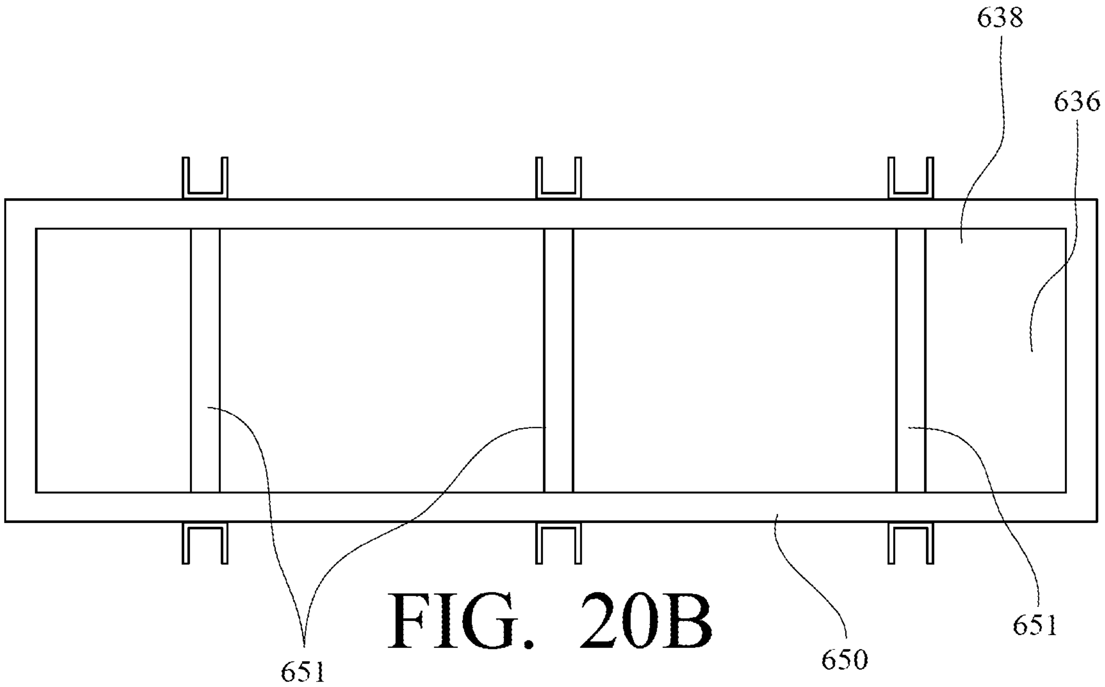
FIG. 20B includes a bottom view of the exemplary support panel shown in FIG. 20A.

With further respect to the support panels included in an exemplary adjustable base assembly of the present invention, although the support panels 31, 32, 33, 36, 37, 38 shown in FIGS. 1-4 are generally comprised of planar pieces of wood that are placed atop and are secured directly to the underlying articulating frame 30 or to the fixed frame 11 of the adjustable base assembly 10, it is also contemplated that the support panels attached to the exemplary adjustable base assemblies can also be provided in various other configurations, including configurations where the support panels are integrated directly into the subframes making up an articulating frame of an exemplary adjustable base assembly. For example, in one embodiment, and as shown in FIGS. 20A-20B, a support panel 636 is placed inside a subframe 650, such that the support panel 636 is surrounded by the subframe 650 with the top surface 637 of the support panel exposed and with the bottom surface 638 of the support panel 636 supported by three frame supports 651. Such a support panel 636 and subframe 650 can be directly incorporated into an exemplary adjustable base assembly, including sections of an upper body frame, a seat frame, and/or a leg frame of exemplary adjustable base assembly to improve not only the visual presentation of the adjustable base assembly, but to also provide a weight reducing alternative to constructions employing separate support panels positioned atop and secured to an underlying subframe. In some further embodiments, and although not shown in FIG. 16, a fabric cover 443 (e.g., a textile cover, such as a cotton cover) can further be used to cover the support panel 636 and the subframe 650 in order to further improve the appearance of an exemplary adjustable base assembly.

With further respect to the mattresses placed atop the exemplary adjustable base assemblies of the present invention, in some embodiments, the mattresses, are comprised of a flexible foam for suitably distributing pressure from a user's body or portion thereof across the adjustable base assemblies. Such flexible foams include, but are not limited to, latex foam, reticulated or non-reticulated visco-elastic foam (sometimes referred to as memory foam or low-resilience foam), reticulated or non-reticulated non-visco-elastic foam, polyurethane high-resilience foam, expanded polymer foams (e.g., expanded ethylene vinyl acetate, polypropylene, polystyrene, or polyethylene), and the like. For example, in the embodiment shown in FIG. 1, the mattress 170 is comprised of a visco-elastic foam that has a low resilience as well as a sufficient density and hardness, which allows pressure to be absorbed uniformly and distributed evenly across the of the mattress. Generally, such visco-elastic foams have a hardness of at least about 10 N to no greater than about 80 N, as measured by exerting pressure from a plate against a sample of the material to a compression of at least 40% of an original thickness of the material at approximately room temperature (i.e., 21° C. to 23° C.), where the 40% compression is held for a set period of time as established by the International Organization of Standardization (ISO) 2439 hardness measuring standard. In some embodiments, the visco-elastic foam has a hardness of about 10 N, about 20 N, about 30 N, about 40 N, about 50 N, about 60 N, about 70 N, or about 80 N to provide a desired degree of comfort and body-conforming qualities.

The visco-elastic foam described herein for use in the exemplary adjustable base assemblies can also have a density that assists in providing a desired degree of comfort and adjustable base- and body-conforming qualities, as well as an increased degree of material durability. In some embodiments, the density of the visco-elastic foam used in an exemplary mattress has a density of no less than about 30 $kg/m^3$ to no greater than about 150 $kg/m^3$. In some embodiments, the density of the visco-elastic foam used in the body supporting layer 20 of the mattress assembly 10 is about 30 $kg/m^3$, about 40 $kg/m^3$, about 50 $kg/m^3$, about 60 $kg/m^3$, about 70 $kg/m^3$, about 80 $kg/m^3$, about 90 $kg/m^3$, about 100 $kg/m^3$, about 110 $kg/m^3$, about 120 $kg/m^3$, about 130 $kg/m^3$, about 140 $kg/m^3$, or about 150 $kg/m^3$. Of course, the selection of a visco-elastic foam having a particular density will affect other characteristics of the foam, including its hardness, the manner in which the foam responds to pressure, and the overall feel of the foam, but it is appreciated that a visco-elastic foam having a desired density and hardness can readily be selected for a particular application or adjustable base assembly as desired. Additionally, it is appreciated that the mattresses utilized with an exemplary adjustable base assembly need not be comprised of flexible foam at all, but can also take the form of more traditional mattresses, including spring-based mattresses, without departing from the spirit and scope of the subject matter described herein.

Figure 9:
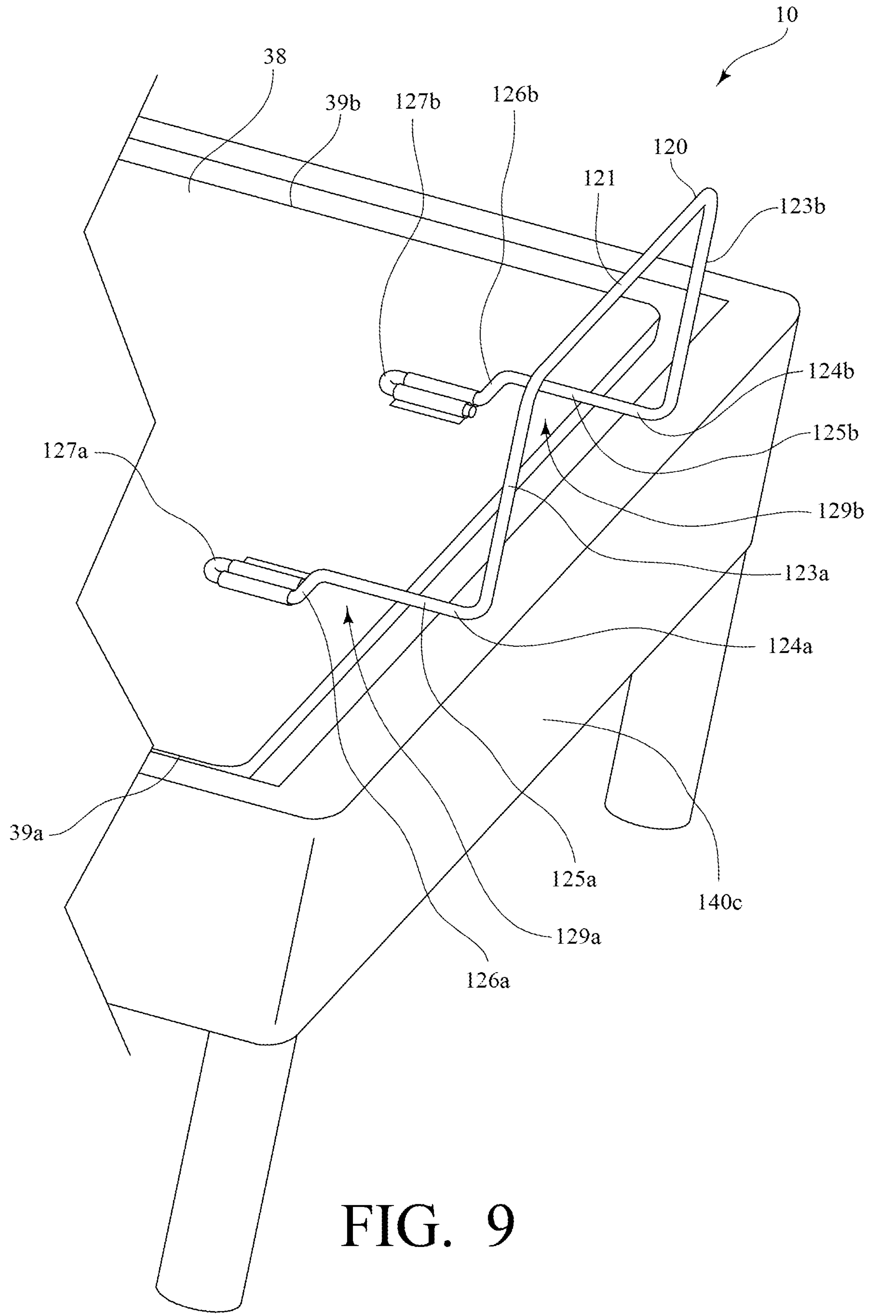
FIG. 9 is a partial perspective view of the front of the adjustable base assembly of FIG. 1, and showing a retainer bar attached to the foot panel of the adjustable base assembly.
Figure 10A:
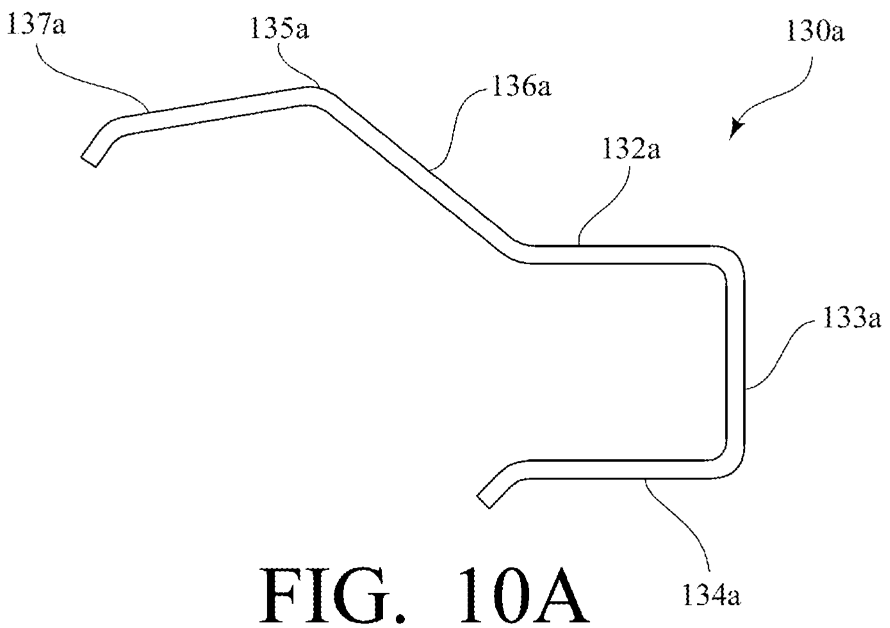
FIG. 10A is a side view of an exemplary mounting bracket made in accordance with the present invention.
Figure 10B:
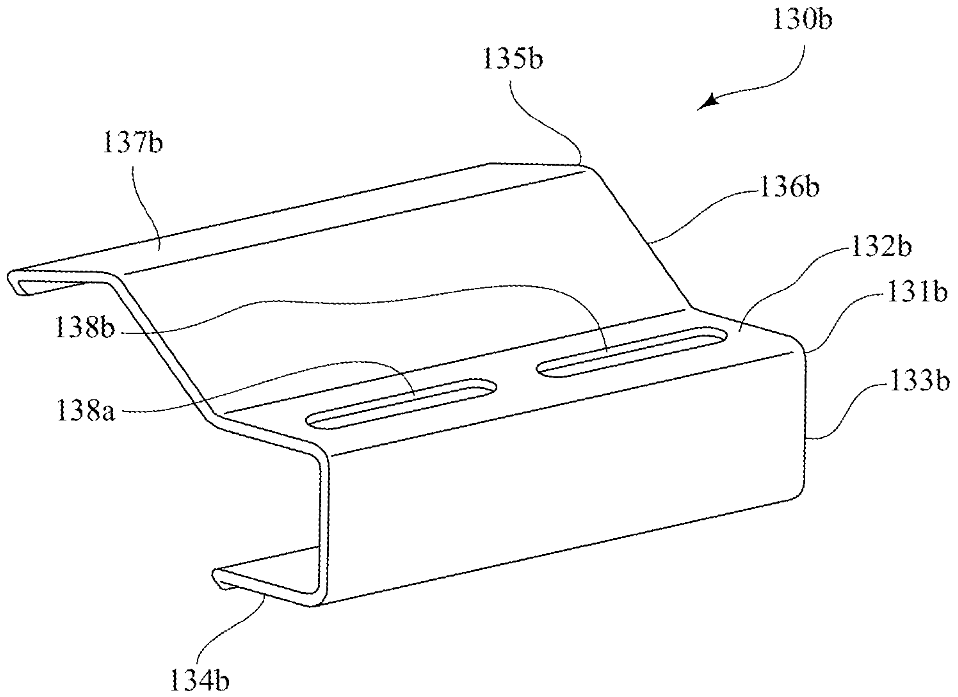
FIG. 10B is a perspective view of an exemplary mounting bracket made in accordance with the present invention.
Figure 11:
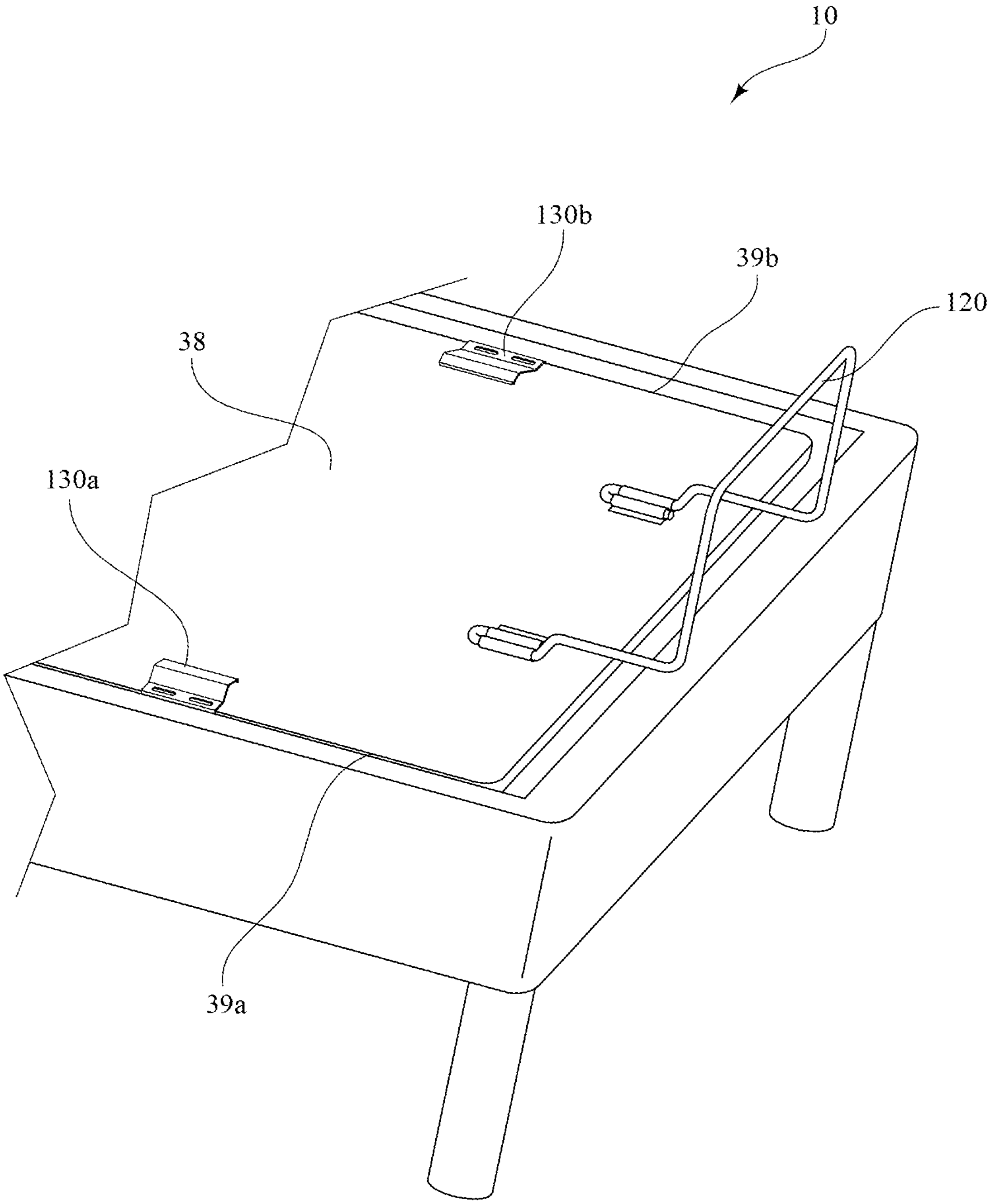
FIG. 11 is another partial perspective view of the adjustable base assembly of FIG. 1 similar to FIG. 9, and further showing the mounting brackets of FIGS. 10A-10B mounted around the foot panel of the base.
Figure 12:
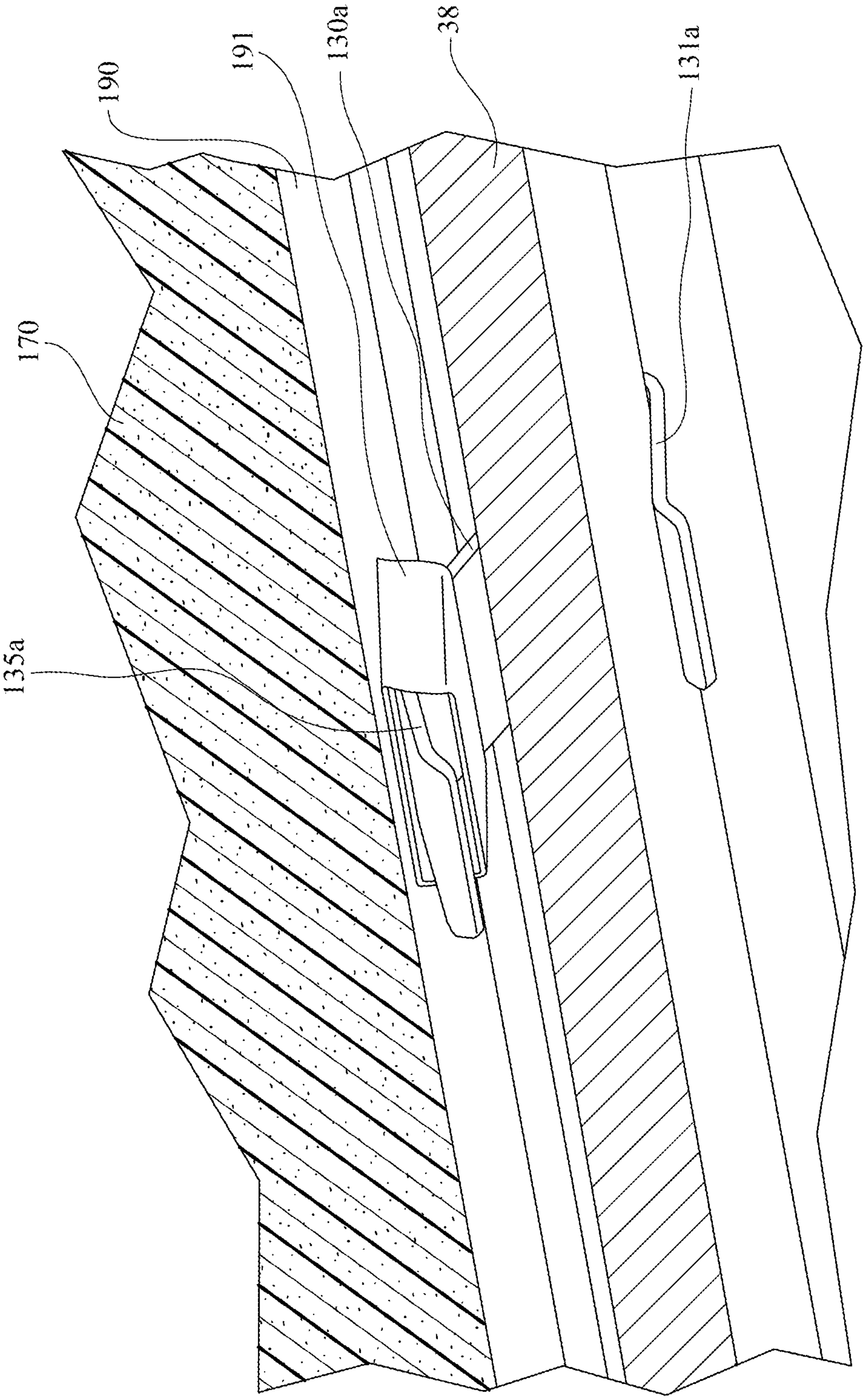
FIG. 12 is a partial sectional view of the adjustable base assembly of FIG. 1, but further showing one of the mounting brackets placed in a loop connected to the bottom of a cover for the mattress.

Irrespective of the type or configuration of the support panels or mattresses included in an exemplary adjustable base assembly of the present invention, and referring now to FIGS. 1 and 9, to keep a mattress, such as the mattress 170, positioned atop the support panels 31, 32, 33, 36, 37, 38 and prevent the mattress 170 from sliding off the support panels 31, 32, 33, 36, 37, 38 as the adjustable base assembly 10 is articulated, the adjustable base assembly 10 further includes a retainer bar 120 that is attached to the foot panel 38 of the adjustable base assembly 10. The retainer bar 120 includes a cross segment 121 and two vertical legs 123*a*, 123*b* that extend downwardly from each end of the cross segment 121 towards the foot panel 38. The retainer bar 120 further includes a riser segment 124*a*, 124*b* extending from each of the two vertical legs 123*a*, 123*b*, with each riser segment 124*a*, 124*b* including a proximal portion 125*a*, 125*b*, a middle portion 126*a*, 126*b*, and a distal portion 127*a*, 127*b*. The proximal portion 125*a*, 125*b* of each riser segment 124*a*, 124*b* of the retainer bar 120 extends from a respective one of the two vertical legs 123*a*, 123*b* in a direction substantially perpendicular to each of the at least two vertical legs 123*a*, 123*b*. The middle portion 126*a*, 126*b* of each riser segment 124*a*, 124*b* then extends from the proximal portions 125*a*, 125*b* downwardly at an angle from each proximal portion 125*a*, 125*b*, while the distal portion 127*a*, 127*b* of each riser segment 124*a*, 124*b* extends from the middle portion 126*a*, 126*b* in a direction substantially perpendicular to the two vertical legs 123*a*, 123*b* and is attached to the foot panel 38. By configuring each riser segment 124*a*, 124*b* to include a middle portion 126*a*, 126*b* that extends downwardly from a proximal portion 125*a*, 125*b* and to include a distal portion 127*a*, 127*b* that extends from the proximal portion 125*a*, 125*b* in a direction perpendicular to the two vertical legs 123*a*, 123*b*, upon attachment of the distal portion 127*a*, 127*b* of each riser segment 124*a*, 124*b* to the foot panel 38, each riser segment 124*a*, 124*b* thus defines a space 129*a*, 129*b* between the proximal portion 125*a*, 125*b* of each riser segment 124*a*, 124*b* and the foot panel 38. As such, the retainer bar 120 allows not only the mattress 170 to remain positioned on the adjustable base assembly 10 upon articulation, but the retainer bar 120 further allows a user to easily cover the mattress 170 with a sheet without picking up or otherwise raising the mattress 170 by simply placing the sheet around both the mattress 170 and the retainer bar 120 and then tucking the sheet into the spaces 129*a*, 129*b* defined between the proximal portion 125*a*, 125*b* of each riser segment 124*a*, 124*b* and the foot panel 38.

To further restrain the movement of the mattress 170 on the adjustable base assembly 10, and referring now to FIGS. 1, 10A-10B, and 11-12, the adjustable base assembly 10 also includes a pair of mounting brackets 130*a*, 130*b* with one mounting bracket 130*a* being attached to one side edge 39*a* of the foot panel 38 and the other mounting bracket 130*b* being attached to the other side edge 39*b* of the foot panel 38, and with each of the mounting brackets 130*a*, 130*b* being substantially identical to one another. In particular, each of the mounting brackets 130*a*, 130*b* includes a U-shaped portion 131*a*, 131*b* that is configured for mounting each of the mounting brackets 130*a*, 130*b* around the foot panel 38, and a mounting portion 135*a*, 135*b* that is configured to secure each of the mounting brackets 130*a*, 130*b* to the mattress 170. In this regard, each U-shaped portion 131*a*, 131*b* includes a top segment 132*a*, 132*b*, a bottom segment 134*a*, 134*b* opposite the top segment 132*a*, 132*b*, and a side segment 133*a*, 133*b* that extends between and connects the top segment 132*a*, 132*b* and the bottom segment 134*a*, 134*b* of each of the mounting brackets 130*a*, 130*b*. Each of the side segments 133*a*, 133*b* also defines two holes 138*a*, 138*b* in each top segment 132*a*, 132*b*, such that the U-shaped portions 131*a*, 131*b* can be positioned around the foot panel 38 and then one or more screws or other fastening devices can be inserted into the holes 138*a*, 138*b* of each top segment 132*a*, 132*b* to secure the mounting brackets 130*a*, 130*b* to the foot panel 38.

To secure the mattress 170 to the adjustable base assembly 10, the mounting portion 135*a*, 135*b* of each mounting bracket 130*a*, 130*b* includes a first segment 136*a*, 136*b* that is connected to the top segment 132*a*, 132*b* of each of the U-shaped portions 131*a*, 131*b* and that extends away from the U-shaped portions 131*a*, 131*b* at an upward angle. Each mounting portion 135*a*, 135*b* further includes a second segment 137*a*, 137*b* that is connected to the first segment 136*a*, 136*b*, but that extends away from the U-shaped portion 131*a*, 131*b* of each mounting bracket 130*a*, 130*b* at a downward angle, such that the mounting portion 135*a*, 135*b* of each mounting bracket 130*a*, 130*b* has an inverted V-shape that allows each of the mounting portions 135*a*, 135*b* to be positioned in a loop 191 included on a cover 190 surrounding the mattress 170 to thereby secure the mattress 170 on the adjustable base assembly 10.

As described above with reference to FIGS. 1-4, to provide a decorative appearance and cover the external frame members 12*a*, 12*b*, 13, 14 of the exemplary adjustable base assembly 10, the adjustable base assembly 10 also includes a number of side rails 140*a*, 140*b*, 140*c*, 140*d* attached to the external frame members 12*a*, 12*b*, 13, 14. Various means of securing the side rails 140*a*, 140*b*, 140*c*, 140*d* to the external frame members 12*a*, 12*b*, 13, 14 can be used in this regard including bolts, screws, snap-on fasteners, and the like. As a refinement to the typical means of securing side rails to external frame members on an adjustable base assembly, however, in a further embodiment and referring now to FIGS. 21 and 22, an adjustable base assembly 710 is provided that, like the adjustable base assembly 10 described above with reference to FIGS. 1-4, includes an external foot frame member 713 extending across the width of the adjustable base assembly 710. The adjustable base assembly 710 further includes a side rail 740 that has an interior surface 743 and an exterior surface 744 and that is configured to be attached to the external foot frame member 713. Unlike the adjustable base assembly shown in FIGS. 1-12, however, the external foot frame member 713 is not comprised of a single beam of metal. Rather, in the adjustable base assembly 710, the external foot frame member 713 includes an upper beam 745 and a lower beam 746 spaced apart from and below the upper beam 745 with the upper beam 745 further defining a groove 747 extending along the length of the upper beam 745.

To attach the side rail 740 to the foot frame member 713, the side rail 740 further includes a plurality of brackets 748 with each of the brackets 748 having a hooked portion 749 to allow each of the brackets 748 to be attached to the foot frame member 713 by hanging the hooked portion 749 in the groove 747 defined by the upper beam 745. By attaching the side rail 740 to the foot frame member 713 in such a manner, the side rail 740 can readily be removed to allow access to portions of the adjustable base assembly 10 (e.g., for servicing) or to allow the side rails 740 to be replaced with an alternative side rail having a different appearance (e.g., a wood paneled side rail as opposed to a metallic side rail) as desired. In this regard, to ensure that the side rail 740 is properly aligned upon attachment or re-attachment of the side rail 740, the side rail 740 can further include one or more magnets embedded in a first end 741 of the side rail 740 and one or more magnets embedded in a second end 742 of the side rail 740 that would then align with additional magnets or metal contact points in a portion of the adjustable base assembly 10 itself or in an adjacent side rail. Of course, it is appreciated that each of the above-described features are not limited to the external foot frame member 713 and associated side rail 740 shown in FIG. 21, but can also be incorporated into the external side frame members and the external head frame member of an exemplary adjustable base assembly, as well the side rails associated with those external frame members, without departing from the spirit and scope of the present invention.

Figure 21:
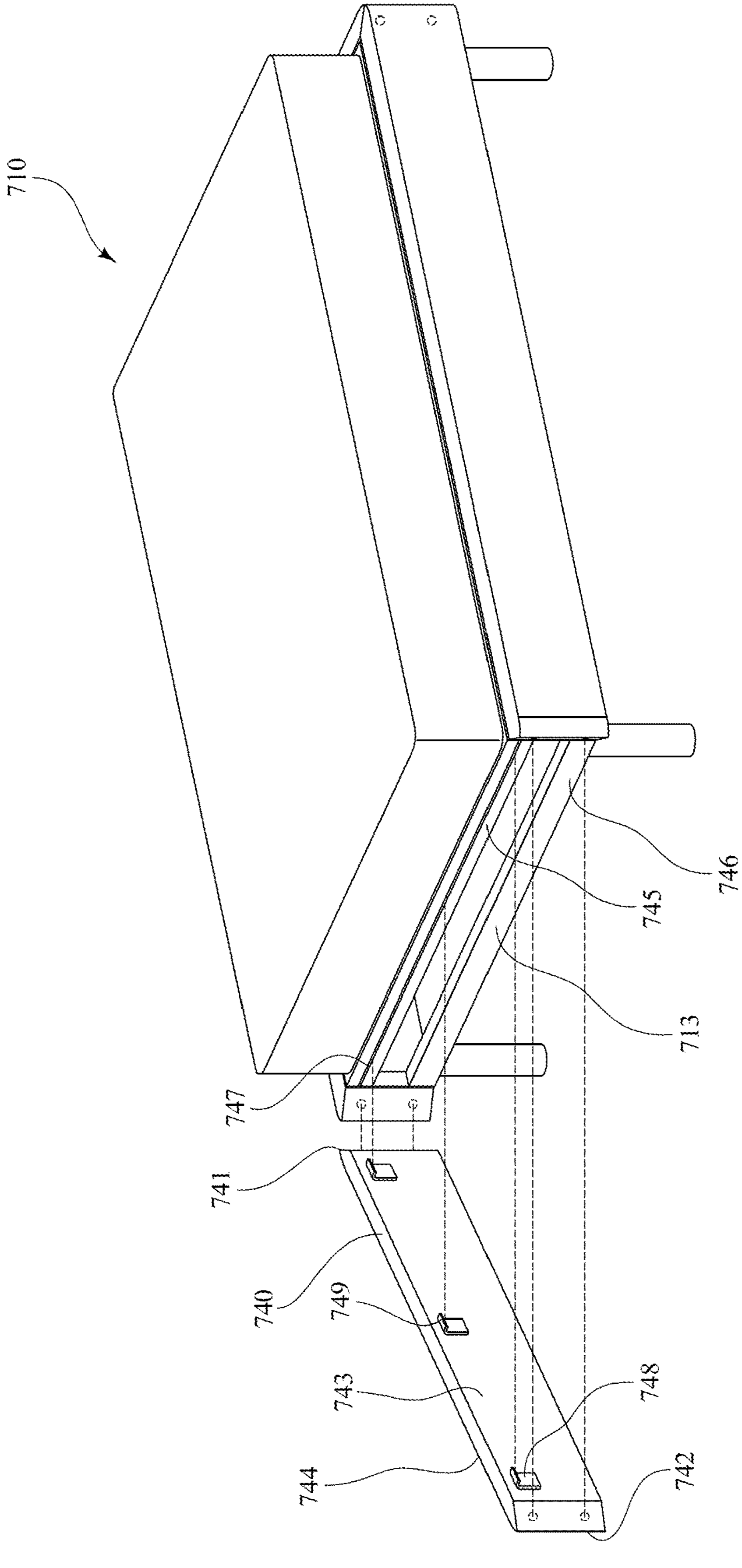
FIG. 21 is a perspective view of another adjustable base assembly made in accordance with the present invention, and showing an exemplary side rail removed from the foot frame member of the adjustable base assembly.
Figure 22:
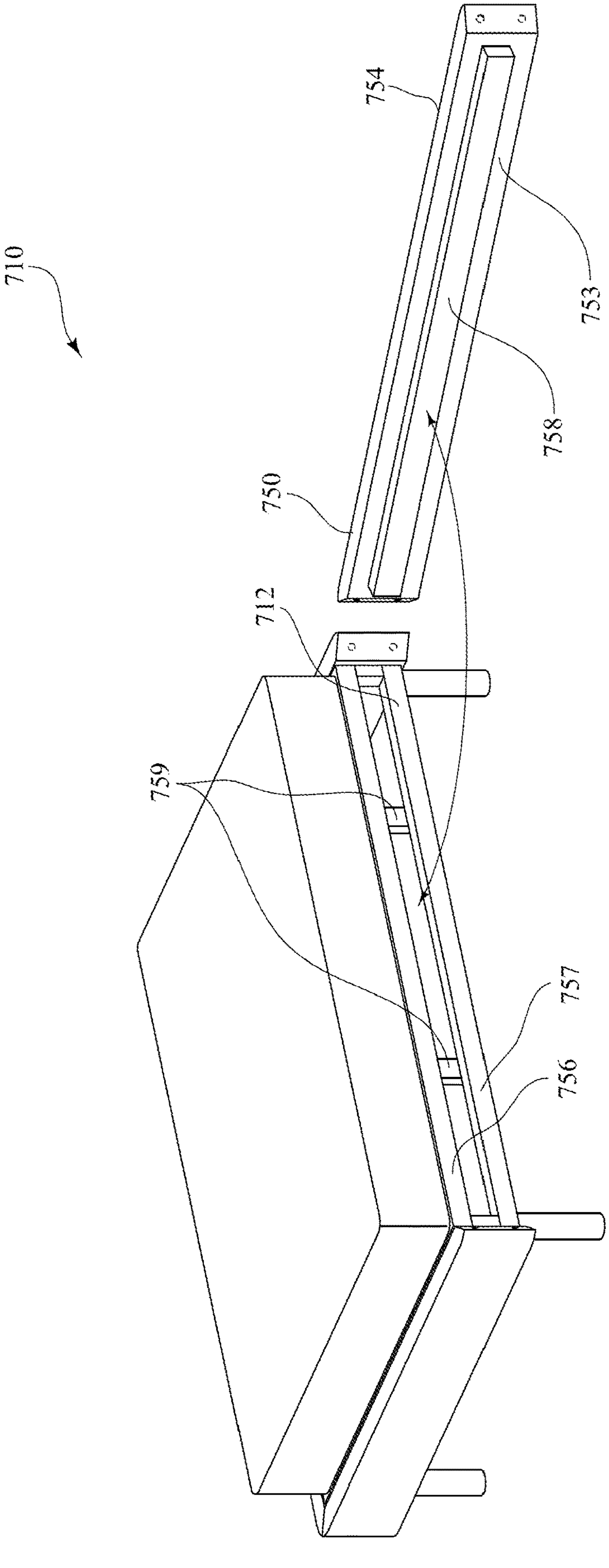
FIG. 22 is a partial perspective view of the adjustable base assembly of FIG. 21, and showing an exemplary side rail removed from an external side frame member of the adjustable base assembly.

As another refinement to the side rails used in the adjustable base assemblies of the present invention, and referring now to FIGS. 21 and 22, in addition to including a foot frame member 713, the exemplary adjustable base assembly 710 also includes an external side frame member 712 that extends along the length of the adjustable base assembly 710 and that includes an upper beam 756 and a lower beam 757 spaced apart from one another with two framing strips 759 extending between and connecting the upper beam 756 to the lower beam 757. The adjustable base assembly 710 then further includes an additional side rail 750 that has an interior surface 753 and an exterior surface 754, and that is configured to be connected to the external side frame member 712. Instead of including brackets having a hooked portion to the connect the additional side rail 750 to the external side frame member 712, however, the additional side rail 750 includes a rigid panel 758 that is secured to and extends along the length of the interior surface 753 of the side rail 750 and that is generally comprised of wood (e.g., oriented strand board or OSB) or other sufficiently rigid material. The rigid panel 758 typically has a width that allows it to be positioned between the upper beam 756 and the lower beam 757 of the external side frame member 712, and then secured to each of the two framing strips 759 using screws or other similar fasteners. Upon attachment of the additional side rail 750 to the external side frame member 712, and by virtue of the positioning of the rigid panel 758 between the upper beam 756 and the lower beam 757 of the external side frame member 712, the rigid panel 758 thus effectively serves as an additional structural component of the external side frame member 712 and, in turn, allows the external side frame member 712 to require less metal framing to provide the requisite structural support and allows the adjustable base assembly 710 as a whole to have a lesser weight.

Figure 23:
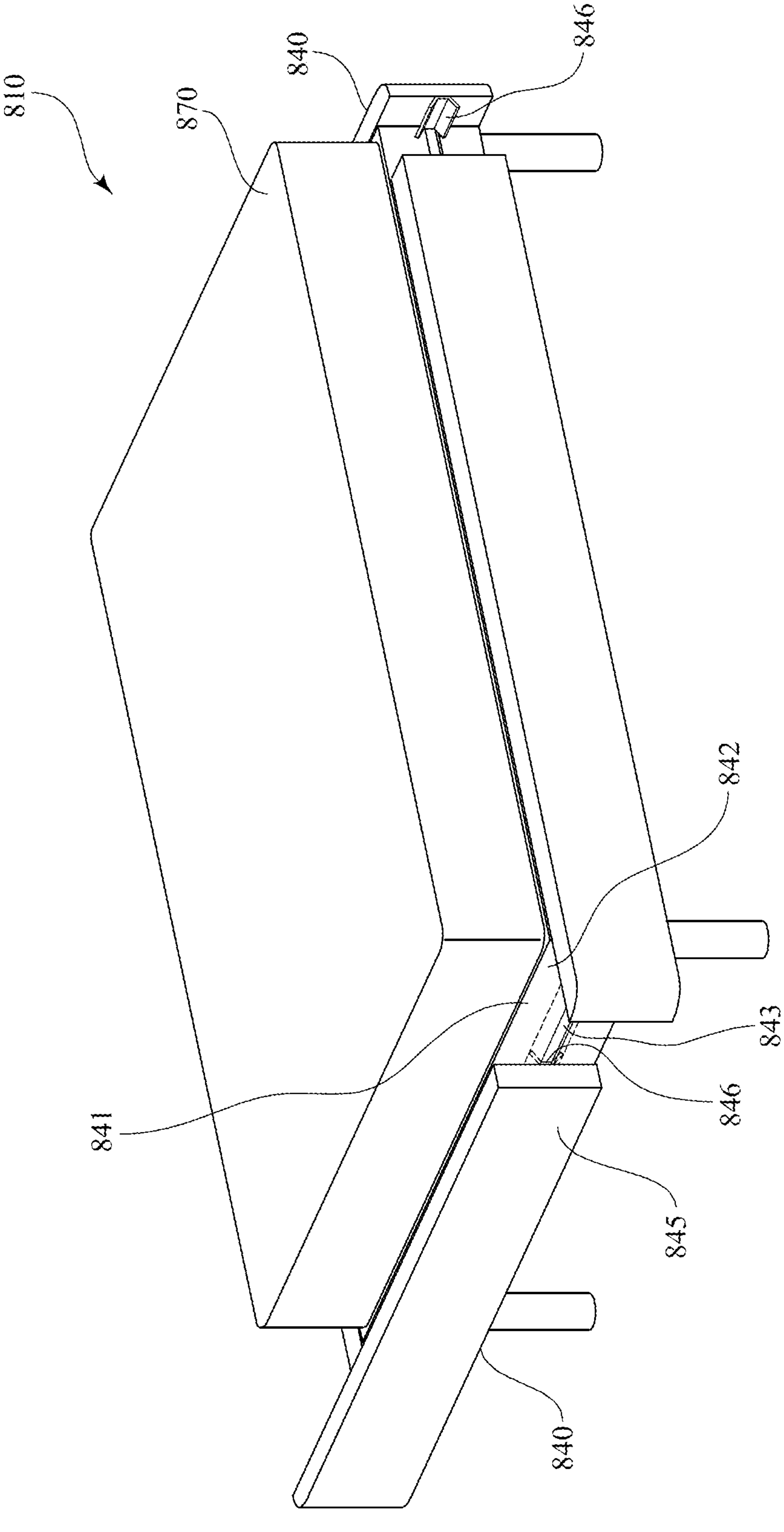
FIG. 23 is a perspective view of another exemplary base assembly for a mattress made in accordance with the present invention, and showing another exemplary side rail removably attached to the base assembly.

As a further refinement to the side rails included in the adjustable base assemblies of the present invention, various other features can also be incorporated into an exemplary side rail to provide a side rail that can easily be attached and removed as desired. For example, as shown in FIG. 23, in another embodiment of the present invention, a base assembly 810 for a mattress 870 is provided that includes a side rail 840 comprised of an interior rail 841 and an exterior rail 845. The interior rail 841 includes an outer surface 842 defining a groove 843 extending along the length of the outer surface 842, while the exterior rail 845 includes a bracket 846 having a shape that corresponds to the shape of the groove 843 in the interior rail 841. As such, to attach the exterior rail 845 to the interior rail 841, the bracket 846 is slid into the groove 843 of the interior rail 841 and the exterior rail 845 is advanced along the interior rail 841 until it is placed in a desired position. Then, to remove the exterior rail 845 from the interior rail 841, such as to replace the exterior rail 845 with an alternative exterior rail having a different appearance, the bracket 846 of the exterior rail 845 can be slid along the groove 843 of the exterior rail 845 until it is fully removed from the groove 843.

Figure 24:
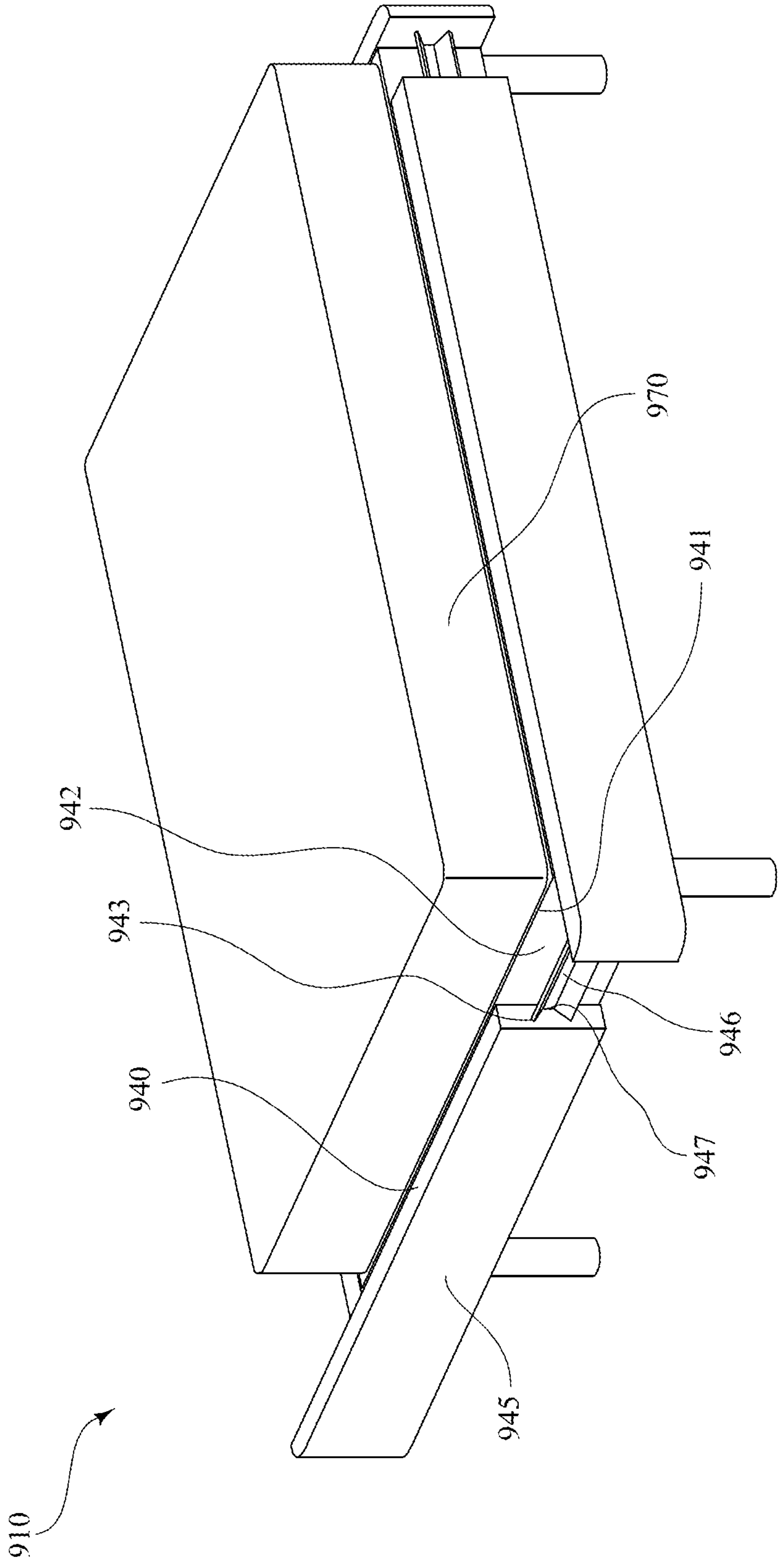
FIG. 24 is a perspective view of another exemplary base assembly for a mattress made in accordance with the present invention, and showing another exemplary side rail removably attached to the base assembly.

Of course, alternative arrangements of a bracket and groove system for attaching and removing side rails to the base for a mattress can also be produced. For instance, and as another example of a side rail that can easily be removed from a base assembly and referring now to FIG. 24, in another embodiment of the present invention, a base assembly 910 for a mattress 970 is provided that again includes a side rail 940 comprised of an interior rail 941 and an exterior rail 945. However, instead of having an interior rail defining a groove and the exterior rail including a corresponding bracket as in the exemplary base assembly 810 shown in FIG. 23, the side rail 940 of the base assembly 910 is comprised of an interior rail 941 with a bracket 946 attached to an outer surface 942 of the interior rail 941, and an exterior rail 945 defining a groove 943 along an inner surface 947 of the exterior rail 945 and having a shape configured to accept the bracket 946 and allow the exterior rail 945 to be removably attached to the interior rail 941.

Figure 25A:
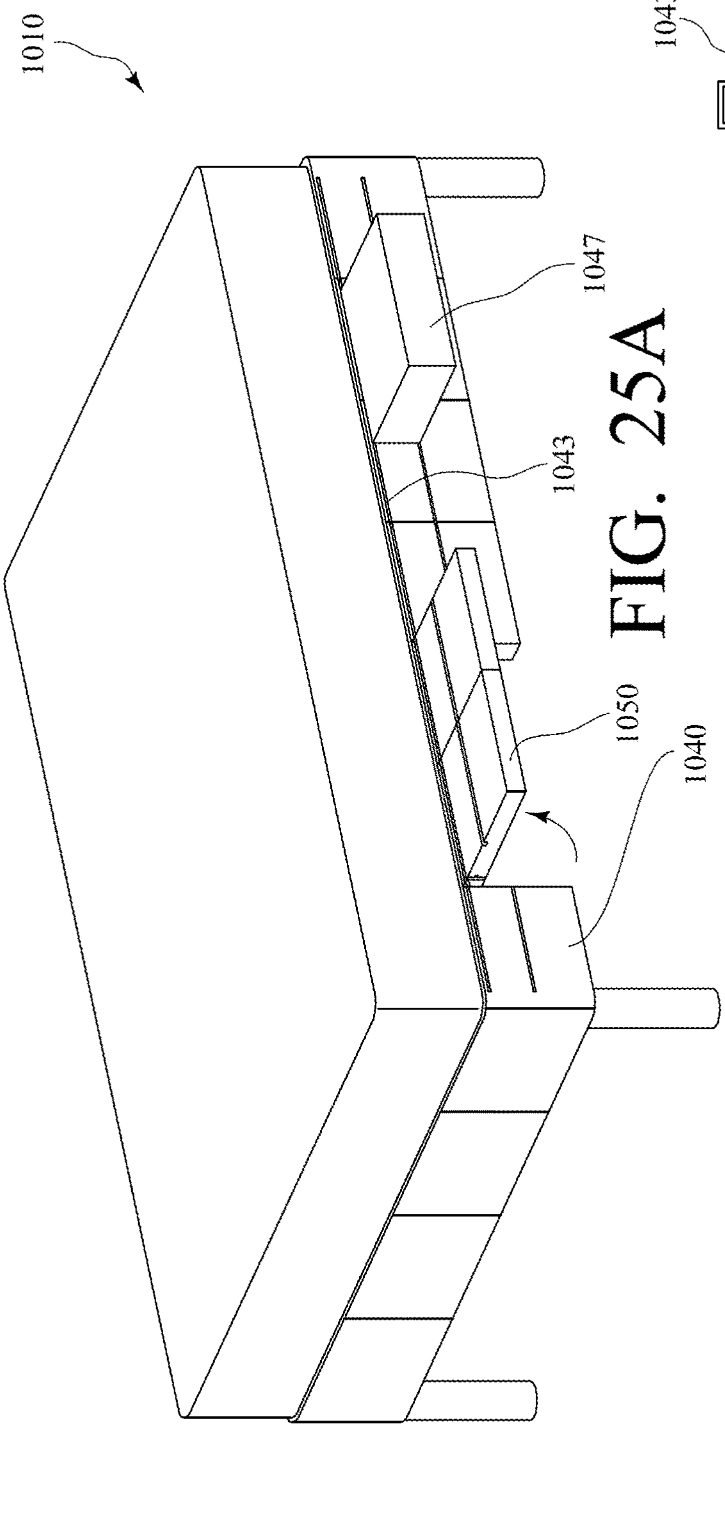
FIG. 25A is a perspective view of another exemplary base assembly for a mattress made in accordance with the present invention, and showing a panel section pivotally connected to a side rail of the base and a groove extending along the side rail and attached to a corresponding bracket on a table accessory.
Figure 25B:
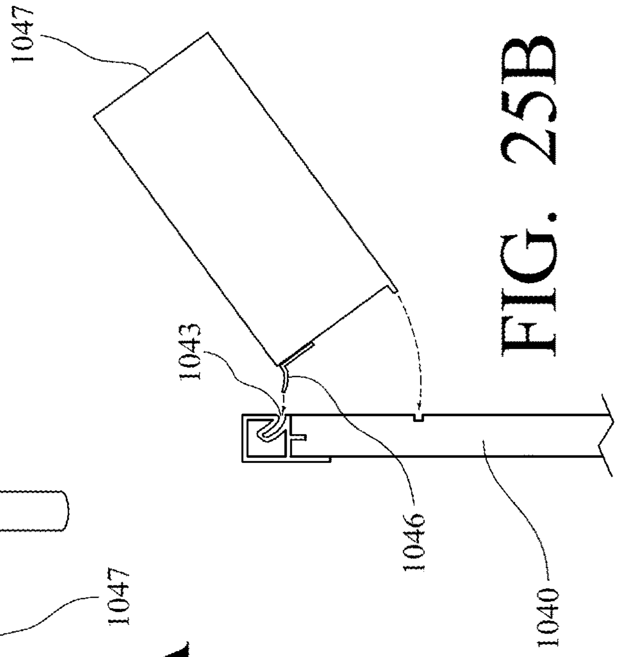
FIG. 25B is a partial side view of the exemplary base assembly of FIG. 25A, and showing the attachment of the table accessory to the groove extending along the side rail of the adjustable base assembly.

As an even further refinement to the side rails included in the adjustable base assemblies of the present invention, additional features can also be incorporated into an exemplary side rail to increase the functionality of both the side rail and an exemplary adjustable base itself. For instance, and referring now to FIGS. 25A-25B, in another embodiment, a further adjustable base assembly 1010 is provided that includes a side rail 1040 having a groove 1043 extending along the side rail 1040 that allows a table 1047 to be mounted to the side rail 1040 via a corresponding bracket 1046 attached to the table 1047. The side rail 1040 further includes a panel section 1050 pivotally connected to the remainder of the side rail 1040 and that can be rotated upward to allow access to underneath the adjustable base assembly 1010, such as for storage or other purposes. In this regard, it is further appreciated that various other accessories, including but not limited to flip-out pockets, fold out tables, and the like can also be incorporated into a side rail of an exemplary adjustable base assembly without departing from the spirit and scope of the present invention.

Figure 26:
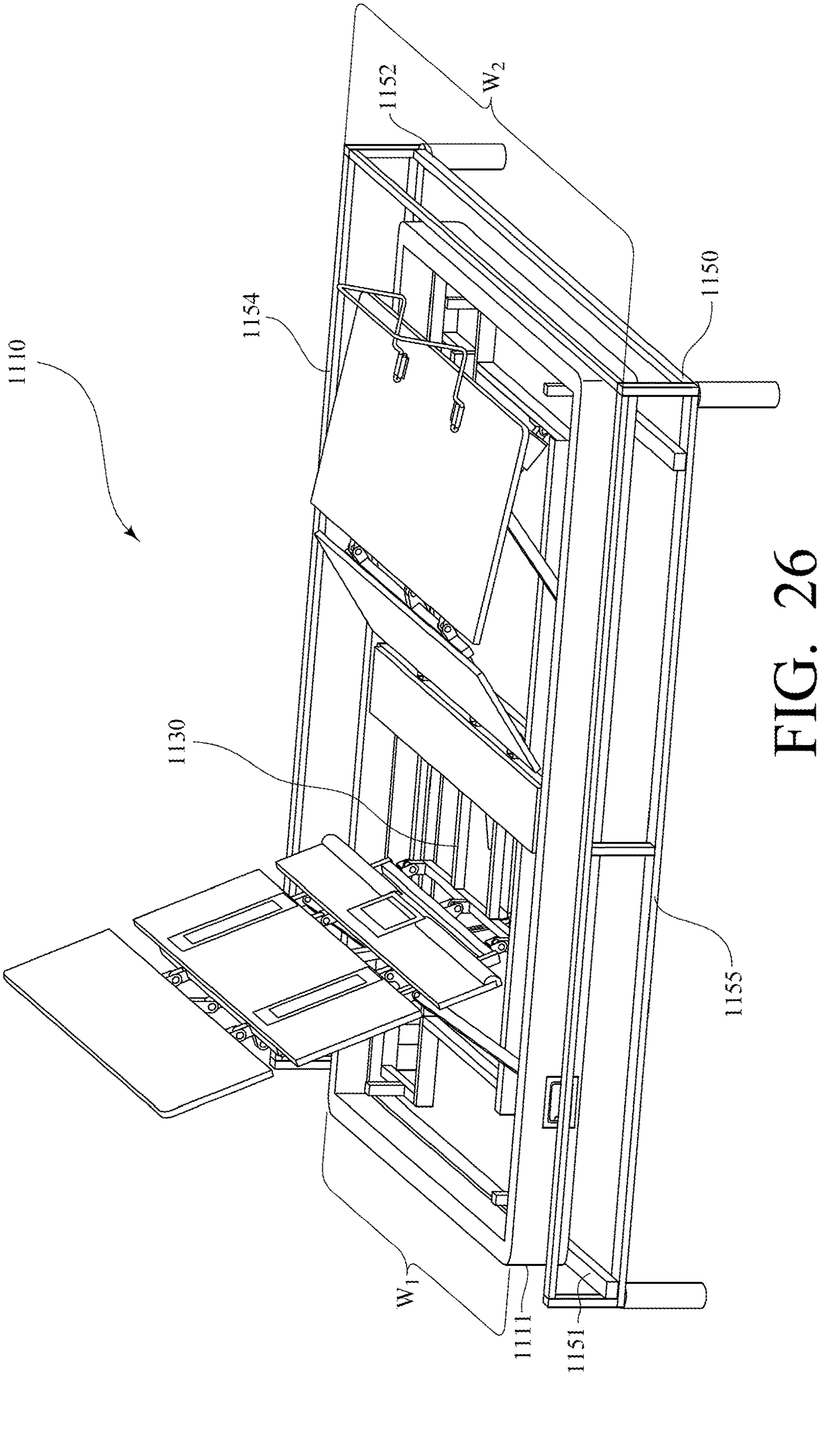
FIG. 26 is a perspective view of another exemplary adjustable base assembly for a mattress made in accordance with the present invention, and showing an articulating frame attached to an outer frame having a width greater than the articulating frame.

As yet another refinement to the adjustable base assemblies of the present invention, although the exemplary adjustable base assembly 10 described herein with reference to FIGS. 1-12 has a length and a width similar to that found in a typical mattress, such as the mattress 170, lying atop the adjustable base assembly 10, it is further contemplated that an adjustable base assembly of the present invention can be incorporated into a larger frame structure to allow an exemplary adjustable base assembly to be provided in a single size and then used to support mattress having a length or a width larger than that of the exemplary adjustable base assembly (e.g., a queen or a king size mattress). For example, and referring now to FIG. 26, in an additional exemplary embodiment of the present invention, an adjustable base assembly 1110 is provided that includes a fixed frame 1111 connected to an articulating frame 1130. The adjustable base assembly 1110 comprises an outer frame 1150 connected to the fixed frame 1111, with the outer frame 1150 including a head frame 1151, a foot frame 1152, and two opposing side frames 1154, 1155 that collectively form a substantially rectangular shape having a width, W2, greater than the width, W1, of the fixed frame 1111 and/or the articulating frame 1130 so as to support a mattress having a width that is also greater than that of the fixed frame 1111 and/or the articulating frame 1130.

Figure 27A:
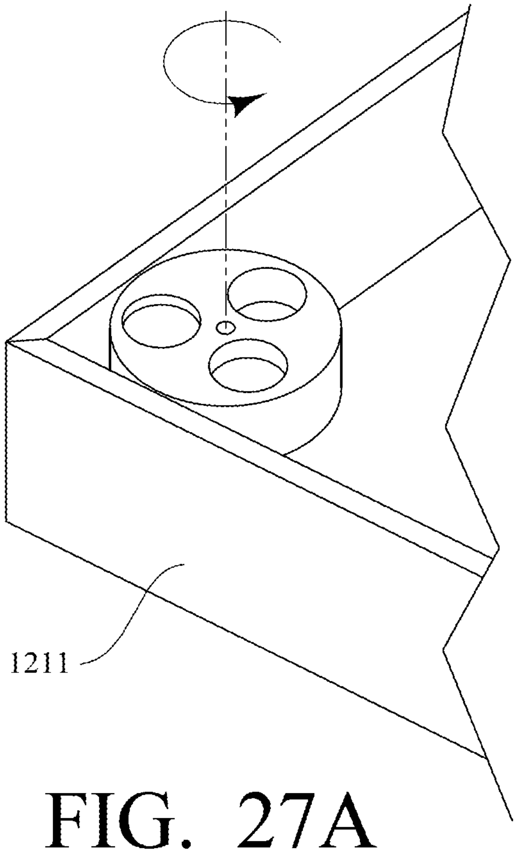
FIGS. 27A-27B are schematic diagrams of an exemplary leg assembly made in accordance with the present invention.
Figure 27B:
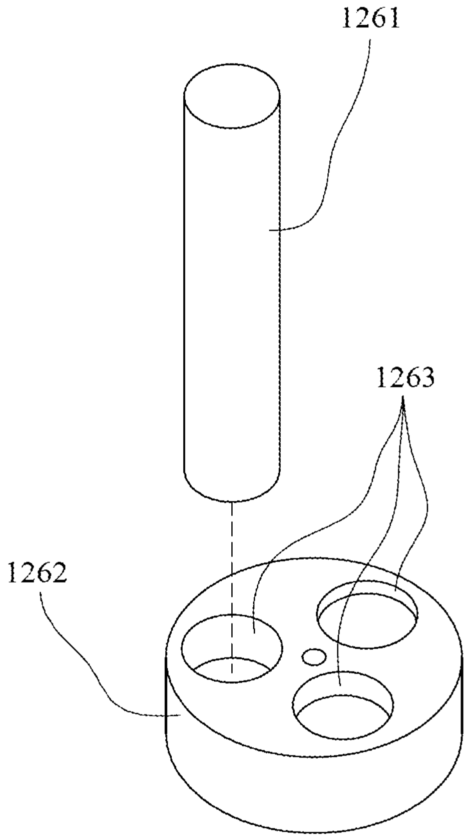
Figure 28B:
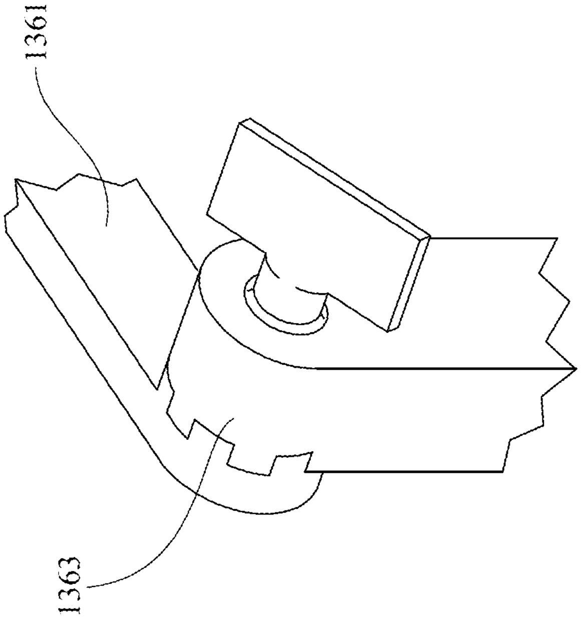
FIGS. 28A-28B are schematic diagrams of another exemplary leg assembly made in accordance with the present invention.
Figure 28A:
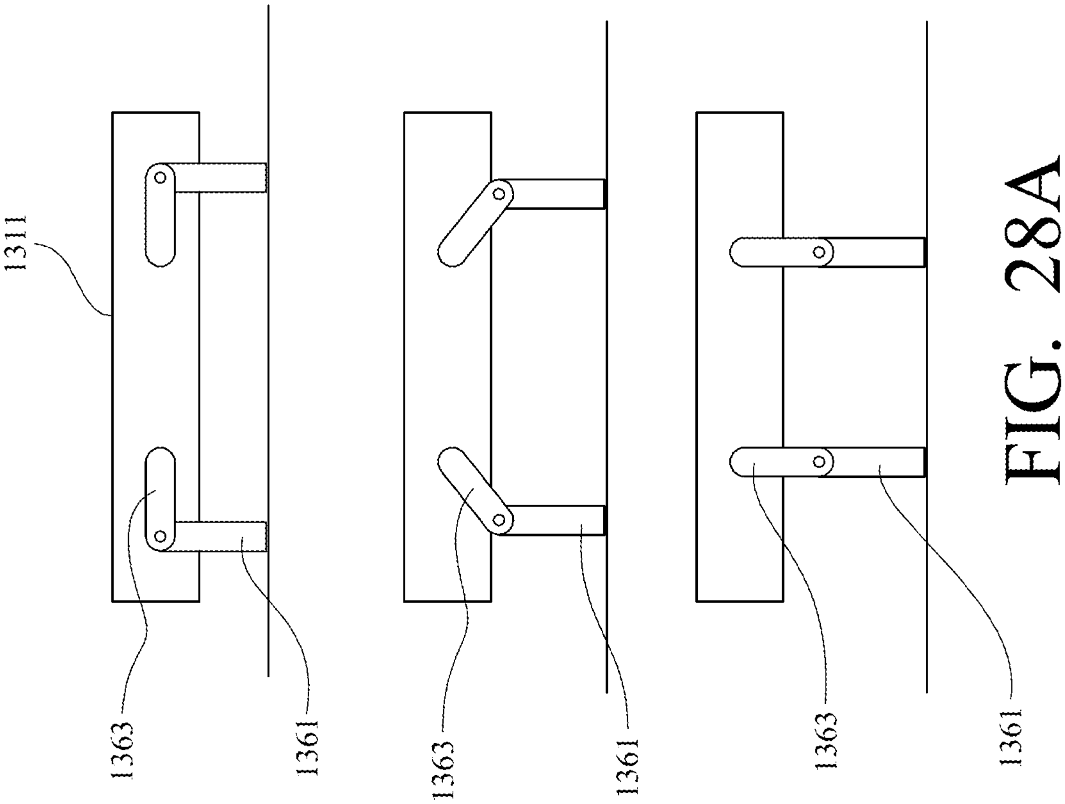
Figure 29A:
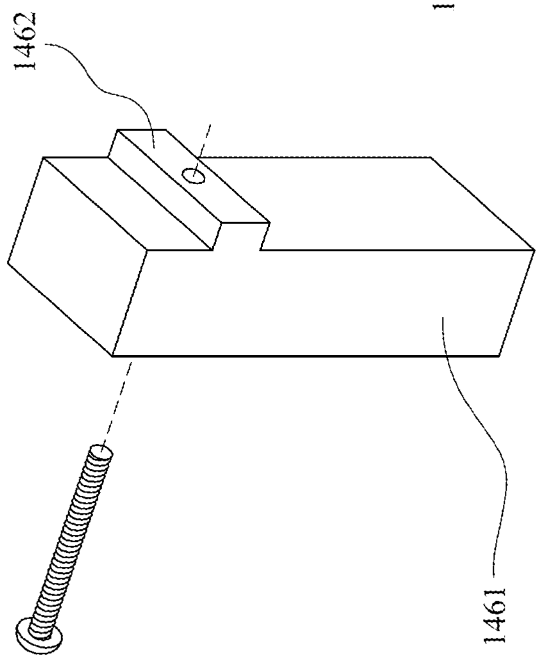
FIGS. 29A-29C are schematic diagrams of another exemplary leg assembly made in accordance with the present invention.
Figure 29B:
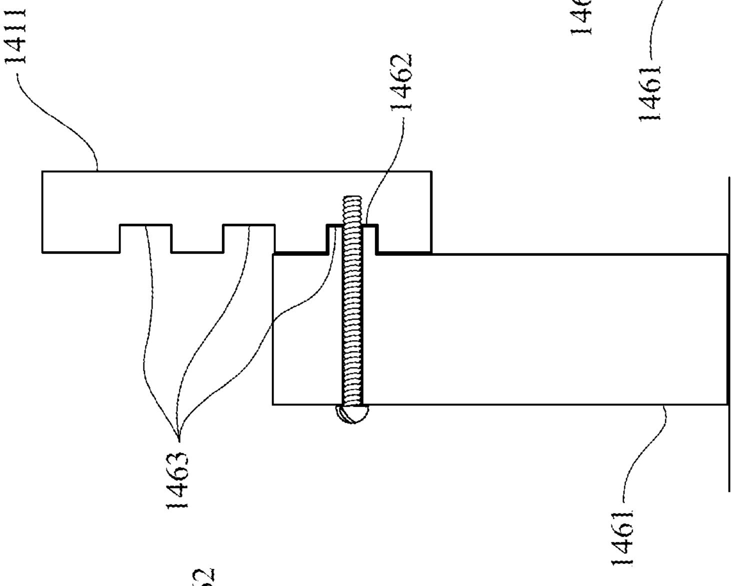
Figure 29C:
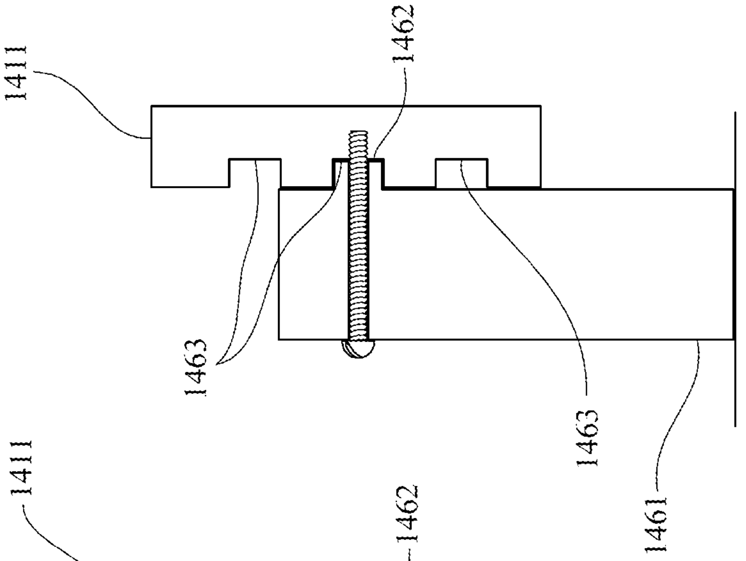
Figure 30A:
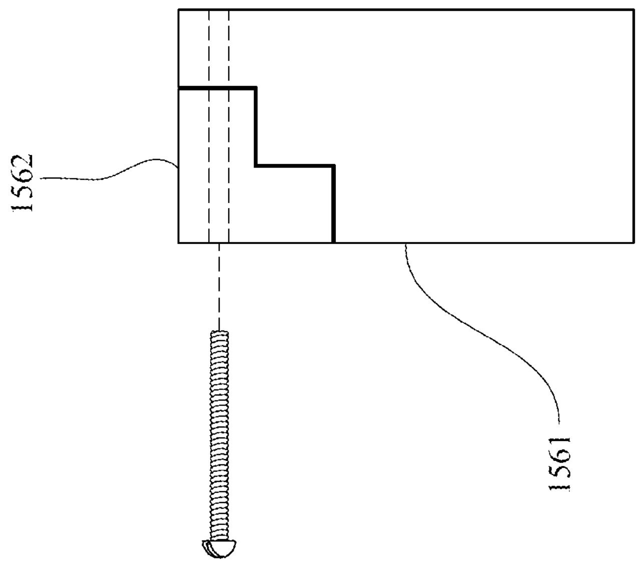
FIGS. 30A-30B are schematic diagrams of another exemplary leg assembly made in accordance with the present invention.
Figure 30B:
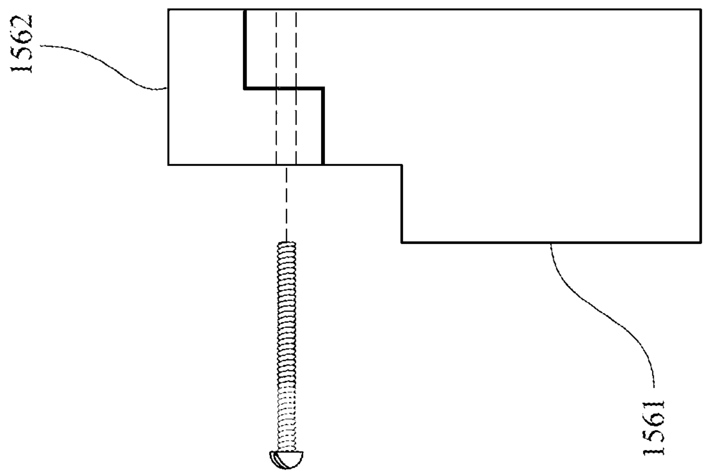
Figure 31B:
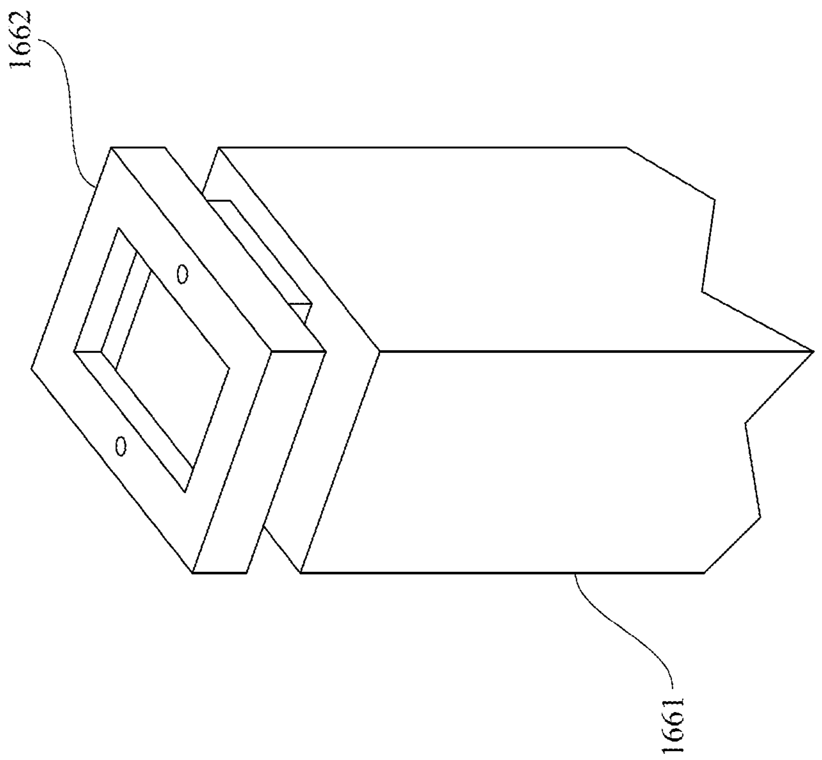
FIGS. 31A-31B are schematic diagrams of another exemplary leg assembly made in accordance with the present invention.
Figure 31A:
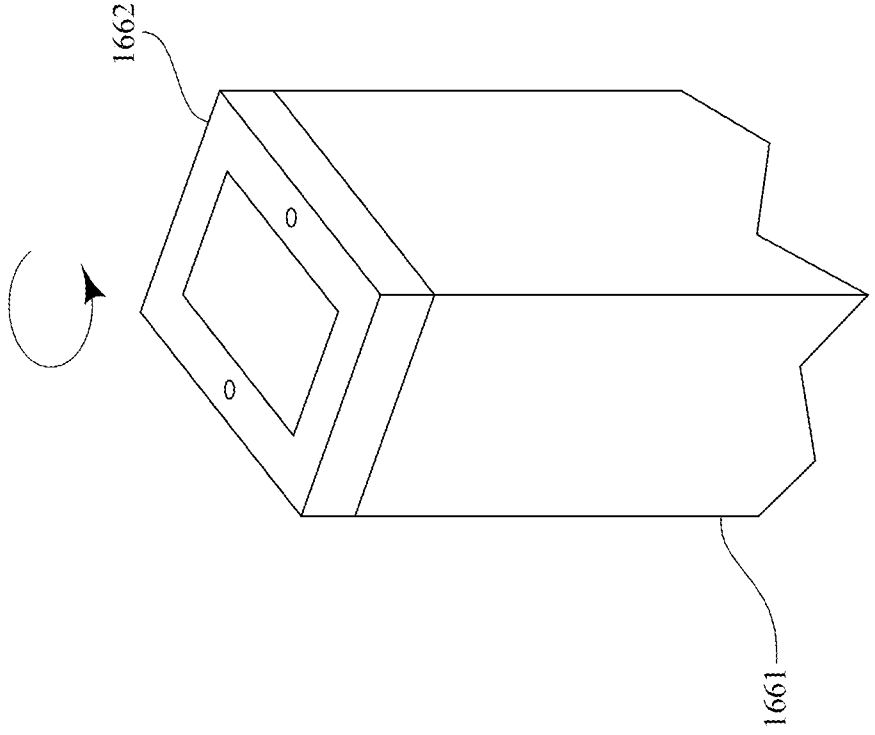

In addition to including various embodiments in which the width of the exemplary adjustable base assemblies of the present invention can be changed, each adjustable base assembly typically also comprises one or more legs for supporting the adjustable base assemblies and for adjusting the height of the adjustable base assemblies. As shown in FIGS. 1-8, similar to currently-available adjustable base assemblies, the adjustable base assembly 10 includes four fixed-height legs 161*a*, 161*b*, 161*c*, 161*d* with one of the legs 161*a*, 161*b*, 161*c*, 161*d* attached to each of the four corners 160*a*, 160*b*, 160*c*, 160*d* of the adjustable base assembly 10. In other embodiments, however, the height of each of the legs in an exemplary adjustable base assembly can be adjustable. For instance, in some embodiments, and as shown in FIGS. 27A-27B, an exemplary leg 1261 can be attached to a fixed frame 1211 via the use of a base 1262 defining holes 1263 of various depths into which the leg 1261 can selectively be inserted to adjust the height of the leg 1261. In other embodiments, another exemplary leg 1361 can be attached to a fixed frame 1311 and the height of the leg 1361 can be adjusted via a ratcheting mechanism 1363, as shown in FIGS. 28A-28B. As a further example, in another embodiment, an exemplary leg 1461 can be provided that includes a post 1462 configured to be placed within corresponding channels 1463 defined by a fixed frame 1411, as shown in FIGS. 29A-29C. In a further embodiment, an adjustable height leg 1561 can be provided that includes a removable stairstep portion 1562 that can be used to adjust the height of the leg 1561, as shown in FIGS. 30A-30B. In yet other embodiments, an adjustable height leg 1661 is provided that includes a removable portion 1662 that can be removed from the remainder of the leg 1661, rotated, and then reattached to the remainder of the leg 1661 to increase the height of the leg 1661, as shown in FIGS. 31A-31B.

Referring now once again to FIGS. 1-8, regardless of the configuration of the legs included in an exemplary adjustable base assembly, as indicated above, the actuator 70, the head actuator 90, the lumbar actuator 100, and the leg actuator 110 are each typically linear actuators, such the electric FD60 Linear Actuator manufactured by Moteck Electric Corp. (New Taipei City, Taiwan), although various other type of actuators (e.g., rotary-type actuators) and actuators operating on with different energy sources (e.g., hydraulic, pneumatic, magnetic and the like) can also be utilized. To control each of the actuators in the adjustable base assembly 10, however, the adjustable base assembly 10 further includes an adjustable base controller 169 that is operably connected to the actuator 70, the head actuator 90, the lumbar actuator 100, and the leg actuator 110 and that is configured to independently control the activation of each of those actuators 70, 90, 100, 110 such that a user can articulate various portions of the adjustable base assembly as desired, as described in further detail below.

In addition to controlling the activation of the actuators 70, 90, 100, 110 of the adjustable base assembly 10, the adjustable base controller 169 of the adjustable base assembly 10 can be further operably connected to and used to control a number of other features included on the adjustable base assembly 10. For example, in the exemplary adjustable base assembly 10 shown in FIGS. 1-8, the adjustable base controller 169 is further operably connected to a pair of massage units 163*a*, 163*b* attached to the torso panel 32 and a massage unit 163*c* attached to the lumbar panel 33 included on the articulating frame 30. In this regard, the adjustable base controller 169 can thus be configured to control the electrical current supplied to the massage units 163*a*, 163*b*, 163*c* and thereby activate the massage units 163*a*, 163*b*, 163*c* in one or more defined patterns to provide various massaging patterns to a user resting on the adjustable base assembly 10. For instance, in some embodiments, the massage patterns and peak intensity can be defined individually for each of the massage units 163*a*, 163*b*, 163*c*, such that a particular massage pattern or intensity exists in some or all of the massage units 163*a*, 163*b*, 163*c*. As one example, a massage pattern can be defined in the massage units 163*a*, 163*b*, 163*c* where the region of highest intensity moves in a circular pattern among the massage units 163*a*, 163*b*, 163*c*, or in a wave like pattern back and forth between two or more the massage units 163*a*, 163*b*, 163*c*. Moreover, the adjustable base controller 169 can also be configured to direct the speed of progression of a massage pattern to become faster or slower based on a single command. Massage patterns can also be synchronized with articulation of adjustable base assembly 10 in order to implement a power budgeting algorithm where, in certain embodiments, the massage pattern intensity can be reduced to conserve power without turning the massage completely off or where, alternatively, the massage can be turned completely off. In further uses, the massage pattern can consist of a series of patterns selected in sequence as part of a user defined macro, which can be configured to begin at a particular time of day or based on some other sensed signal, such as an indicator of sleep quality or sleep phase or lighting level or ambient noise or a combination of any sensed signal or signals and time of day. In some uses of the massage units 163*a*, 163*b*, 163*c*, a massage intensity can be translated to a particular value for the peak voltage level, which is then used to scale the currently running massage pattern. In some uses, the massage units 163*a*, 163*b*, 163*c* connected to the adjustable base controller 169 can also make use of an algorithm to predict when the temperature of the massage units 163*a*, 163*b*, 163*c* becomes too warm and, in turn, automatically disable the massage. Such an algorithm can, in certain embodiments, be based on time or a combination of time and of massage current, or massage pattern and intensity.

In some embodiments, such massaging patterns, as well as other operating parameters, can be directly inputted into the adjustable base controller 169 from a smart phone or other device, wired or wireless, that is operably connected to the bed (e.g., via the same network). In some embodiments, the massaging patterns and/or other operating parameters are inputted directly into the adjustable base controller 169 via a USB port 162 that is attached to the adjustable base assembly 10 and that is operably connected to the adjustable base controller 169 (e.g., via a wire that extends from the USB port to the adjustable base controller 169). As perhaps best shown in FIG. 8B, the USB port 162 is mounted to the side rail 140*b* of the adjustable base assembly 10 and can be rotated outward to allow a USB cable to be connected to the USB port 162 in a manner that not only allows easy access to the USB port 162, but also in a manner that avoids damage to a USB cable.

Figure 32:
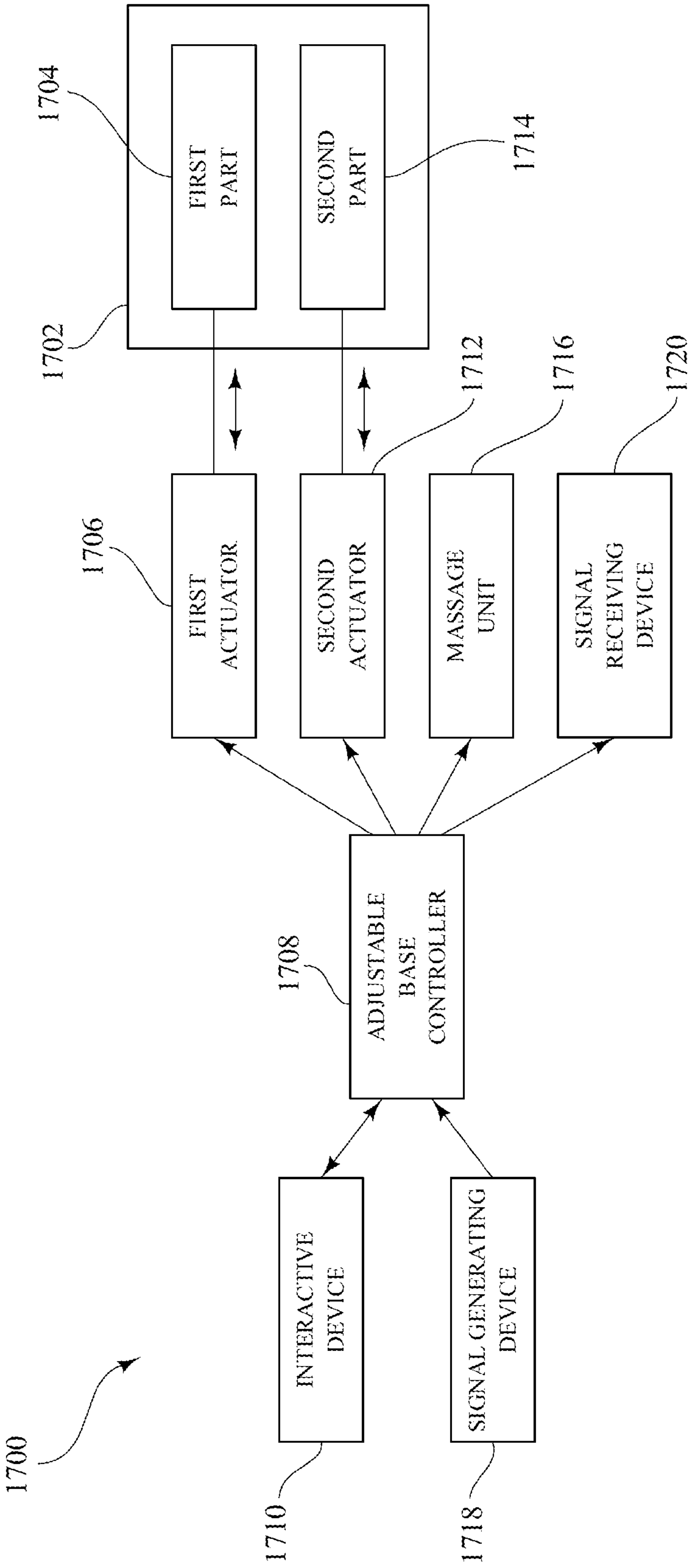
FIG. 32 is a functional block diagram of an exemplary system for controlling an adjustable base in accordance with the present invention.

With further respect to the adjustable base controllers included in an exemplary adjustable base assembly of the present invention, in further embodiments, one or more actions can be input into the adjustable base using a single command and/or a series of commands. For example, FIG. 32 is a functional block diagram of an exemplary system 1700 for controlling an adjustable base assembly made in accordance with the present invention, including: an articulating frame 1702 having a first part 1704 (i.e., a first articulating part); a first actuator 1706 for articulating the first part 1704 of the articulating frame 1702; an adjustable base controller 1708 for actuating the first actuator 1706; and an interactive device 1710 in communication with the adjustable base controller 1708, the interactive device 1710 for programming the adjustable base controller 1708 to cause the first actuator 1706 to move the first part 1704 of the articulating frame 1702 to a predetermined first position in response to a single command. The exemplary system 1700 allows a user to program in an action to control the adjustable base which is triggered by a single command (e.g., the press of a single button on a remote control, or smartphone or tablet application). One example would be determining how best to go to sleep. The user would first program the remote to tell the bed to lower to their preset sleeping position. Once this is programmed in, when the user pressed the button labeled “Sleep” on the remote control, or smartphone or tablet application, the action occurs automatically. The articulating frame 1702 and the first part 1704 may be as discussed in the embodiments described above.

The adjustable base controller 1708 preferably includes motor driver circuitry to support actuators and massage motors (relays, field-effect transistors (FETs), motor driver integrated circuits (ICs), diodes, and filter components), a processor to drive the exemplary system 1700, internal or external flash memory to store preset positions and user preferences, interfaces for a wireless remote control, Wi-Fi connectivity and appropriate power regulation circuitry to support the above.

The interactive device 1710 may be a remote control device, or a smartphone or tablet executing an application, in communication with the adjustable base controller and, preferably, specifically designed to control an adjustable base. An exemplary remote control device is a battery powered remote control including a button matrix, user indicators, and a wireless interface to the adjustable base controller 1708. Exemplary user indicators include LEDs or a text/graphical display. An exemplary smartphone or tablet executing an application is a custom application specific to controlling an adjustable base that runs on a smartphone or tablet, communicating to the adjustable base via a wireless protocol such as Bluetooth, Wi-Fi, near field communication (NFC), etc.

The exemplary system 1700 may further include a second actuator 1712 for articulating a second part 1714 (i.e., a second articulating part) of the articulating frame 1702 of the adjustable base, the adjustable base controller 1708 may further actuate the second actuator 1712, and the interactive device 1710 may further program the adjustable base controller 1708 to cause the second actuator 1712 to move the second part 1714 of the articulating frame 1702 to a predetermined second position in response to the single command. The articulating frame 1702 and the second part 1714 may be as discussed in the embodiments described above. The second actuator 1712 may be similar to the first actuator 1706 described above. Thus, the exemplary system 1700 may further allow a user to program in simultaneous operation of the first actuator 1706 and the second actuator 1712, or sequential operation of the first actuator 1706 and the second actuator 1712 and a duration between the start of one action and the start of another, to control the adjustable base which are triggered by a single command (e.g., the press of a single button on a remote control, or smartphone or tablet application).

As indicated above, the exemplary system 1700 may still further include a massage unit 1716 for imparting a massage function to the adjustable base, the adjustable base controller 1708 may further be control the massage unit 1716, and the interactive device may further program the adjustable base controller 1708 to cause the massage unit 1716 to impart a massage function to the adjustable base for a predetermined amount of time in response to the single command. The massage unit 1716 preferably includes electric motors with grossly unbalanced shafts mounted within housings that mechanically couple vibration frequencies into the mattress while simultaneously insulating the adjustable base itself from said vibrations.

Thus, the exemplary system 1700 may further allow a user to program in a series of actions, including operation of the massage unit 1716, and a duration between the start of one action and the start of another to control the adjustable base which are triggered by a single command (e.g., the press of a single button on a remote control, or smartphone or tablet application). Again, one example would be determining how best to go to sleep. The user would first program the remote to tell the bed to lower to their preset sleeping position, add an amount of time as a pause, then program the remote to activate a timed massage to lull them to sleep. Once this is programmed in, when the user pressed the button labeled "Sleep" on the remote control, smartphone or tablet application, the actions occur automatically.

The exemplary system 1700 may further include a signal generating device 1718 which is also in communication with the adjustable base controller 1708, which may or may not be the same device as the interactive device 1710, for generating the single command and communicating the single command to the adjustable base controller 1708. For instance, the signal generating device 1718 may be the remote control, or smartphone or tablet executing an application, but may also be an outside timer or other control signal generating device such as a television, personal computer, home automation device, or active sleep system that recognizes sleep. One use case here is similar—the user is able to program in a series of actions with a time they determine they want the actions to occur, then have those actions triggered by the signal generating device 1718 (e.g., an external timer on a remote control device, smartphone, tablet, television, personal computer, home automation device, etc.). One such example here is optimizing the user's experience going to sleep. With the abovementioned problem, if they have their television on a sleep timer, once the television turns off, it sends a signal of status to the adjustable base controller 1708 to automatically activate the lowering of the head and foot sections in a slow manner to the user's preset sleeping position, and activates a timed massage. Similarly, if the user wants to automate their wake up experience, elevating of the head section or foot section on the base to a preset waking position or to a last set position is triggered automatically by an alarm clock function in a smartphone, tablet, smartwatch, fitness tracking device, alarm clock or other device. A button on a remote, smartphone or tablet application, smart watch, or other control device controls the series of commands for the adjustable base which is activated via physical touch of the button, voice recognition control of the button, or triggered from an external device over a network. The user programs in the series of actions they want the base to perform in the order in which they want them performed. The actions can occur simultaneously or sequentially over a pre-determined time range determined by the user. In the event that these multiple actions are triggered automatically by an external networked device, sensor, alarm or timer, the user has the ability to turn the active monitoring status on or off so they can disable the activation of a series of commands (for example on the weekend when they want to sleep in). The communication between the signal generating device 1718 and the adjustable base controller 1708 is preferably wireless (NFC, Wi-Fi, Bluetooth, Zigbee, RF, etc.). Alternatively, the communication between the signal generating device 1718 and the adjustable base controller 1708 is a directly wired serial interface that daisy-chains the signal generating device 1718 using an "external expansion" serial port of the adjustable base controller 1708. In some embodiments, the signal generating device 1718 includes multiple devices "daisy-chained" to the "external expansion" serial port of the adjustable base controller 1708.

Figure 33:
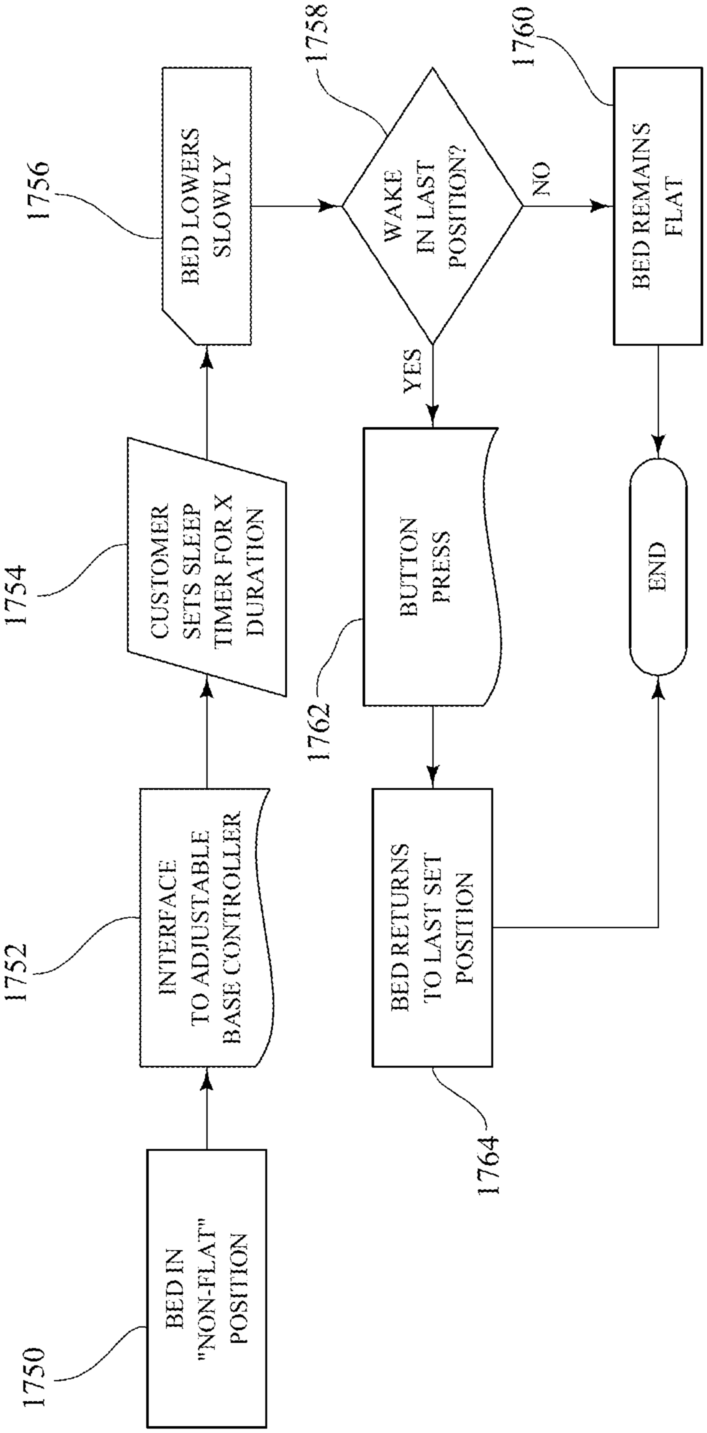
FIG. 33 is a flow chart of an exemplary method of operating the exemplary system for controlling an adjustable base in accordance with the present invention.

Referring now to FIG. 33, FIG. 33 is a flow chart of an exemplary method of operating the exemplary system 1700 for controlling an adjustable base, including: step 1750, an adjustable base being in any type of "non-flat" position; step 1752, interface via Wi-Fi, Bluetooth, radio frequency, or other controlled timing device that is linked to the adjustable base controller 1708; step 1754, setting, by a user, a "sleep timer" for x duration; and step 1756, lowering the adjustable base slowly every x number of seconds until in a flat position. For example, a user may set the adjustable base to slowly lower to a flat position over a 5 minute time period after the sleep timer expires so that they are not awakened by the movement. Step 1758 is determining if the user has selected to wake up in the last set position. If not, then step 1760 is, upon a button press, maintaining the adjustable base in a flat position and clearing the last set cycle, unless stored in memory. For example, the remote "knows" that the person has woken up if a button is pressed and therefore can command the bed to perform some sort of pre-programmed "wake up" function. If the user has selected to wake up in the last set position, then step 1762 is, upon the button press, the bed going back to the last set position, and step 1764 is moving a memory setting in a remote control device or in the adjustable base controller 1708 to the last known set position. Basically, in this exemplary method, the user specifies that when they wake, the adjustable base should return to the same memory position that it was in before the sleep timer expired—for example if they fell asleep in a TV viewing position, after the sleep timer expires the bed will slowly go flat (so as not to wake the user), and then will return to the TV viewing position once they press a button to indicate that they are awake again.

In one embodiment, the signal generating device 1718 is a remote control device including a built-in microphone, the first part 1704 of the articulating frame 1702 is a head subframe, and the first actuator 1706 is a head actuator for articulating the head subframe of the articulating frame 1702. The remote control device monitors the built-in microphone for ambient noise similar to snoring. The built in microphone is attached to a DSP chip/function internal to the remote that processes a signal from the built-in microphone and determines if the signal matches a snoring profile. In particular, snoring might be identified by the frequency content of the signal, the rate of repetition (breathing rate), or comparison to an internally stored "snore" audio profile. When a predetermined threshold of ambient noise similar to snoring is reached, the remote control device sends a signal to the adjustable base controller 1708. For example, if the frequency content of the signal reaches a predetermined correlation threshold to a "snore" profile, the rate of repetition is within a predetermined range of a breathing rate, and the sound intensity is greater than a predetermined threshold, the remote control would report "snoring" to the adjustable base controller 1708. The adjustable base controller 1708 then causes the head actuator to move the head subframe of the articulating frame 1702 to open up the airway of an occupant on the adjustable base assembly.

In another embodiment, the exemplary system 1700 further includes a signal receiving device 1720 in communication with the adjustable base controller 1708. The signal receiving device 1720 performs a function, the adjustable base controller 1708 activates the function, and the interactive device 1710 programs the adjustable base controller 1708 to cause the signal receiving device 1720 to perform the function in response to the single command. For example, the function may be rolling down automated sheets, raising a lighting level of lighting proximate the adjustable base, playing music, or starting a brewing of coffee by a coffee brewer.

Figure 34:
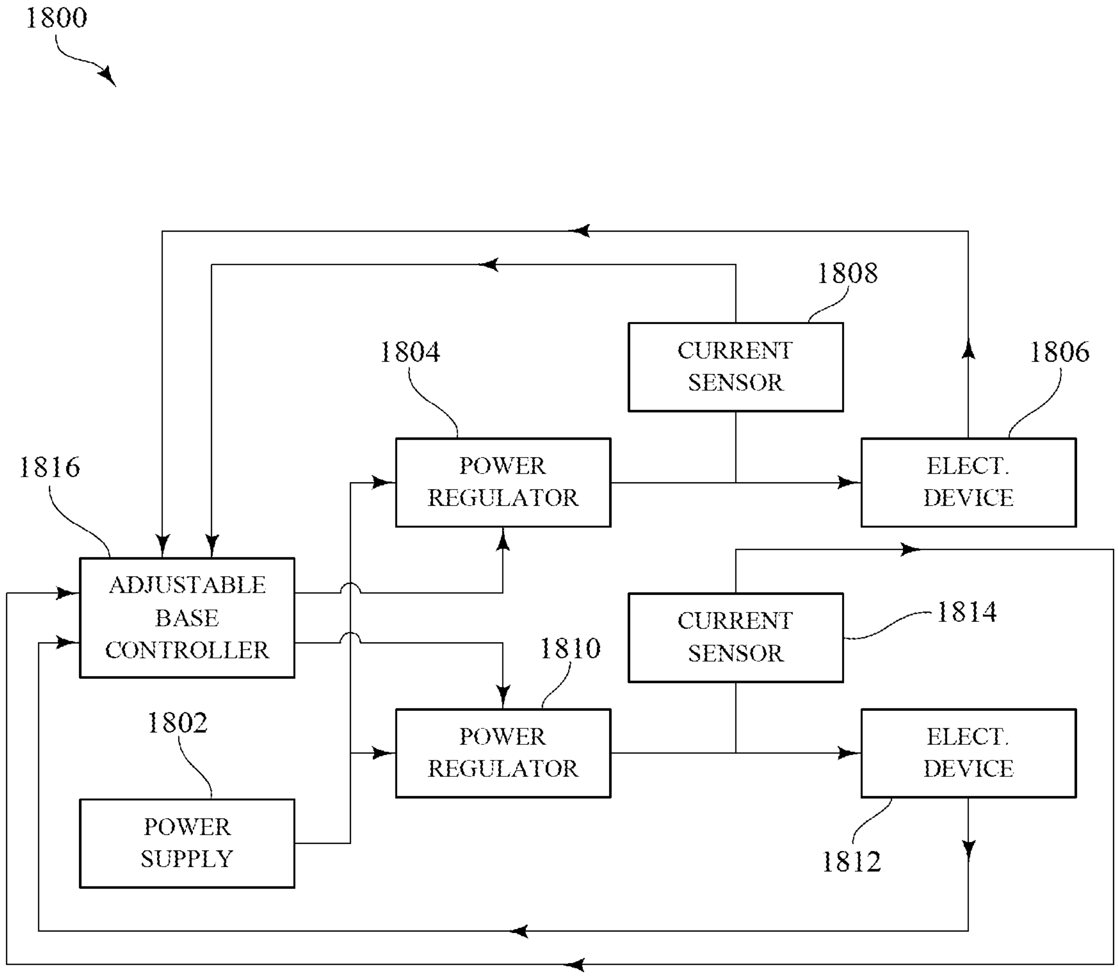
FIG. 34 is a functional block diagram of another exemplary system for controlling an adjustable base in accordance with the present invention.

To monitor actuator parameters on an adjustable base assembly made in accordance with the present invention and maximize the features of the exemplary adjustable base assembly that can be operated simultaneously, in some embodiments, an adjustable base controller can further be configured to communicate directly or indirectly with various power regulators and sensors. For instance, FIG. 34 is a functional block diagram of another exemplary system 1800 for controlling an adjustable base, including: a power supply 1802; a first power regulator 1804 in communication with the power supply 1802; a first electrical device upper end in communication with the first power regulator 1804, the first electrical device 1806 for providing a first feature to the adjustable base; a first current sensor 1808 for sensing the current supplied to the first electrical device 1806 by the first power regulator 1804; a second power regulator 1810 in communication with the power supply 1802; a second electrical device 1812 in communication with the second power regulator 1810, the second electrical device 1812 for providing a second feature to the adjustable base; a second current sensor 1814 for sensing the current supplied to the second electrical device by the second power regulator 1810; and an adjustable base controller 1816 in feedback communication with the first current sensor 1808 and the second current sensor 1814, and in control communication with the first power regulator 1804 and the second power regulator 1810, the adjustable base controller 1816 for controlling the first power regulator 1804 and the second power regulator 1810 to regulate power to the respective first electrical device 1806 and the second electrical device 1812 in response to monitoring the current supplied to each of the respective first electrical device 1806 and the second electrical device 1812, such that the first electrical device 1806 and the second electrical device 1812 receive power simultaneously without exceeding an overall power budget. Of course, it is contemplated that additional power regulators, electrical devices, and current sensors may be included in the adjustable base, but for simplicity, only two such assemblies are discussed herein. Advantageously, as described below, the invention allows quick overall movement to actuator preset conditions on adjustable base beds, and permits detection of the load present during actuator movements.

The power supply 1802 is preferably a switching-mode power supply capable of being powered by mains voltage/frequency worldwide, and outputting a DC voltage ideally suited to driving adjustable base functions. The power supply 1802 is preferably able to support a peak power requirement in excess of twice a continuous power rating for short durations up to 2 minutes out of every 20 minutes. Advantageously, the maximum power available can be chosen for cost. If it is desired, to enable everything at once on a high end bed, the highest level power supply (e.g., 100 watts) can be used. For lower models, use of monitoring can be utilized and a lower cost (lower power level (e.g., 36 watts) power supply can be used.

The first power regulator 1804 and the second power regulator 1810 are, for example, buck or boost converter DC voltage or current regulators that can be switched on/off via firmware in the adjustable base controller 1816.

The first electrical device 1806 and the second electrical device 1812 are, for example, LED lighting, USB charging ports, massage motors, mechanical actuators, etc.

The first current sensor 1808 and the second current sensor 1814 are, for example, sense resistors, whose voltage drop is directly proportional to current and can be monitored by the adjustable base controller 1816. In another embodiment, PWM (pulse width modulation) is used as a current sense, as the power delivered to the load is directly proportional to the PWM % of the signal being pulsed.

The adjustable base controller 1816 is, preferably, the same as the adjustable base controller 1708 described above with respect to the exemplary system 1700, but with the functionality described with respect to the exemplary system 1800.

Thus, the adjustable base controller 1816 actively monitors the current to each of the first electrical device 1806 and the second electrical device 1812 (e.g., actuators, massage motors, USB port, lighting, etc.). This allows the adjustable base controller 1816 to budget the overall power available and to operate multiple electrical devices at the same time as long as the power capacity is closely monitored. The adjustable base controller 1816 also determines the present load on the bed using the current or PWM measurement to a position on the actuator stroke. For example, where the first electrical device 1806 and the second electrical device 1812 are actuators, PWM (Pulse Width Modulation) allows the adjustable base controller 1816 to apply a varying amount of power to in order to maintain speed as the mechanical load varies; the power delivered is directly proportional to the PWM percentage.

Rather than locking out and predetermining which features functions can be run simultaneously in order to prevent exceeding the overall power budget, the adjustable base controller 1816 measures the power consumption by each feature and maximizes the usage of available power by prioritizing the functions. For example, one actuator is being driven to raise the head subframe while under bed lighting is turned on. If the weight on the bed is large enough to exceed the power capability to perform both functions, the system can monitor and turn off/reduce the lower priority function. The adjustable base controller 1816 turns off the LED under bed lighting in this case. Where the weight on the bed is lower, the system can determine the electrical load is within limits and leave both functions operational.

In another example, the load on the actuators of an adjustable base assembly is proportional to the weight on the base. If a single person is using a light mattress or a user is adjusting it prior to getting on the adjustable base assembly, the load is very low. It may be possible to drive three or four actuators full speed simultaneously to reach a preset mode defined on the remote control. However, if a heavier couple is occupying the adjustable base assembly and using a heavier, stiff mattress, it may only be possible to drive two actuators at full speed and one or two others at a reduced speed (using a PWM signal) to reach the same preset mode. If the heavier couple attempts the same thing, while actively running massage motors and each charging a portable electronic device (e.g., a mobile phone or tablet on the USB ports available on the bed), then the adjustable base controller 1816 reduces the intensity of the one or more massage motors as well as reduces the charging amperage while moving these actuators, all in an effort to stay below the maximum power available.

Additionally, the system provides enhanced safety capability by allowing actuators to be shut down more quickly in the case that they are blocked. The adjustable base controller detects the stroke location and drive direction of the actuators via feedback from sensors in the actuators and software. The adjustable base controller also provides boundary limits on the current supplied to an actuator from testing and data collection of unloaded and fully loaded bases. Knowing that information and actively measuring the current to the actuator in real time, the adjustable base controller can more quickly shut down the actuators when the current exceeds these boundaries limits.

Figure 35:
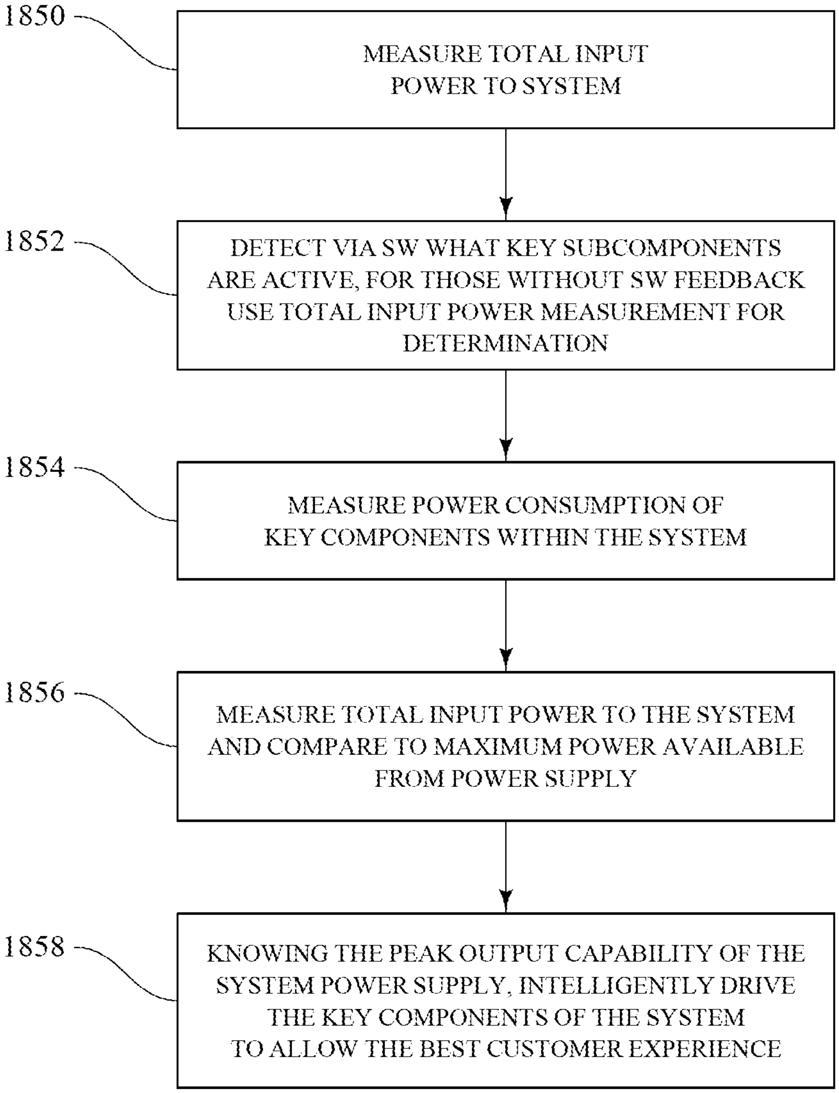
FIG. 35 is a flow chart of an exemplary method implemented by an adjustable base controller in operating an adjustable base in accordance with the present invention.

FIG. 35 is a flow chart of an exemplary method implemented by the adjustable base controller 1816 in operating an adjustable base, including: step 1850, measuring the total input power to the system; and step 1852, detecting, via software, what key subcomponents are active, for those without software feedback using total input power measurements for determination. This is determined in 2 ways. The first way is by process of elimination by subtracting out known power feedback information and assuming which components are consuming the remaining power. The second way is assuming a set value based on the characteristics of the system (e.g., knowing the maximum USB load is 21 W, it is assumed that 21 W of the total power is coming from the USB load).

Continuing with the description of the exemplary method of operating an adjustable base shown in FIG. 35, step 1854 is measuring the power consumption of key components within the system. Step 1856 is then measuring total input power to the system, which is the same measurement as in step 1850, and comparing to the maximum power available from the power supply 1802. Step 1858 is then, knowing the peak output capability of the power supply 1802, intelligently driving the key subcomponents of the system to allow the best customer experience.

Figure 36:
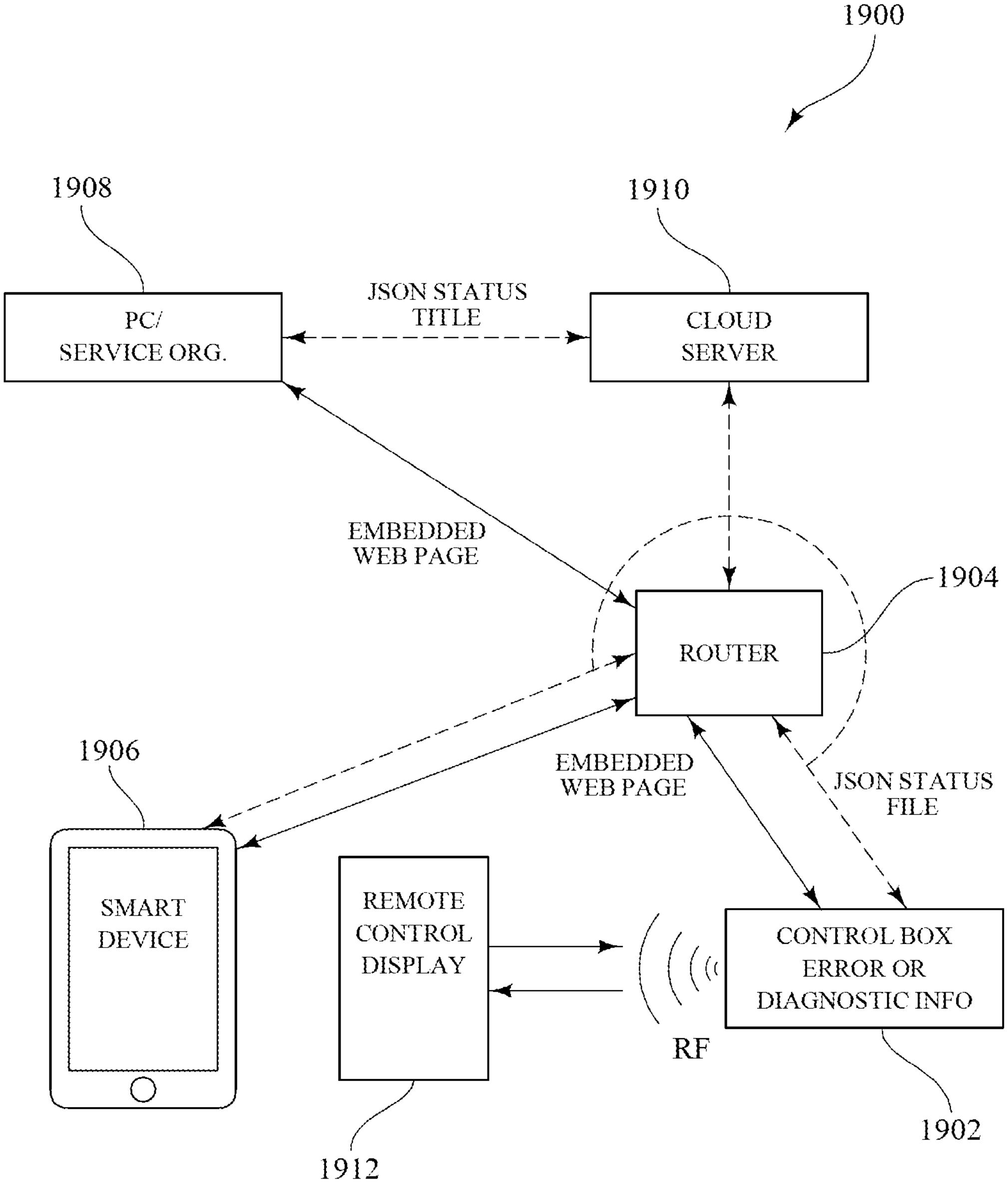
FIG. 36 is a functional block diagram of an exemplary system for remote monitoring of bed control diagnostics of an adjustable base in accordance with the present invention.

As an additional feature of the adjustable base assemblies of the present invention, the adjustable base controllers included in the adjustable base assemblies can further be utilized for remotely monitoring the diagnostics of an exemplary adjustable base assembly via a remote control or Wi-Fi interface. For example, FIG. 36 is a functional block diagram of an exemplary system 1900 for remote monitoring of bed control diagnostics of an adjustable base assembly, including an adjustable base controller 1902 for controlling electromechanical systems in an adjustable base assembly, the adjustable base controller 1902 for: performing diagnostic testing or relating an error code to an error condition of operation of the electromechanical systems; and embedding the error code or results of the diagnostic testing in an internal webpage. The exemplary system 1900 also includes: a router 1904 in two-way wireless communication with the adjustable base controller 1902; and an external communication device (e.g., a smart device 1906 or a personal computer 1908) in communication with the router 1904 through a communication network, the external communication device querying the adjustable base controller 1902 for the internal webpage to remotely obtain the error code or the results of the diagnostic testing.

The adjustable base controller 1902 is, preferably, the same as the adjustable base controller 1708 described above with respect to the exemplary system 1700, but with the functionality described with respect to the exemplary system 1900.

The router 1904 is a networking device that forwards data packets between the user's home network and the Internet, performing "traffic directing" functions and including the functions of a wireless access point.

Due to the bidirectional nature of Wi-Fi communication, diagnostic information is accessed by the external communication device via an internal web interface of the adjustable base controller 1902. The current state of the adjustable base controller 1902, including any current or logged error conditions and basic diagnostic information, can be accessed via the Internet by connecting directly to the web address of the adjustable base controller 1902.

The exemplary system 1900 may further include a cloud server 1910 in communication with the router 1904 through the communication network, the cloud server 1910 receiving, via the communication network and the router 1904, the error code or the results of the diagnostic testing and sending an alert to the external communication device regarding the error code or the results of the diagnostic testing. The cloud server 1910 is a networked server that collects, stores, and reports data to clients such as a control box or smart device. Thus, the logged error conditions and basic diagnostic information, can also be accessed via the Internet by connecting cloud server 1910. The error codes and diagnostic information are reported via, for example, JSON, HTML, or other file format to the cloud server 1910 along with identifying information (such as MAC address or product serial number) that allows service personnel to be alerted to issues with a specific adjustable base controller 1902.

Still further, the exemplary system 1900 may include, instead of or in addition to the router 1904 and related elements, a remote control device 1912 in two-way wireless communication with the adjustable base controller 1902. The remote control device 1912 includes a display device.

The remote control device 1912 queries the adjustable base controller 1902 for the error code or the results of the diagnostic testing, and displays, on the display device, the error code or the results of the diagnostic testing. Preferably, the remote control device 1912 is a device specifically designed to control an adjustable base, such as a battery powered remote control containing a button matrix, user indicators such as LEDs or text/graphical display, and a wireless interface to the base controller.

Due to the bidirectional nature of communication with the remote control device 1912, the remote control device 1912 accesses diagnostic information from the adjustable base controller 1902. Error codes and diagnostic information are presented to the user via the remote control device 1912 (either discrete codes on a user interface screen, or a series of encoded LEDs on the remote control device 1912). Of note, error codes and a diagnostic routine are present in the firmware of the adjustable base controller 1902, and the remote control device 1912 uses commands to query the condition of the adjustable base controller 1902 or the results of a diagnostic test. The codes provided to the remote control device 1912 by the adjustable base controller 1902 are displayed to the user in such a way that technical support personnel can easily determine the error condition based on the indication provided to the user (i.e. error codes, LED blink patterns, etc.).

Figure 37:
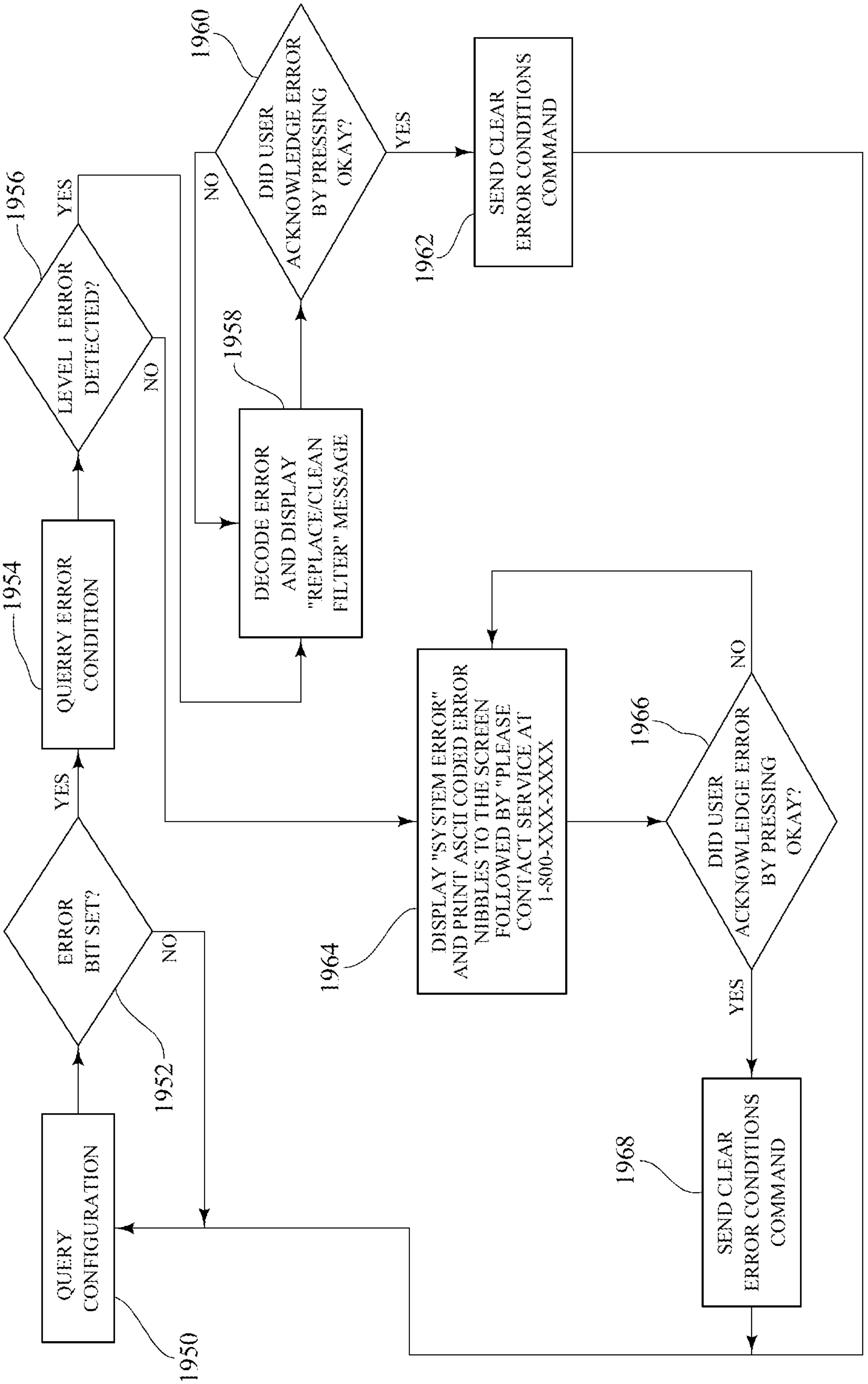
FIG. 37 is a flow chart of an exemplary method implemented by a remote control device in accordance with the present invention.

In this regard, FIG. 37 is a flow chart showing an exemplary method implemented by the remote control device 1912, including: step 1950, querying the adjustable base controller 1902 for a configuration, and step 1952, determining if an error bit is set in the response from the adjustable base controller 1902. If no error bit is set, no action taken. However, if an error bit is set, then step 1954 is querying the adjustable base controller 1902 for an error condition. Step 1956 is determining if a "level 1" error is detected. "Level 1" refers to an error condition that the user can remedy themselves.

If a "level 1" error is detected, then step 1958 is decoding the error and displaying a "Replace/Clean Filter" message on the display device of the remote control device 1912. Then, step 1960 is determining if the user has acknowledged the error by pressing "OK" on the remote control device 1912. If the user has not acknowledged the error, the "Replace/Clean Filter" message continues to be displayed. If the user has acknowledged the error, then step 1962 is sending a "clear error conditions" command to the adjustable base controller 1902.

If a "level 1" error is not detected, then step 1964 is displaying "System Error" and ASCII-coded error nibbles, followed by "Please Contact Service at 1-800-xxx-xxxx." Then, step 1966 is determining if the user has acknowledged the error by pressing "OK" on the remote control device 1912. If the user has not acknowledged the error, the "System Error . . . " message continues to be displayed. If the user has acknowledged the error, then step 1968 is sending a "clear error conditions" command to the adjustable base controller 1902.

Figure 38:
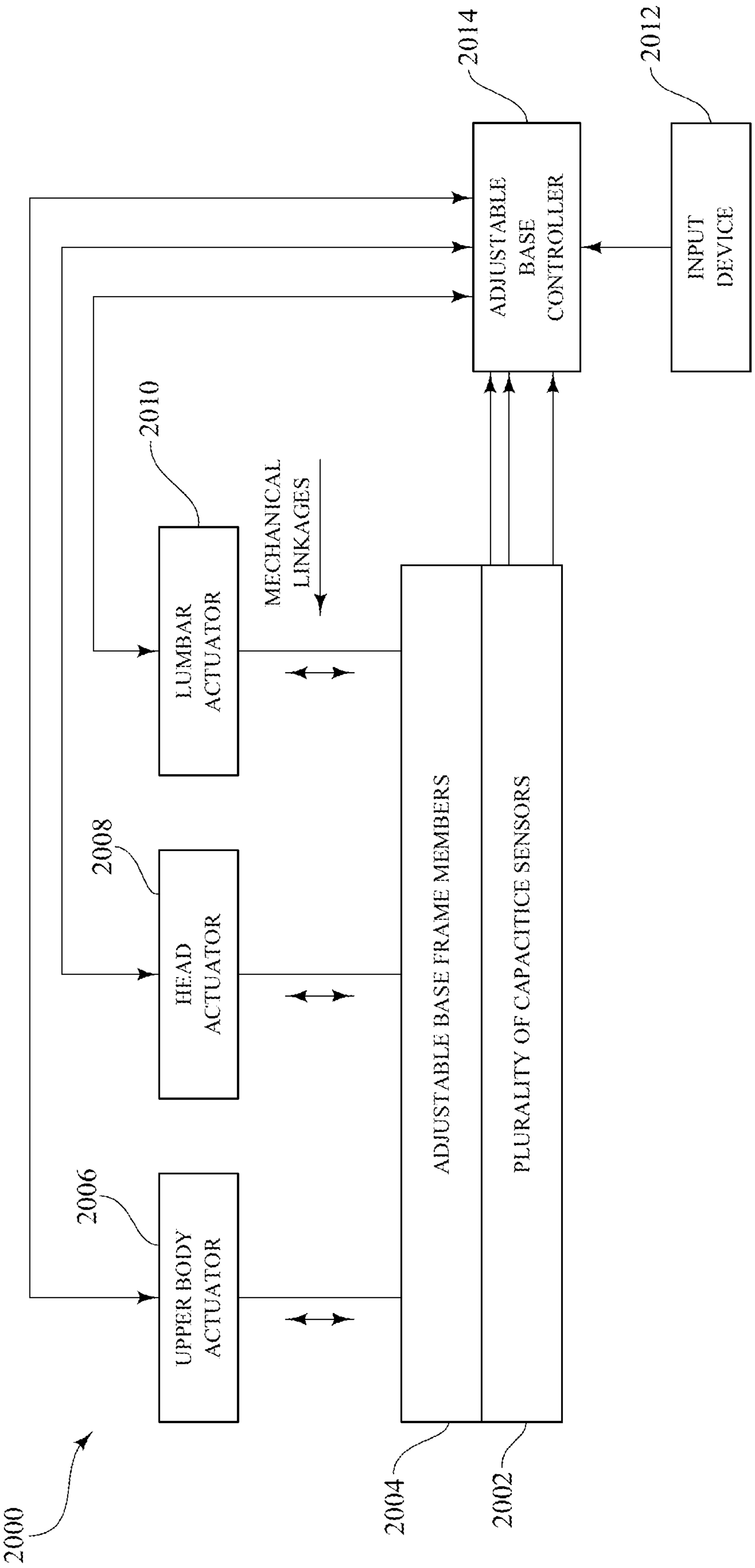
FIG. 38 is a functional block diagram of an exemplary system for preventing pinching of a human body part by an adjustable base in accordance with the present invention.

As an additional function of an adjustable base controller utilized in the adjustable base assemblies of the present invention, in some embodiments, an adjustable base controller can further be used to monitor various capacitive sensors and prevent the pinching of a human body part by an exemplary adjustable base assembly. FIG. 38 is a functional block diagram of one such exemplary system 2000 for preventing pinching of a human body part by an adjustable base assembly, including a plurality of capacitive sensors 2002 affixed to respective frame members 2004 of the adjustable base; a plurality of actuators (e.g., a upper body actuator 2006, a head actuator 2008, and a lumbar actuator 2010) for moving the respective frame members 2004 of the adjustable base assembly; an input device 2012 for providing a command to move at least one of the respective frame members 2004 of the adjustable base; and an adjustable base controller 2014 in communication with the plurality of capacitive sensors 2002 and the plurality of actuators. The adjustable base controller 2014 is for: checking the plurality of capacitive sensors 2002 for a presence of the human body part in response to receiving the command to move the at least one of the respective frame members 2004; checking the plurality of capacitive sensors 2002 in real time during movement of the at least one of the respective frame members 2004; and, if presence of the human body part is detected after a predetermined trip time, then stopping the movement of the at least one of the respective frame members 2004 to avoid contact with the body part and subsequent injury.

The plurality of capacitive sensors 2002 are specifically designed conductive metal plates placed in multiple strategic locations on the bed to adequately sense intrusion into the pinch points of the bed. A sensor chip is an off-the-shelf silicon part that measures the capacitance of the sensors. Advantageously, the plurality of capacitive sensors 2002 detect the presence of the human body part in close proximity to the pinch points on the adjustable base. The sensors 2002 must be specially designed in order to not be so sensitive as to generate false positives simply by the presence of a human on or near the bed or the movement of the bedframe, but also not so insensitive as to require direct contact.

Figure 39:
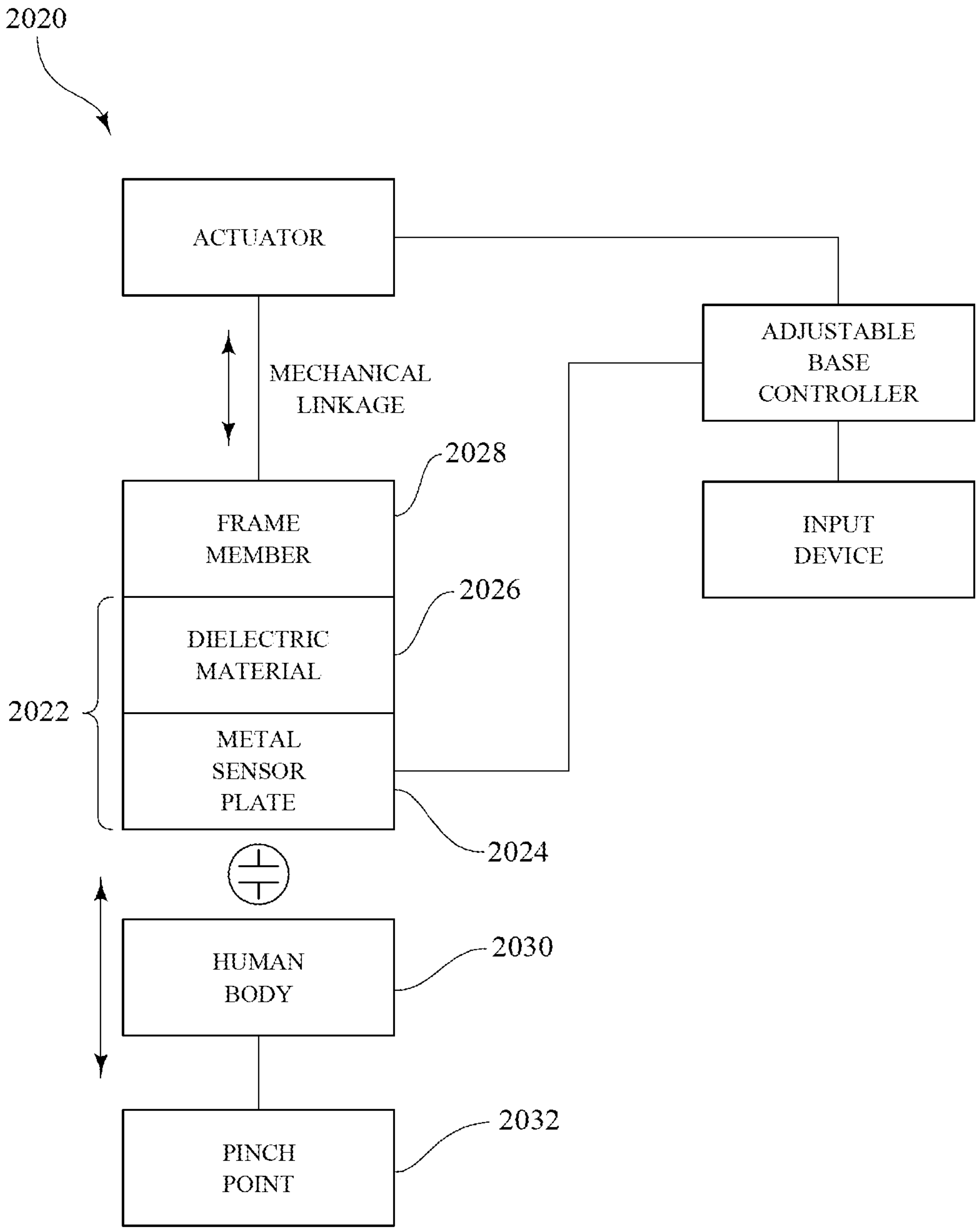
FIG. 39 is a block diagram of an exemplary embodiment of a single pinch preventing assembly in accordance with the present invention.

FIG. 39 is a block diagram of one exemplary embodiment of a single pinch preventing assembly 2020. In order to optimize capacitive sensing, a capacitive sensor 2022 consists of a metal sensor plate 2024 suspended by a dielectric material 2026 along a frame member 2028 that needs to detect the presence of a human body part 2030. The size, shape, and location of the metal sensor plate 2024 attached to the frame member 2028 should be optimized to balance between adequate sensitivity and excessive system capacitance. For example, larger sensors are more sensitive, but also have higher capacitance—eventually the system capacitance overwhelms the small changes in capacitance that are being measured. The capacitive sensor 2022 is placed near a pinch point 2032. Care must be taken in the routing of sensor wires from the capacitive sensor 2022 back to a sensor chip, as proximity to any other metal feature on the bed could include that feature in the sensing circuit. Sensor wires are part of the sensor and will cause erroneous results if they are not short enough and routed properly. Care must also be taken in locating the capacitive sensor 2022, as if it is readily accessible to the user during normal operation (i.e. a sensor very close to where the person would be laying or sitting on the mattress, such as a side rail or headboard), it will generate many false positive signals in the sensing circuit. The capacitive sensor 2022 must have a standoff distance away from any metal frame pieces to minimize parasitic capacitance that degrades signal quality.

Figure 40:
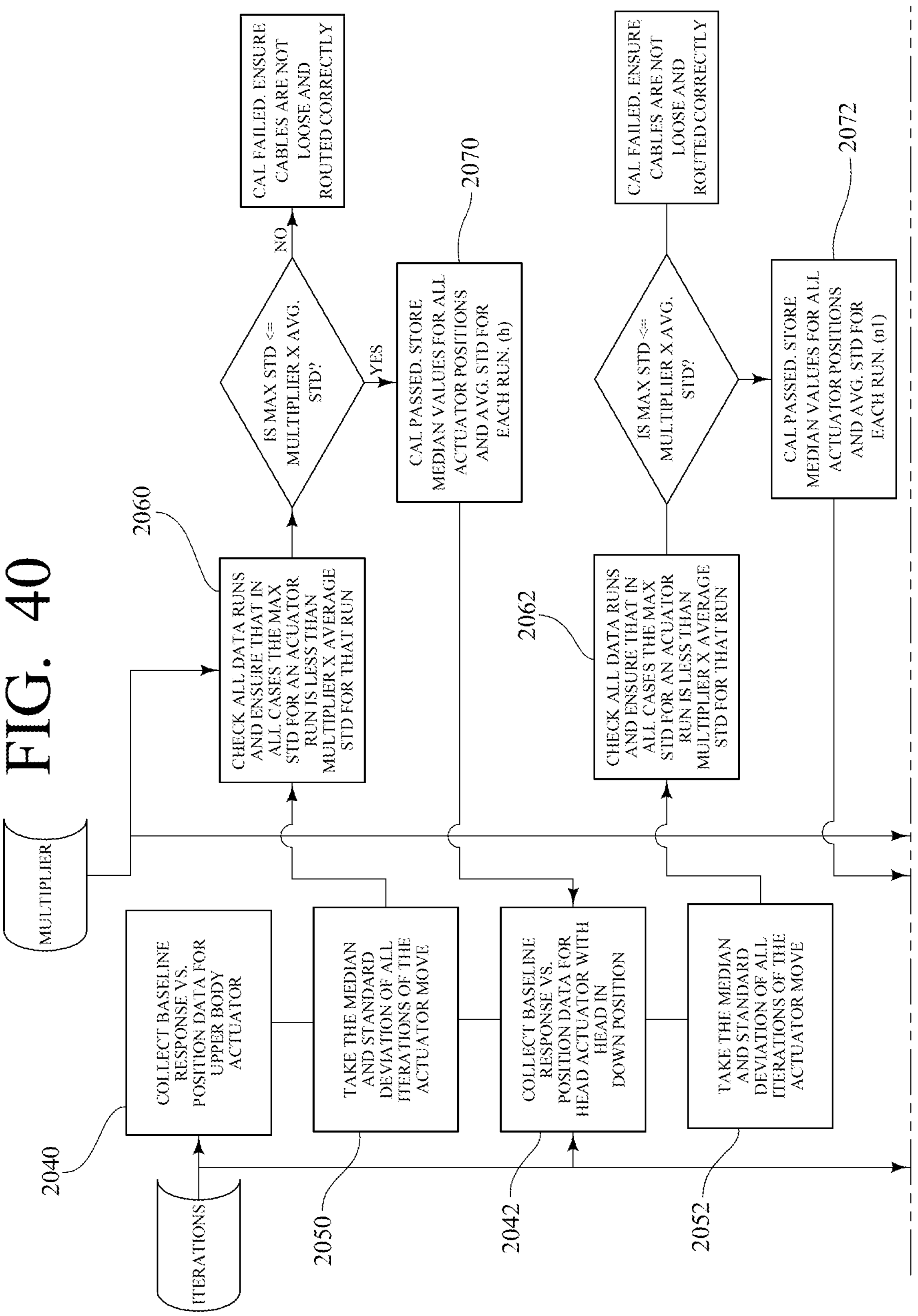
FIG. 40 is a flow chart of an exemplary method of collecting median sensor values of a plurality of capacitive sensors versus position data for each of a number of combinations for a plurality of iterations in accordance with the present invention.
Figure 40:
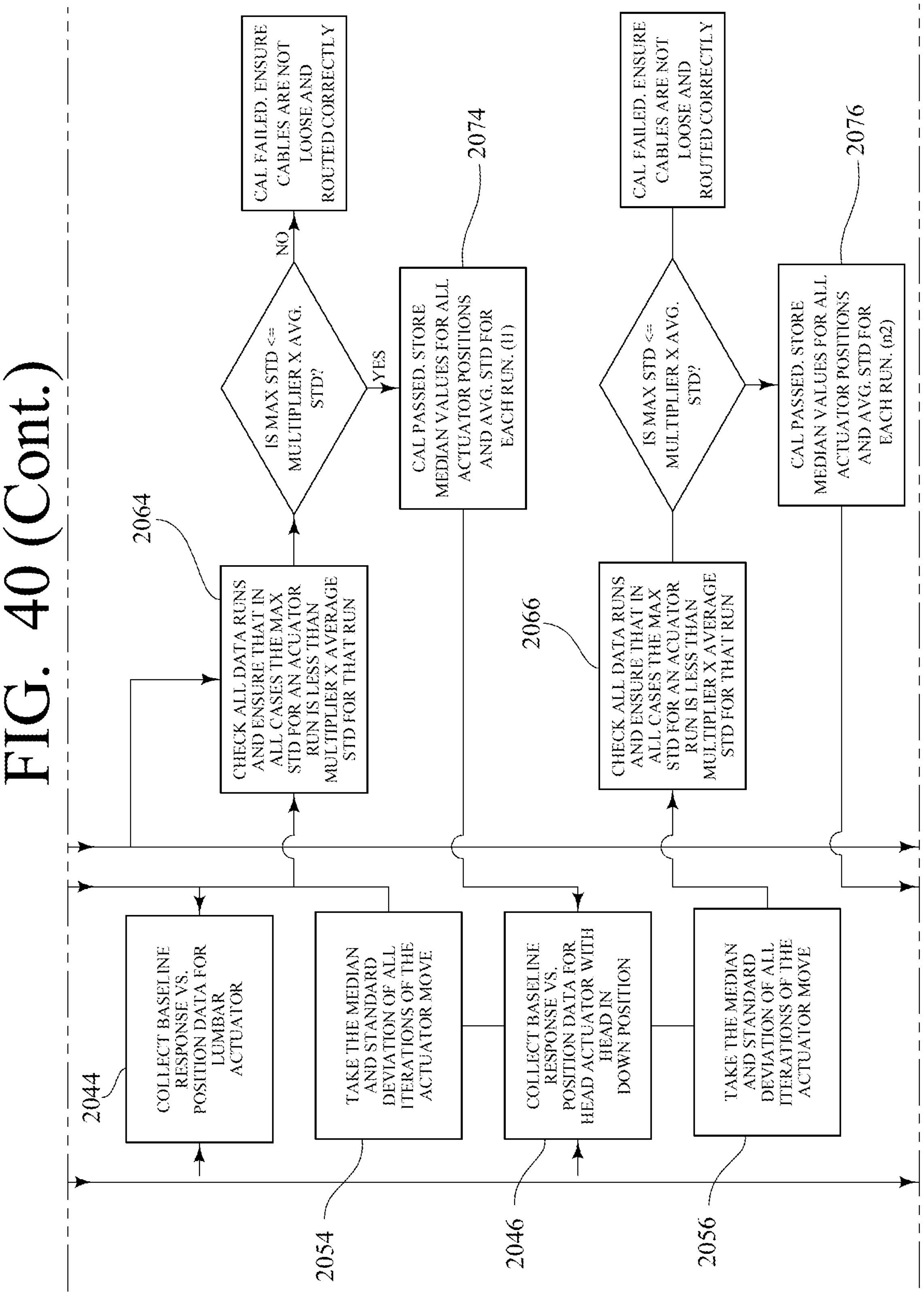
Figure 40:
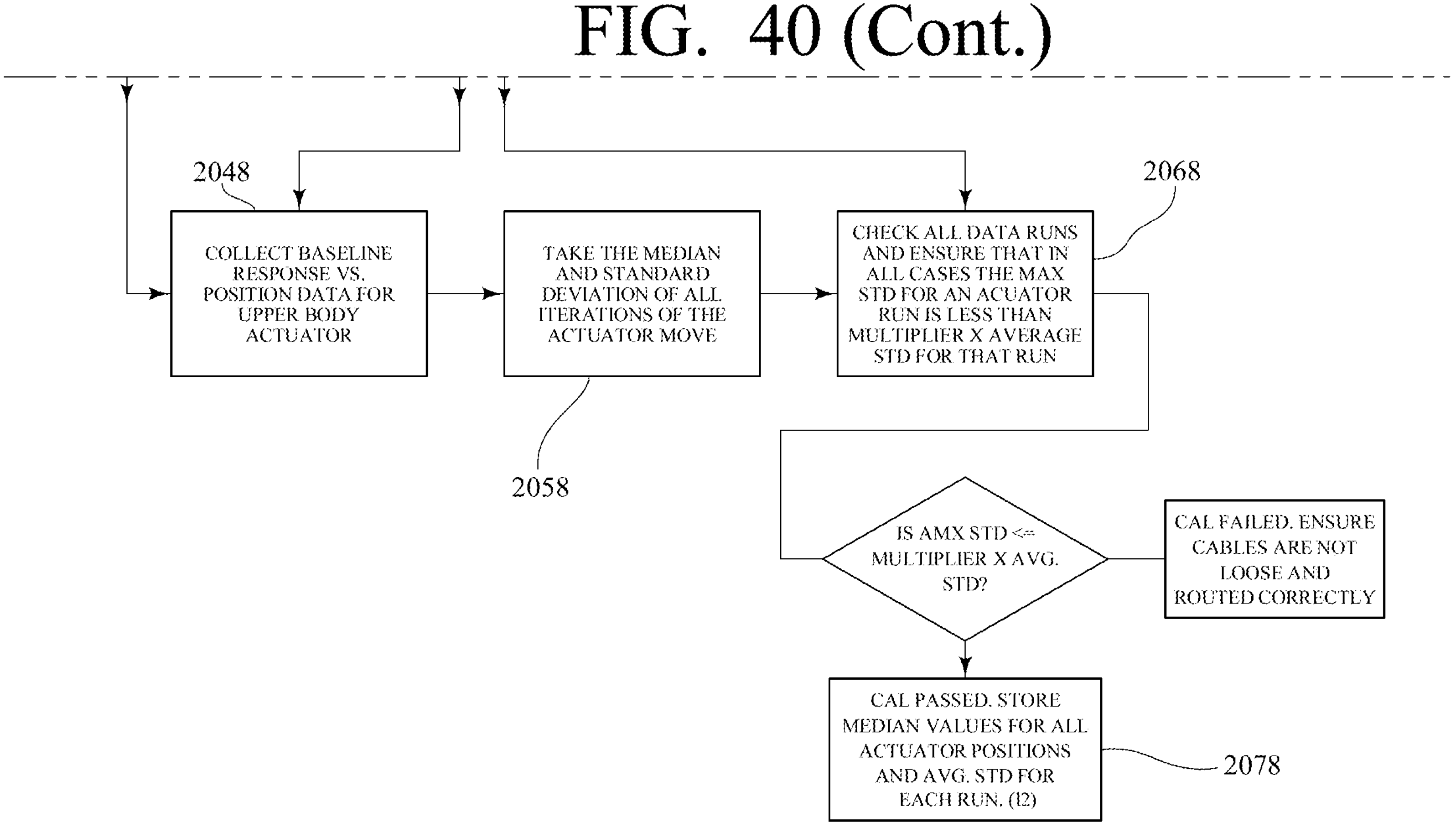

Turning now to FIG. 40, a flow chart of an exemplary method of collecting median sensor values of the plurality of capacitive sensors 2002 versus position data for each of the following combinations for a plurality of iterations: the upper body actuator; the head actuator with the upper body actuator in a down position; the lumbar actuator with the upper body actuator in a down position; the head actuator with the upper body actuator in a fully up position; and the lumbar actuator with the upper body actuator in a fully up position. The method includes collecting baseline response versus position data in the following steps: step 2040, the upper body actuator; step 2042 the head actuator with the upper body actuator in a down position; step 2044, the lumbar actuator with the upper body actuator in a down position; step 2046, the head actuator with the upper body actuator in a fully up position; and step 2048, the lumbar actuator with the upper body actuator in a fully up position. The method also includes taking the median and standard deviations of the sensor values for all iterations of each actuator move in the following steps: step 2050, the upper body actuator; step 2052 the head actuator with the upper body actuator in a down position; step 2054, the lumbar actuator with the upper body actuator in a down position; step 2056, the head actuator with the upper body actuator in a fully up position; and step 2058, the lumbar actuator with the upper body actuator in a fully up position. The method also includes checking the sensor values for each iteration and ensuring that a maximum standard deviation for an iteration is less than a multiplier times an average standard deviation of the sensor values for that iteration in the following steps: step 2060, the upper body actuator; step 2062 the head actuator with the upper body actuator in a down position; step 2064, the lumbar actuator with the upper body actuator in a down position; step 2066, the head actuator with the upper body actuator in a fully up position; and step 2068, the lumbar actuator with the upper body actuator in a fully up position. The method also includes storing median sensor values for all actuator positions and an average standard deviation of the sensor values for each iteration in the following steps: step 2070, the upper body actuator; step 2072 the head actuator with the upper body actuator in a down position; step 2074, the lumbar actuator with the upper body actuator in a down position; step 2076, the head actuator with the upper body actuator in a fully up position; and step 2078, the lumbar actuator with the upper body actuator in a fully up position. The capacitance of the sensors changes based on the position of the actuators themselves, and unless this is calibrated out of the system, it will lead to erroneous results as the bed is actuated.

Figure 41:
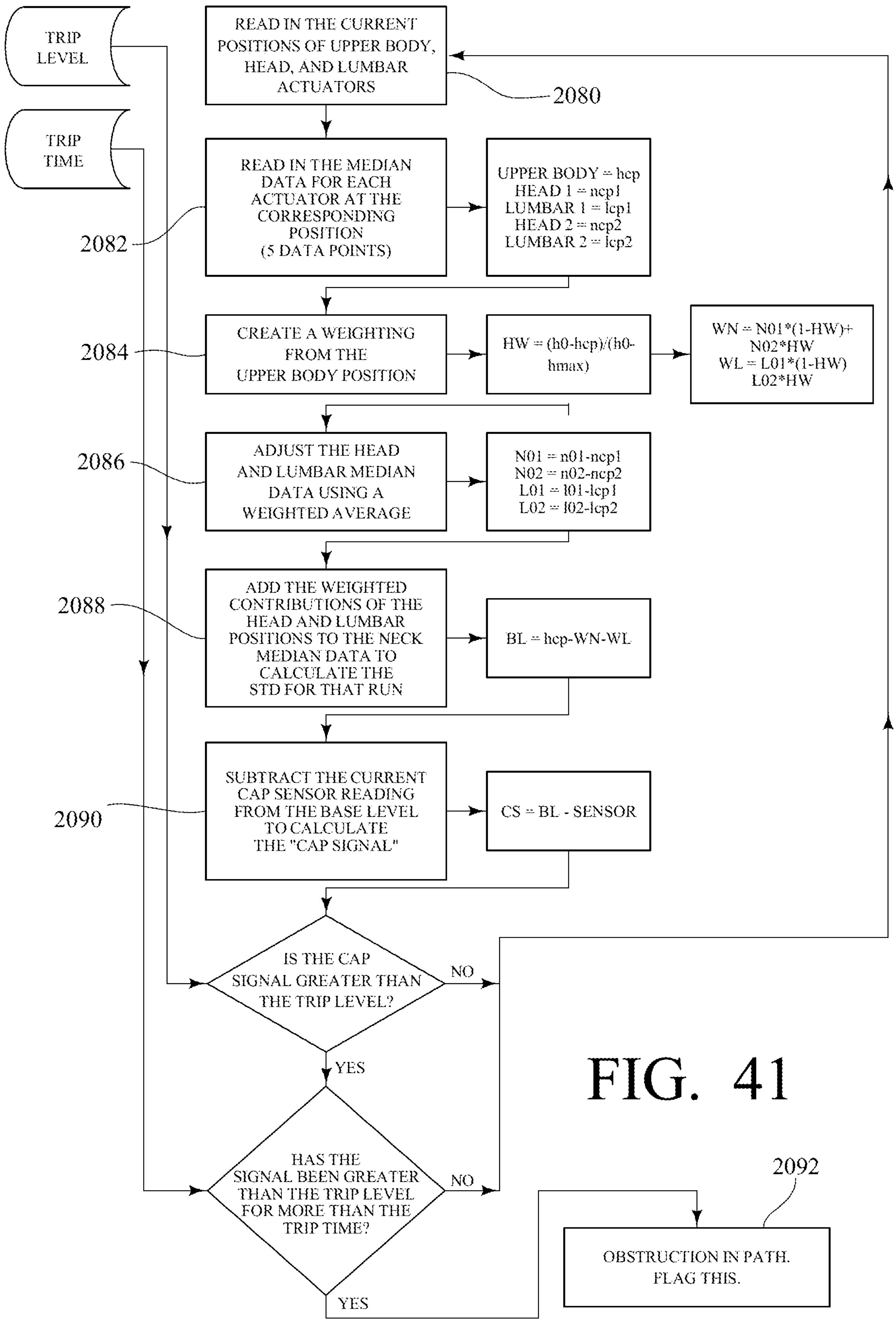
FIG. 41 is a flow chart of an exemplary method of operating the exemplary system of FIG. 38 in accordance with the present invention.

FIG. 41 is a flow chart of an exemplary method of operating the exemplary system of FIG. 38, including: step 2080, reading in the current positions of the upper body actuator 2006, the head actuator 2008, and the lumbar actuator 2010; step 2082, reading the median sensor values for the current positions of the upper body actuator, the head actuator, and the lumbar actuator; step 2084, creating a weighting value from the current position of the upper body actuator; and step 2086, adjusting the median sensor values for the current positions of the head actuator and the lumbar actuator using the weighting value. Different actuator movements affect the sensors in different ways—this is why a weighting is applied to the values.

Continuing with the description of FIG. 41, the exemplary method further includes step 2088, determining a base level signal value as the weighted contributions of the median sensor values for the current positions of the head actuator and the lumbar actuator added to the median sensor value for current position of the upper body actuator. The base level signal value is a weighted average of the contributions from each of the actuator positions. Step 2090 is determining a signal value as the base level signal value minus the sensor values of the plurality of capacitive sensors. Step 2092 is, if the signal value is greater than a predetermined trip level value, then determining, when the signal value has been greater than the predetermined trip level value for more than the predetermined trip time, that the human body part is present. Because actuation of the bed causes capacitance changes similar in magnitude to an obstruction in the pinch zone, the exemplary method addresses how the actuator position is subtracted out of the result to determine if there is in fact an obstruction in the pinch zone.

Thus, the plurality of capacitive sensors 2002 are checked at the start of any actuator move request, and are sensed in real time during any actuator move. This ensures that the adjustable base controller 2014 is always aware of the presence of a human body part in a pinch point 2032 prior to and during movement of the adjustable base assembly. If a human presence is detected in a pinch point after a small hysteresis time, the adjustable base controller will stop movement of the actuator immediately to avoid contact with the body part and subsequent injury.

Advantageously, the described system and method for preventing pinching of a human body part by an adjustable base is immune to the effects of dust, sheets, blankets, and anything else that would block a line-of-sight solution, such as IR, RF, or ultrasonic. This solution provides a faster response time and safer experience than any obstruction detection based on physical contact to the frame (contact sensing or actuator current/force monitoring). It gives the control chip time to react and stop the actuator before actual contact with the user is made.

Throughout this document, various references are mentioned. All such references are incorporated herein by reference, including the references set forth in the following list:

REFERENCES

U.S. Pat. No. 6,499,161, issued Dec. 31, 2002 to Godette, and entitled “Adjustable Bed with Vibrators.”

U.S. Pat. No. 6,690,392, issued Feb. 10, 2004 to Wugoski, and entitled “Method, System, Software, and Signal for Automatic Generation of Macro Commands.”

U.S. Pat. No. 6,889,396, issued May 10, 2005 to Weinman, and entitled “Adjustable Bed Mattress Clip.”

U.S. Pat. No. 7,047,554, issued May 16, 2006 to Lortz, and entitled “System and Method for Integrating and Controlling Audio/Video Devices.”

U.S. Pat. No. 7,421,654, issued Sep. 2, 2008 to Wugoski, and entitled “Method, System, Software, and Signal for Automatic Generation of Macro Commands.”

U.S. Pat. No. 8,509,400, issued Aug. 13, 2013 to Liu, et al., and entitled “System and Method for Adaptive Programming of A Remote Control.”

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

The invention claimed is:

1. An adjustable base assembly, comprising:

an external fixed frame having a plurality of members and including an upper section and a central section;

said external fixed frame having at least one fixed frame connector extending between said plurality of members of said external fixed frame;

a plurality of panels including a head panel, a torso panel, a thigh panel, and a foot panel, said plurality of panels disposed above said external fixed frame;

said head panel and said torso panel movable relative to said external fixed frame and disconnected from said thigh panel and foot panel;

said thigh panel and foot panel movable relative to said external fixed frame separately of said head panel and said torso panel;

said head panel pivotable relative to said torso panel and said foot panel pivotable relative to said thigh panel;

said torso panel and said thigh panel separated by and defining a space therebetween, a first actuator connected to said at least one fixed frame connector to drive movement of said torso panel and said head panel; and a second actuator connected to said at least one fixed frame connector to drive movement of said thigh panel and said foot panel;

wherein actuation of said first actuator causes said torso panel and said head panel to articulate upward and linearly relative to the central section of the fixed frame toward the upper section of the fixed frame and away from said thigh panel and said foot panel to widen the space between the torso panel and the thigh panel for a mattress in an upright position.

2. The adjustable base assembly of claim 1, said at least one fixed frame connector being a first connector and a second connector.

3. The adjustable base assembly of claim 1, further comprising a passive mechanism for movement of said head panel relative to said torso panel.

4. The adjustable base assembly of claim 3, wherein said passive mechanism is a bracket.

5. The adjustable base assembly of claim 4 wherein said bracket causes movement of said head panel with movement of said torso panel.

6. The adjustable base assembly of claim 1, further comprising a plurality of movable frames.

7. The adjustable base assembly of claim 1 further comprising a linkage extending between said external fixed frame and said head panel or torso panel.

8. The adjustable base assembly of claim 7 further comprising a second linkage extending between said external fixed frame and said foot panel.

9. The adjustable base assembly of claim 1 wherein said first actuator is connected directly or indirectly to said external fixed frame.

10. The adjustable base assembly of claim 1 wherein said second actuator is connected directly or indirectly to said external fixed frame.

11. The adjustable base assembly of claim 1, said at least one fixed frame connector extending in a lateral direction.

12. The adjustable base assembly of claim 10, said at least one fixed frame connector extending in a longitudinal direction.

13. An adjustable base assembly, comprising:

an external frame having a plurality of external frame members and including an upper section and a central section;

a fixed frame connector disposed within a perimeter defined by said external frame, said fixed frame connector extending in a lateral direction;

a plurality of panels including a head panel, a torso panel, a thigh panel, and a foot panel, said plurality of panels disposed above said fixed frame connector;

a first actuator driving movement of said torso panel and said head panel, said first actuator moving in a longitudinal direction;

a second actuator driving movement of said thigh panel and said foot panel, said second actuator moving in said longitudinal direction;

said head panel and said torso panel movable relative to said external frame and disconnected from said thigh panel and foot panel;

said thigh panel and foot panel movable relative to said fixed frame connector;

said head panel pivotable relative to said torso panel and said foot panel pivotable relative to said thigh panel;

said torso panel and said thigh panel separated by and defining a space therebetween;

wherein actuation of said first actuator causes said torso panel and said head panel to articulate upward and linearly relative to the central section of the fixed frame toward the upper section of the fixed frame and away from said thigh panel and said foot panel to widen the space between the torso panel and the thigh panel for a mattress to fold into an upright position.

14. The adjustable base assembly of claim 13, wherein said head panel and torso panel move separately from said thigh panel and foot panel.

15. The adjustable base assembly of claim 13, further comprising at least one linkage connected to one of said first actuator or said second actuator.

16. The adjustable base assembly of claim 13, said first and second actuators being connected to either or both of said external frame or said fixed frame connector.

17. The adjustable base assembly of claim 13, said fixed frame connector being a first fixed frame connector and a second fixed frame connector.

* * * * *